(12) United States Patent
Yamazaki et al.

(10) Patent No.: US 9,341,722 B2
(45) Date of Patent: May 17, 2016

(54) IMAGING DEVICE

(71) Applicant: Semiconductor Energy Laboratory Co., Ltd., Atsugi-shi, Kanagawa-ken (JP)

(72) Inventors: Shunpei Yamazaki, Setagaya (JP); Kengo Akimoto, Tochigi (JP); Hironobu Takahashi, Oyama (JP); Hiroshi Kanemura, Tochigi (JP); Akiharu Miyanaga, Hadano (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 140 days.

(21) Appl. No.: 14/187,909

(22) Filed: Feb. 24, 2014

(65) Prior Publication Data

US 2014/0239183 A1  Aug. 28, 2014

(30) Foreign Application Priority Data

Feb. 27, 2013 (JP) .................................. 2013-037039

(51) Int. Cl.
  *G01T 1/20* (2006.01)
  *G01T 1/202* (2006.01)
(52) U.S. Cl.
  CPC .................................... *G01T 1/2018* (2013.01)
(58) Field of Classification Search
  CPC ..................................................... G01T 1/2018
  See application file for complete search history.

(56) References Cited

U.S. PATENT DOCUMENTS

| 5,731,856 | A | 3/1998 | Kim et al. |
| 5,744,864 | A | 4/1998 | Cillessen et al. |
| 6,243,440 | B1 | 6/2001 | Oikawa et al. |
| 6,294,274 | B1 | 9/2001 | Kawazoe et al. |
| 6,563,174 | B2 | 5/2003 | Kawasaki et al. |

(Continued)

FOREIGN PATENT DOCUMENTS

| EP | 1737044 A | 12/2006 |
| EP | 2226847 A | 9/2010 |

(Continued)

OTHER PUBLICATIONS

English translation of JP 2002-168806 A—Abe et al. from the Japan Patent Office's Advanced Industrial Property Network Online Translation Service at https://dossier1.j-platpat.inpit.go.jp/tri/all/odse/ODSE_GM101_Top.action accessed Sep. 1, 2015.*

(Continued)

*Primary Examiner* — David Porta
*Assistant Examiner* — Jeremy S Valentiner
(74) *Attorney, Agent, or Firm* — Robinson Intellectual Property Law Office; Eric J. Robinson

(57) ABSTRACT

An imaging device which is highly stable to irradiation with radiations such as X-rays and can inhibit a decrease in electrical characteristics is provided. The imaging device obtains an image using radiations such as X-rays and includes pixel circuits which are arranged in a matrix and which a scintillator overlaps. Each of the pixel circuits includes a switching transistor whose off-state current is extremely low and a light-receiving element. A shielding layer formed using a metal material and the like overlaps the transistor and the light-receiving element. With the structure, an imaging device which is highly stable to irradiation with radiations such as X-rays and can inhibit a decrease in electrical characteristics can be provided.

14 Claims, 31 Drawing Sheets

(56) References Cited

U.S. PATENT DOCUMENTS

| | | | |
|---|---|---|---|
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,855,369 B2 | 12/2010 | Takahashi |
| 8,378,391 B2 | 2/2013 | Koyama et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0289942 A1* | 12/2006 | Horii ................ H01L 27/101 257/379 |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258067 A1 | 10/2008 | Vogtmeier et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0277588 A1* | 11/2008 | Zeitler ................ G01T 1/202 250/370.11 |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0224162 A1 | 9/2009 | Inuiya et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0215323 A1* | 9/2011 | Kurokawa ......... H01L 27/14616 257/53 |
| 2012/0007197 A1* | 1/2012 | Kikuchi ............ H01L 27/14603 257/429 |
| 2013/0015326 A1 | 1/2013 | Tamura |
| 2013/0119380 A1 | 5/2013 | Koyama et al. |
| 2013/0299888 A1 | 11/2013 | Kurokawa et al. |

FOREIGN PATENT DOCUMENTS

| | | | |
|---|---|---|---|
| JP | 60-198861 A | | 10/1985 |
| JP | 63-210022 A | | 8/1988 |
| JP | 63-210023 A | | 8/1988 |
| JP | 63-210024 A | | 8/1988 |
| JP | 63-215519 A | | 9/1988 |
| JP | 63-239117 A | | 10/1988 |
| JP | 63-265818 A | | 11/1988 |
| JP | 05-251705 A | | 9/1993 |
| JP | 08-264794 A | | 10/1996 |
| JP | 11-505377 | | 5/1999 |
| JP | 11-311673 | | 11/1999 |
| JP | 2000-044236 A | | 2/2000 |
| JP | 2000-150900 A | | 5/2000 |
| JP | 2002-076356 A | | 3/2002 |
| JP | 2002168806 A * | 6/2002 | ............ G01T 1/20 |
| JP | 2002-289859 A | | 10/2002 |
| JP | 2003-086000 A | | 3/2003 |
| JP | 2003-086808 A | | 3/2003 |
| JP | 2004-103957 A | | 4/2004 |
| JP | 2004-273614 A | | 9/2004 |
| JP | 2004-273732 A | | 9/2004 |
| WO | WO-2004/114391 | | 12/2004 |

OTHER PUBLICATIONS

Asakuma.N et al., "Crystallization and Reduction of Sol-Gel-Derived Zinc Oxide Films by Irradiation with Ultraviolet Lamp", Journal of Sol-Gel Science and Technology, 2003, vol. 26, pp. 181-184.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

(56) References Cited

OTHER PUBLICATIONS

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Fung.T et al., "2-D Numerical Simulation of High Performance Amorphous In—Ga—Zn—O TFTs for Flat Panel Display",AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTS) for AMLCDs", Journal of the SID, 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using Cg—Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters), 2005, vol. 87, pp. 122102-1-122102-3.

Jeong.J et al., "3.1: Distinguished Paper: 12.1-Inch WXGA AMOLED Display Driven by Indium—Gallium—Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID DIgest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crysalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214TH ECS Meeting, 2008, No. 2317, ECS.

Kimizuka.N. et al., "Spinel,YBFE2O4, and YB2FE3O7 Types of Structures for Compounds in the IN2O3 and SC2O3—A2O3—BO Systems [A; Fe, Ga, or Al; B: Mg, Mn, Fe, Ni, Cu,or Zn] at Temperatures over 1000° C.", Journal of Solid State Chemistry, 1985, vol. 60, pp. 382-384.

Kimizuka.N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED ", IDW '06 : Proceedings of the 13th International Display Workshops, Dec. 7, 2006, pp. 663-666.

Lee.J et al., "World'S Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium—Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

(56) References Cited

OTHER PUBLICATIONS

Nomura.K et al., "Thin-Film Transistor Fabricated in Single-Crystalline Transparent Oxide Semiconductor", Science, May 23, 2003, vol. 300, No. 5623, pp. 1269-1272.
Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.
Oba.F et al., "Defect energetics in ZnO: A hybrid Hartree-Fock density functional study", Phys. Rev. B (Physical Review. B), 2008, vol. 77, pp. 245202-1-245202-6.
Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.
Ohara.H et al., "21.3:4.0 In. QVGA AMOLED Display Using In—Ga13 Zn—Oxide TFTS With a Novel Passivation Layer", SID Digest '09 : SID International Symposium Digest of Technical Papers, May 31, 2009, pp. 284-287.
Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.
Orita.M et al., "Amorphous transparent conductive oxide InGaO3(ZnO)m (m<4):a Zn4s conductor", Philosophical Magazine, 2001, vol. 81, No. 5, pp. 501-515.
Orita.M et al., "Mechanism of Electrical Conductivity of Transparent InGaZnO4", Phys. Rev. B (Physical Review. B), Jan. 15, 2000, vol. 61, No. 3, pp. 1811-1816.
Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.
Osada.T et al., "Development of Driver-Integrated Panel Using Amorphous In—Ga—Zn—Oxide TFT", AM-FPD '09 Digest of Technical Papers, Jul. 1, 2009, pp. 33-36.
Park.J et al., "Amorphous Indium—Gallium—Zinc Oxide TFTS and Their Application for Large Size AMOLED", AM-FPD '08 Digest of Technical Papers, Jul. 2, 2008, pp. 275-278.
Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.
Park.J et al., "Electronic Transport Properties of Amorphous Indium—Gallium—Zinc Oxide Semiconductor Upon Exposure to Water", Appl. Phys. Lett. (Applied Physics Letters) , 2008, vol. 92, pp. 072104-1-072104-3.
Park.J et al., "High performance amorphous oxide thin film transistors with self-aligned top-gate structure", IEDM 09: Technical Digest of International Electron Devices Meeting, Dec. 7, 2009, pp. 191-194.
Park.J et al., "Improvements in the Device Characteristics of Amorphous Indium Gallium Zinc Oxide Thin-Film Transistors By Ar Plasma Treatment", Appl. Phys. Lett. (Applied Physics Letters) , Jun. 26, 2007, vol. 90, No. 26, pp. 262106-1-262106-3.
Park.S et al., "Challenge to Future Displays: Transparent AM-OLED Driven by Peald Grown ZnO TFT", IMID '07 Digest, 2007, pp. 1249-1252.
Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.
Prins.M et al., "A Ferroelectric Transparent Thin-Film Transistor", Appl. Phys. Lett. (Applied Physics Letters) , Jun. 17, 1996, vol. 68, No. 25, pp. 3650-3652.
Sakata.J et al., "Development of 4.0-In. AMOLED Display With Driver Circuit Using Amorphous In—Ga—Zn—Oxide TFTS", IDW '09 : Proceedings of the 16th International Display Workshops, 2009, pp. 689-692.
Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.
Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.
Tsuda.K et al., "Ultra Low Power Consumption Technologies for Mobile TFT-LCDs ", IDW '02 : Proceedings of the 9th International Display Workshops, Dec. 4, 2002, pp. 295-298.
Ueno.K et al., "Field-Effect Transistor on SrTiO3 With Sputtered Al2O3 Gate Insulator", Appl. Phys. Lett. (Applied Physics Letters) , Sep. 1, 2003, vol. 83, pp. 1755-1757.
Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

* cited by examiner

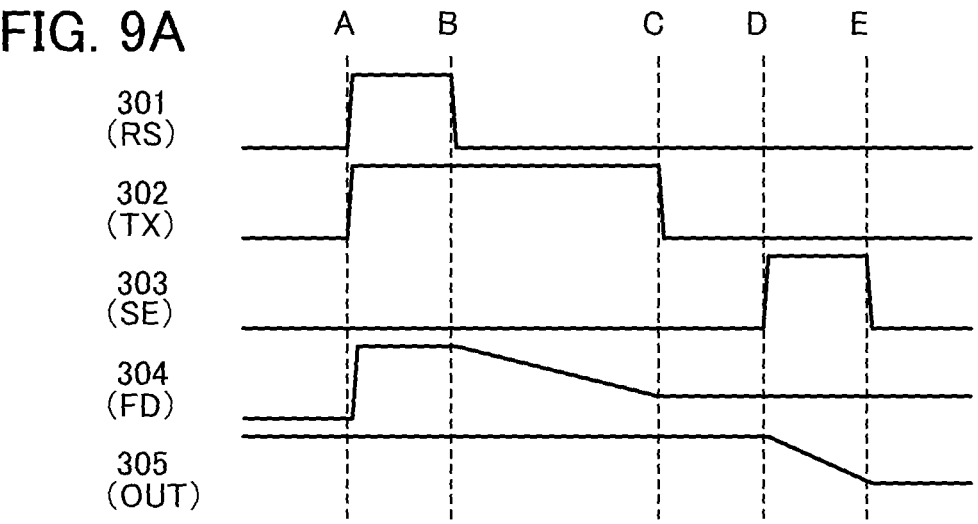
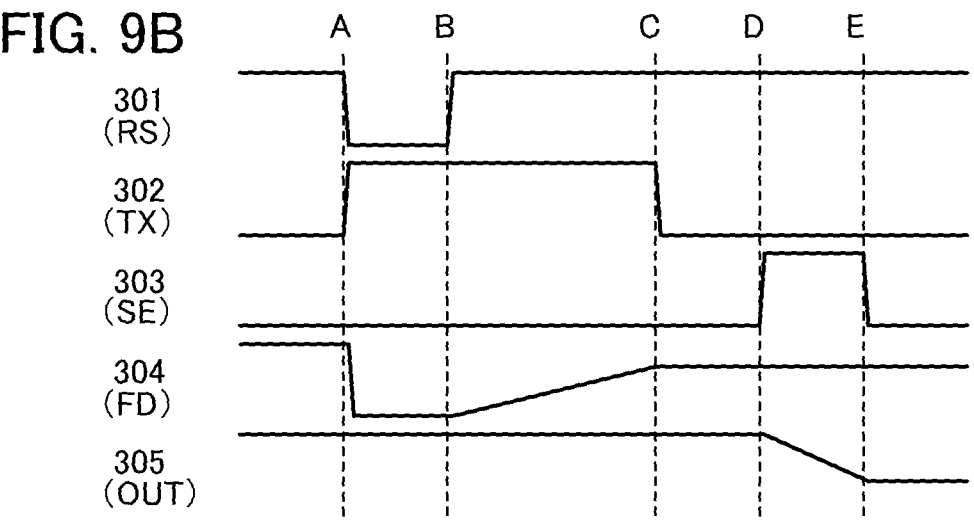
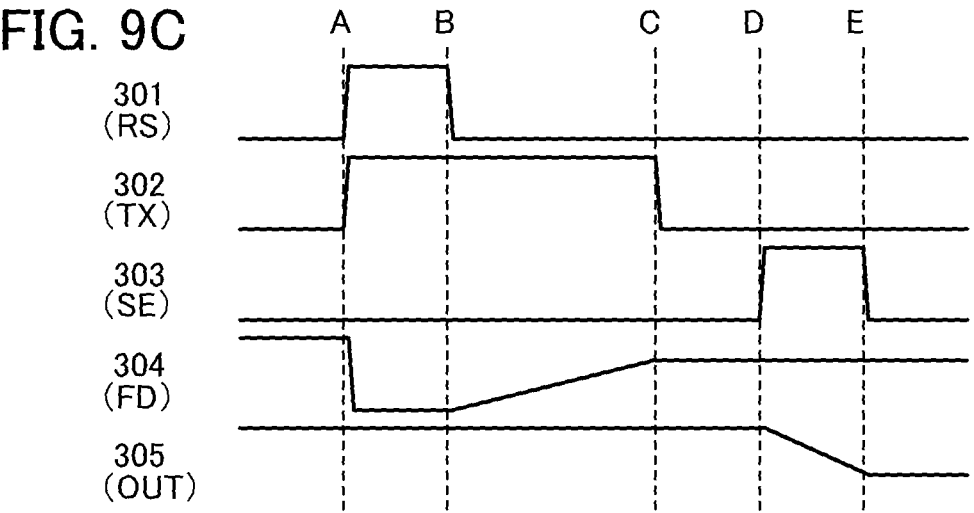

IMAGING DEVICE

TECHNICAL FIELD

The present invention relates to an object, a method, or a manufacturing method. In addition, the present invention relates to a process, a machine, manufacture, or a composition of matter. In particular, the present invention relates to, for example, a semiconductor device, a display device, a light-emitting device, a power storage device, a driving method thereof, or a manufacturing method thereof. In particular, the present invention relates to an imaging device including a scintillator.

BACKGROUND ART

In medical practice, a medical diagnostic imaging device using a photographic technique has been in wide use. With the medical diagnostic imaging device, a specific portion (e.g., bone or lungs) of a patient is irradiated with X-rays, an X-ray film is exposed to X-rays passing through the specific portion, and the X-ray film is developed to visualize a state inside the specific portion.

Since the method using X-ray films needs a storage space for the X-ray films and maintenance thereof is troublesome, digitization of images is in progress. As a method for digitizing images, a method using an imaging plate containing a material which emits light by being irradiated with X-rays (photostimulable material) has been known. By sensing light emitted from the imaging plate with scanner, digitized images can be obtained.

The imaging plate is a plate to which photostimulable phosphor is applied and which has higher sensitivity to X-ray absorption difference than X-ray films. Data of X-ray irradiation can be erased, so that the imaging plate can be re-used. However, data obtained by the imaging plate is analog, which requires treatment for digitization to digitize the data.

For this reason, attention has been recently focused on flat panel detectors capable of obtaining digital data directly (e.g., Patent Document 1). Flat panel detectors have two systems, direct and indirect conversion systems. In the direct conversion system, X-rays are directly converted to electrical charges with the use of an X-ray detecting element. In the indirect conversion system, X-rays are converted to visible light with a scintillator and the light is converted to electrical charges by a photodiode. In either of the systems, a flat panel detector includes a plurality of pixel circuits arranged in a matrix.

REFERENCE

Patent Document

[Patent Document 1] Japanese Published Patent Application No. H11-311673

DISCLOSURE OF INVENTION

A pixel circuit included in a flat panel detector has a plurality of transistors. A semiconductor material is included in the transistors and when the semiconductor material is irradiated with radiations with strong energy, such as X-rays, defect levels and the like are generated, so that the electrical characteristics of the transistors are changed.

Such a phenomenon can occur by a slight amount of radiation which penetrates a scintillator, which increases in power consumption or degrades reliability of a flat panel detector.

Thus, an object of one embodiment of the present invention is to provide an imaging device which is highly stable to irradiation with radiations such as X-rays. Another object of one embodiment of the present invention is to provide an imaging device having a structure which can inhibit a decrease in electrical characteristics. Another object of one embodiment of the present invention is to provide an imaging device with low power consumption. Another object of one embodiment of the present invention is to provide an imaging device with high reliability. Another object of one embodiment of the present invention is to provide a novel imaging device or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an imaging device which obtains an image using radiations such as X-rays from a radiation source and includes pixel circuits which are arranged in a matrix and which a scintillator overlaps. The pixel circuits each include a switching transistor whose off-state current is extremely low and a light-receiving element. A shielding layer (blocking layer) formed using a metal material and the like overlaps the transistor and the light-receiving element.

One embodiment of the present invention is an imaging device including a plurality of pixel circuits arranged in a matrix over a substrate, a scintillator overlapping the substrate, and a shielding layer in contact with and overlapping the scintillator. The pixel circuit includes a light-receiving element and a circuit portion electrically connected to the light-receiving element. The shielding layer overlaps part of a region of the pixel circuit. The shielding layer overlaps the light-receiving element and the circuit portion.

The shielding layer can be formed in a single layer or a stacked layer using a material selected from lead, gold, platinum, iridium, osmium, rhenium, tungsten, tantalum, hafnium, palladium, rhodium, and ruthenium.

Another embodiment of the present invention is an imaging device including a plurality of pixel circuits arranged in a matrix over one surface of a substrate, and a scintillator in contact with and overlapping the other surface of the substrate. The pixel circuit includes a light-receiving element and a circuit portion electrically connected to the light-receiving element. The substrate is a glass substrate including a heavy metal.

Another embodiment of the present invention is an imaging device including a plurality of pixel circuits arranged in a matrix over a substrate and a scintillator overlapping the substrate. The pixel circuit includes a light-receiving element and a circuit portion electrically connected to the light-receiving element. The scintillator includes a heavy metal.

For the heavy metal included in the substrate or the scintillator, one or more of lead, gold, platinum, iridium, osmium, rhenium, tungsten, tantalum, hafnium, palladium, rhodium, and ruthenium can be used.

As the light-receiving element, a transistor in which a channel formation region is formed using an oxide semiconductor, a photo diode, or a variable resistor in which a semiconductor layer is positioned between a pair of electrodes can be used.

The circuit portion included in the pixel circuit includes a charge accumulation portion, a first transistor, a second transistor, and a third transistor. One of a source and a drain of the first transistor is electrically connected to the light-receiving element, the other of the source and the drain of the first transistor is electrically connected to the charge accumulation portion, a gate of the second transistor is electrically connected to the charge accumulation portion, one of a source and a drain of the second transistor is electrically connected to one of a source and a drain of the third transistor, and at least the first transistor includes a channel formation region formed using an oxide semiconductor.

The circuit portion included in the pixel circuit includes a charge accumulation portion, a first transistor, a second transistor, a third transistor, and a fourth transistor. One of a source and a drain of the first transistor is electrically connected to the light-receiving element, the other of the source and the drain of the first transistor is electrically connected to the charge accumulation portion, a gate of the second transistor is electrically connected to the charge accumulation portion, one of a source and a drain of the second transistor is electrically connected to one of a source and a drain of the third transistor, one of a source and a drain of the fourth transistor is electrically connected to the charge accumulation portion, and at least the first transistor and the fourth transistor each include a channel formation region formed using an oxide semiconductor.

According to one embodiment of the present invention, an imaging device which is highly stable to irradiation with radiations such as X-rays can be provided. An imaging device having a structure which can inhibit a decrease in electrical characteristics can be provided. An imaging device with low power consumption can be provided. An imaging device with high reliability can be provided. A novel imaging device or the like can be provided.

Note that the descriptions of these effects do not disturb the existence of other effects. In one embodiment of the present invention, there is no need to obtain all the effects. Other effects will be apparent from and can be derived from the description of the specification, the drawings, the claims, and the like.

BRIEF DESCRIPTION OF DRAWINGS

FIGS. 9A to 9C are timing charts each illustrating the operation of a pixel circuit.

BEST MODE FOR CARRYING OUT THE INVENTION

Figure 1A:
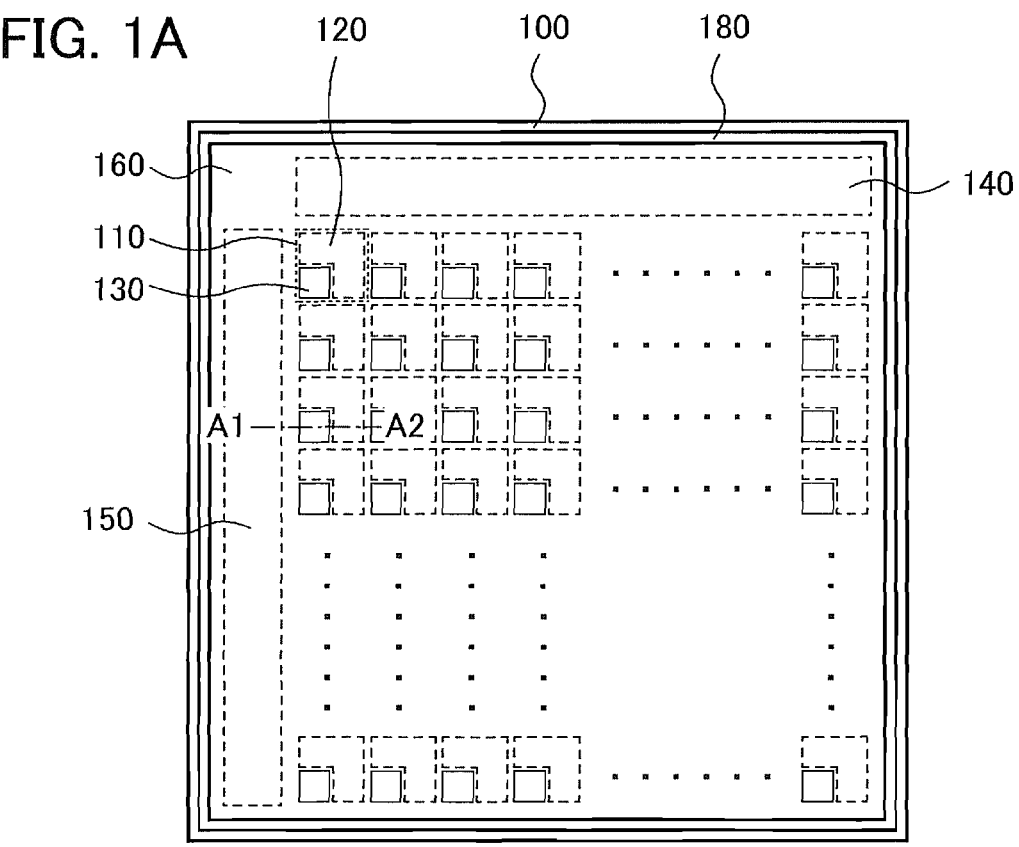
FIGS. 1A and 1B illustrate an imaging device.

Embodiments of the present invention will be described below in detail with reference to the drawings. However, one embodiment of the present invention is not limited to the description below, and it is easily understood by those skilled in the art that modes and details disclosed herein can be modified in various ways. Further, the present invention is not construed as being limited to description of the embodiments and the examples. Note that in all drawings used to illustrate the embodiments, portions that are identical or portion having similar functions are denoted by the same reference numerals, and their repetitive description may be omitted.

Note that in this specification and the like, when it is explicitly described that X and Y are connected, the case where X and Y are electrically connected, the case where X and Y are functionally connected, and the case where X and Y are directly connected are included therein. Here, X and Y each denote an object (e.g., a device, an element, a circuit, a wiring, an electrode, a terminal, a conductive film, a layer, or the like). Accordingly, another element may be interposed between elements having a connection relation shown in drawings and texts, without limiting to a predetermined connection relation, for example, the connection relation shown in the drawings and the texts.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be turned on or off. That is, a switch is conducting or not conducting (is turned on or off) to determine whether current flows therethrough or not. Alternatively, the switch has a function of selecting and changing a current path.

For example, in the case where X and Y are functionally connected, one or more circuits that enable functional connection between X and Y (e.g., a logic circuit such as an inverter, a NAND circuit, and a NOR circuit; a signal converter circuit such as a DA converter circuit, an AD converter circuit, and a gamma correction circuit; a potential level converter circuit such as a power supply circuit (e.g., a dc-dc converter, a step-up dc-dc converter, and a step-down dc-dc converter) and a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; and/or a control circuit) can be connected between X and Y. When a signal output from X is transmitted to Y, it can be said that X and Y are functionally connected even if another circuit is provided between X and Y.

Note that when it is explicitly described that X and Y are connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are included therein. That is, when it is explicitly described that "A and B are electrically connected", the description is the same as the case where it is explicitly only described that "A and B are connected".

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Note that in this specification and the like, a transistor can be formed using a variety of substrates. The type of a substrate is not limited to a certain type. As the substrate, a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used, for example. As an example of a glass substrate, a barium borosilicate glass substrate, an aluminoborosilicate glass substrate, soda lime glass substrate, and the like can be given. For a flexible substrate, a flexible synthetic resin such as plastics typified by polyethylene terephthalate (PET), polyethylene naphthalate (PEN), and polyether sulfone (PES), or acrylic can be used, for example. For an attachment film, polypropylene, polyester, polyvinyl fluoride, polyvinyl chloride, or the like can be used, for example. For a base material film, polyester, polyamide, polyimide, an inorganic vapor deposition film, paper, or the like can be used, for example. Specifically, when a transistor is formed using a semiconductor substrate, a single crystal substrate, an SOI substrate, or the like, it is possible to form a transistor with few variations in characteristics, size, shape, or the like, with high current supply capability, and with a small size. By forming a circuit with the use of such a transistor, power consumption of the circuit can be reduced or the circuit can be highly integrated.

Note that a transistor may be formed using one substrate, and then the transistor may be transferred to another substrate. In addition to the above substrates over which the transistor can be formed, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, or the like can be used as a substrate to which the transistor is transferred. By using such a substrate, a transistor with excellent characteristics or a transistor with low power consumption can be formed, a device with high durability can be formed, heat resistance can be provided, or reduction in weight or thickness can be achieved.

(Embodiment 1)

In this embodiment, an imaging device using radiations such as X-rays, which is one embodiment of the present invention, is described with reference to the drawings.

Figure 1B:
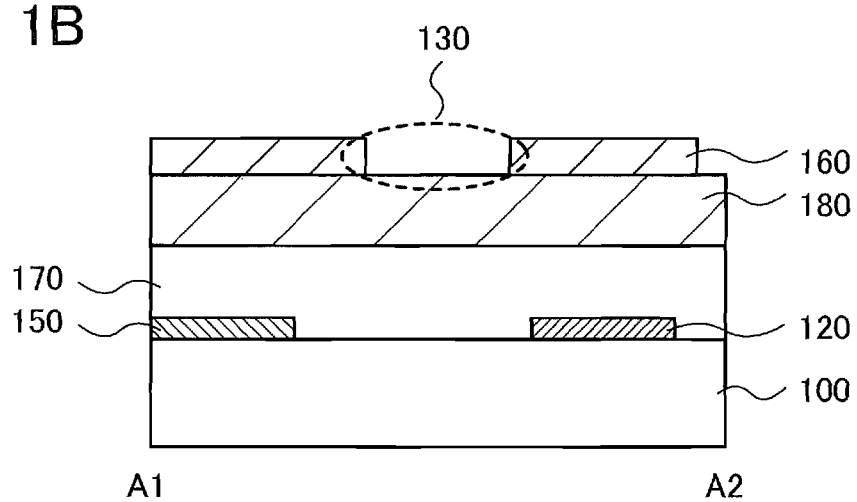

FIG. 1A is a top view of an imaging device of one embodiment of the present invention, and FIG. 1B is a cross-sectional view taken along dotted line A1-A2 in the top view. Note that for simplification of the drawing, some components are not illustrated in FIG. 1A.

The imaging device of one embodiment of the present invention includes pixel circuits 110 arranged in a matrix over a substrate 100, a first circuit 140 and a second circuit 150 for driving the pixel circuits, an interlayer insulating film 170 and a scintillator 180 which are formed over the pixel circuits 110, the first circuit 140, and the second circuit 150, and a shielding layer 160 overlapping the scintillator.

In FIG. 1A, the circuits for driving the pixel circuits 110 are the first circuit 140 and the second circuit 150 and are positioned in two regions; however, the structure of the circuits is not limited thereto. For example, the circuits for driving the pixel circuits 110 can be collectively positioned in one region. Alternatively, the circuits for driving the pixel circuits 110 can be positioned in three or more regions. Further, the circuits for driving the pixel circuits 110 may be formed directly on the substrate 100 like a transistor included in the pixel circuit 110, or may be formed by mounting an IC chip on the substrate 100 by chip on glass (COG) or the like. Alternatively, a tape carrier package (TCP) and the like may be connected to the pixel circuit 110.

Radiations such as X-rays which penetrate an object are emitted to the scintillator 180 through an opening 130 formed in the shielding layer 160, and is converted to light (fluorescence) such as visible light or ultraviolet light. Then, the light is sensed by a light-receiving element provided in the pixel circuit 110, whereby image data is obtained. Note that the shape of the opening 130 is not limited to the illustrated shape, and may be rectangular or circular. Moreover, the shielding layer 160 may be formed in an island shape.

The scintillator 180 is formed of a substance which absorbs energy of radiations such as X-rays or γ-rays when irradiated with the radiations to emit visible light or ultraviolet light or a material containing the substance. For example, materials such as $Gd_2O_2S:Tb$, $Gd_2O_2S:Pr$, $Gd_2O_2S:Eu$, $BaFCl:Eu$, $NaI$, $CsI$, $CaF_2$, $BaF_2$, $CeF_3$, $LiF$, $LiI$, and $ZnO$ and a resin or ceramics in which any of the materials is dispersed are known. However, part of the radiations emitted to the scintillator 180 is not used for photoluminescence, and penetrates the scintillator 180.

The interlayer insulating film is preferably formed using a material which transmits light emitted from the scintillator 180. As an example of a material which has high transmittance with respect to visible light and ultraviolet light, silicon oxide and the like are given.

The pixel circuit 110 includes a light-receiving element portion and a circuit portion 120 including a transistor and the like. In a structure in FIG. 1B, the light-receiving element portion is included in the circuit portion 120.

Figure 30:
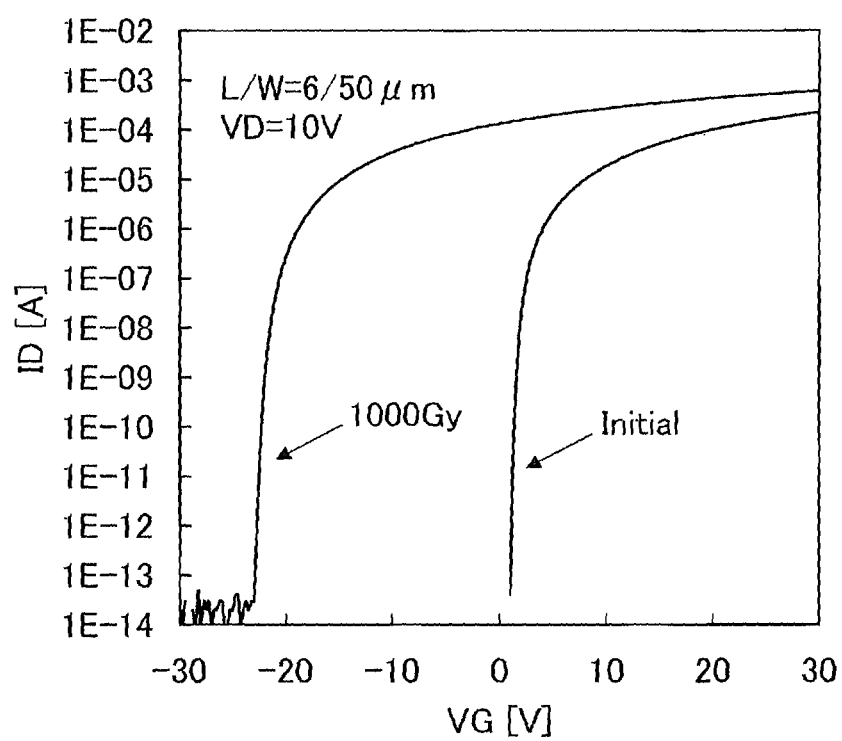
FIG. 30 shows $I_d$-$V_g$ characteristics of a transistor before and after X-ray irradiation.

As illustrated in FIGS. 1A and 1B, the shielding layer 160 overlaps the circuit portion 120, the first circuit 140, and the second circuit 150, which can prevent the transistor included in the pixel circuit from being irradiated with radiations such as X-rays which penetrate the scintillator. For example, when a transistor in which an oxide semiconductor is used for a channel formation region is irradiated with X-rays of 1000 Gy, the threshold voltage of the transistor is shifted in the negative direction as shown in the $I_d$-$V_g$ characteristics of the transistor in FIG. 30. With the structure of the imaging device of one embodiment of the present invention, such a change in the electrical characteristics can be suppressed.

Figure 2:
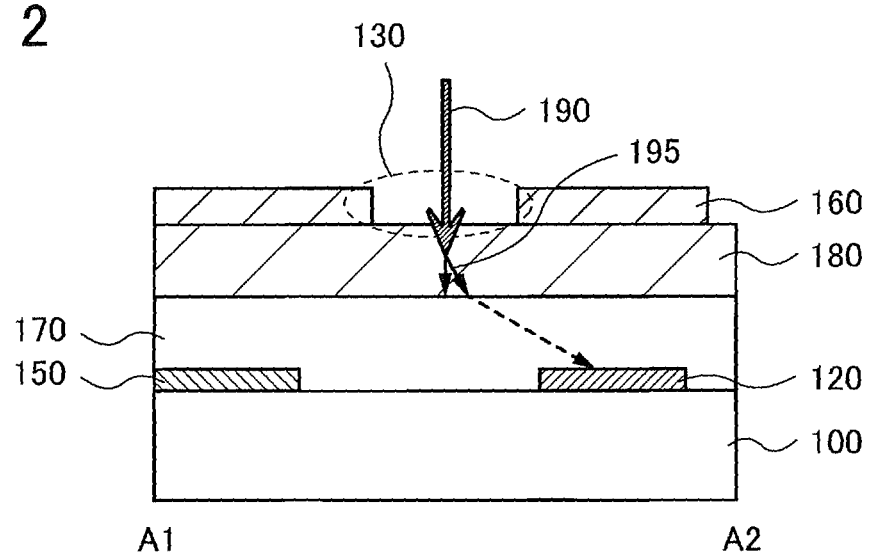
FIG. 2 illustrates an imaging device.

With the structure in FIG. 1B, as illustrated in FIG. 2, light 195 such as visible light or ultraviolet light, which is converted from radiations 190 such as X-rays in the scintillator 180, enters the light-transmitting interlayer insulating film 170. Then, part of the light 195 directly reaches the light-receiving element portion included in the circuit portion 120.

A composition material included in the scintillator, such as resin, preferably has higher refractive index than the interlayer insulating film 170. With such a material and the interlayer insulating film 170, the light 195 scattered in the scintillator 180 can be refracted to reach the light-receiving element portion provided under the shielding layer 160 easily. Further, in order that the light 195 scattered in the scintillator 180 easily reaches the light-receiving element portion provided under the shielding layer 160, a diffusion plate, lens array, a diffraction grating, a waveguide path (optical fiber), a mirror made of a metal, or the like may be provided in the opening 130.

The shielding layer 160 can be formed in a single layer or a stacked layer using a material selected from lead, gold, platinum, iridium, osmium, rhenium, tungsten, tantalum, hafnium, palladium, rhodium, ruthenium, and the like. In particular, in consideration of safety, capability of shielding, and the like, tungsten or tantalum is selected in some cases. In consideration of cost and the like, lead is selected in some cases. The shielding layer 160 has a function of blocking radiations such as X-rays.

Such a structure makes it possible to reduce radiations such as X-rays which penetrate the scintillator 180 and the opening 130 and with which the light-receiving element portion is irradiated. Thus, a change in the electrical characteristics of the light-receiving element portion formed using a semiconductor can be suppressed like the transistor.

In addition, as illustrated in a cross-sectional view in FIG. 3, a light-receiving element 125 may be positioned directly below the opening 130. In this case, the light 195 such as visible light or ultraviolet light converted from radiations such as X-rays in the scintillator 180 easily reaches the light-receiving element 125, so that photosensitivity can be improved. However, the light-receiving element 125 is directly irradiated with radiations such as X-rays which penetrate the scintillator 180. Thus, as the light-receiving element 125, an element in which the amount of change in the electrical characteristics due to radiation irradiation is small is preferably used.

Figure 4A:
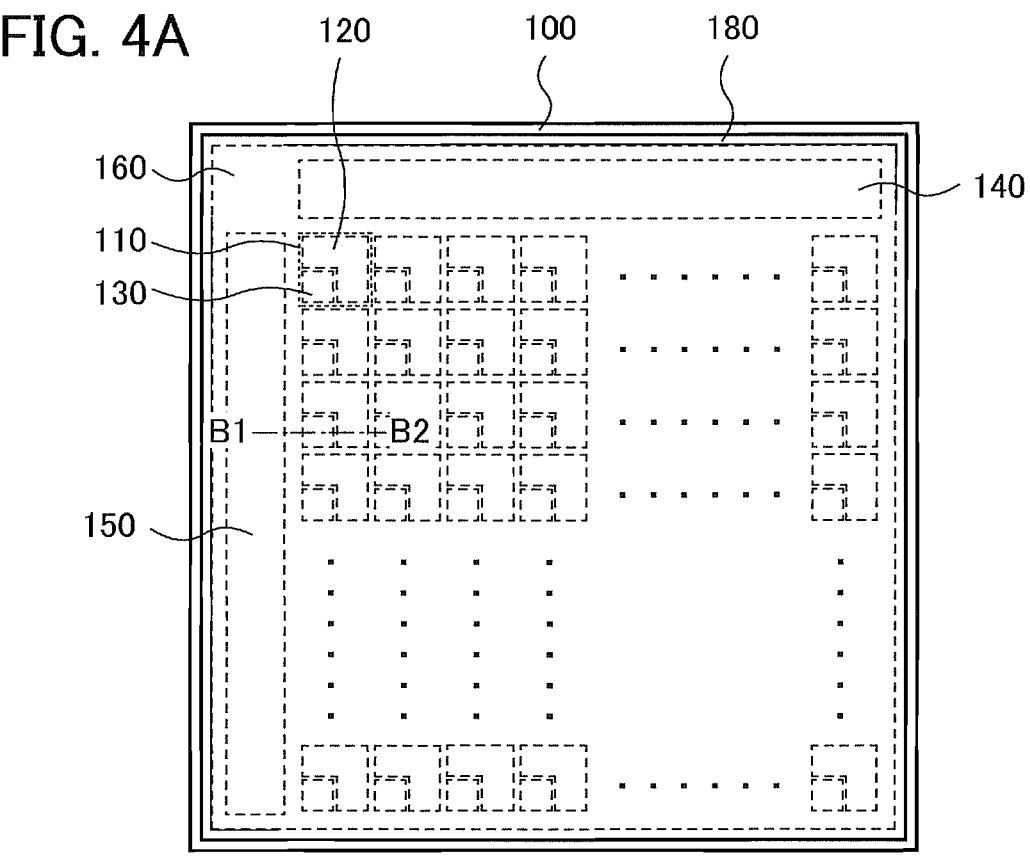
FIGS. 4A and 4B illustrate an imaging device.
Figure 4B:
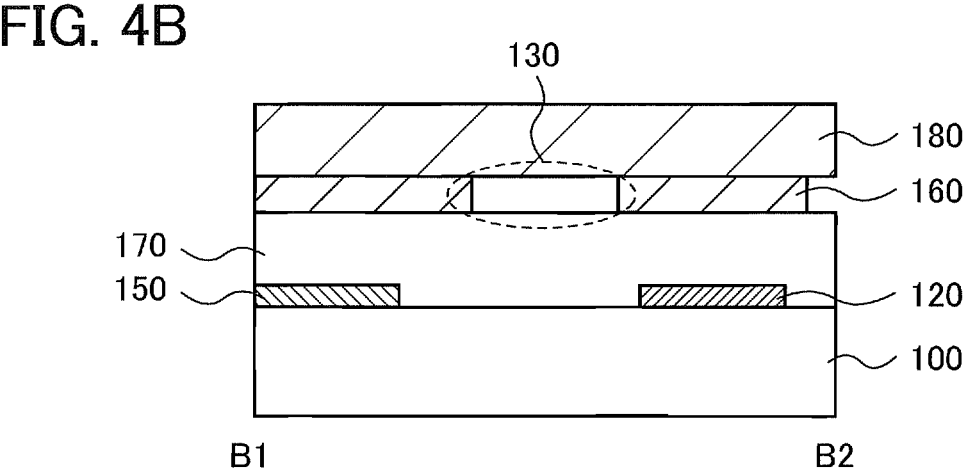

An imaging device of one embodiment of the present invention may have a structure illustrated in FIGS. 4A and 4B. FIG. 4A is a top view and FIG. 4B is a cross-sectional view taken along dotted line B1-B2 in the top view. Note that for simplification of the drawing, some components are not illustrated in FIG. 4A.

The imaging device illustrated in FIGS. 4A and 4B includes the pixel circuits 110 arranged in a matrix over the substrate 100, the first circuit 140 and the second circuit 150 for driving the pixel circuits, the light-transmitting interlayer insulating film 170 and the shielding layer 160 which are formed over the pixel circuits 110, the first circuit 140, and the second circuit 150, and the scintillator 180 overlapping the shielding layer.

The imaging device in FIGS. 4A and 4B has the same structure as the imaging device in FIGS. 1A and 1B, except for the stack order of the shielding layer 160 and the scintillator 180.

Figure 5:
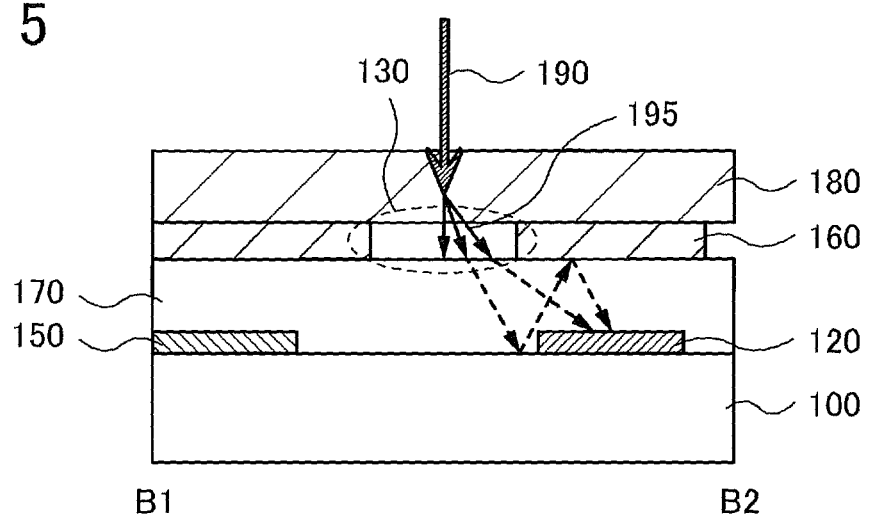
FIG. 5 illustrates an imaging device.

In the imaging device in FIGS. 4A and 4B, as illustrated in FIG. 5, the light 195 such as visible light or ultraviolet light, which is converted from the radiations 190 such as X-rays in the scintillator 180, enters the light-transmitting interlayer insulating film 170. Then, part of the light 195 directly reaches the light-receiving element portion included in the circuit portion 120. Further, the light 195 scattered in the scintillator 180 is repeatedly reflected in the interlayer insulating film 170, so that part of the light 195 can reach the light-receiving element portion included in the circuit portion 120.

In the opening 130, a material having higher refractive index than the interlayer insulating film 170 is preferably provided. The material is provided in the opening 130, whereby the light 195 scattered in the scintillator 180 can be refracted to reach the light-receiving element portion provided under the shielding layer 160 easily. Further, the scintillator 180 or a light-transmitting bonding layer may be provided in the opening 130. Alternatively, a bonding layer may be provided between the scintillator 180 and the shielding layer 160. Further, a diffusion plate, lens array, a diffraction grating, a waveguide path (optical fiber), a mirror made of a metal, or the like may be provided in the opening 130.

Figure 3:
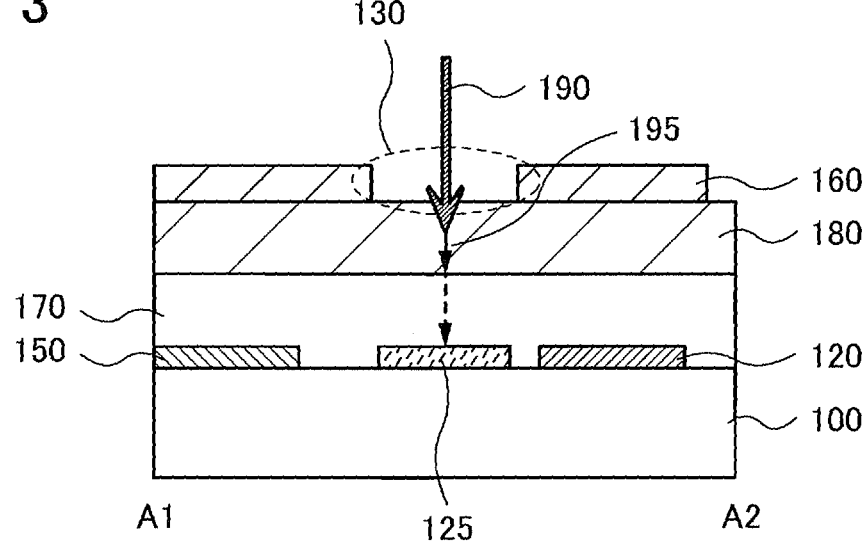
FIG. 3 illustrates an imaging device.

Note that, the imaging device in FIGS. 4A and 4B may have a structure as illustrated in FIG. 3, in which the light-receiving element 125 is positioned directly below the opening 130.

Figure 6A:
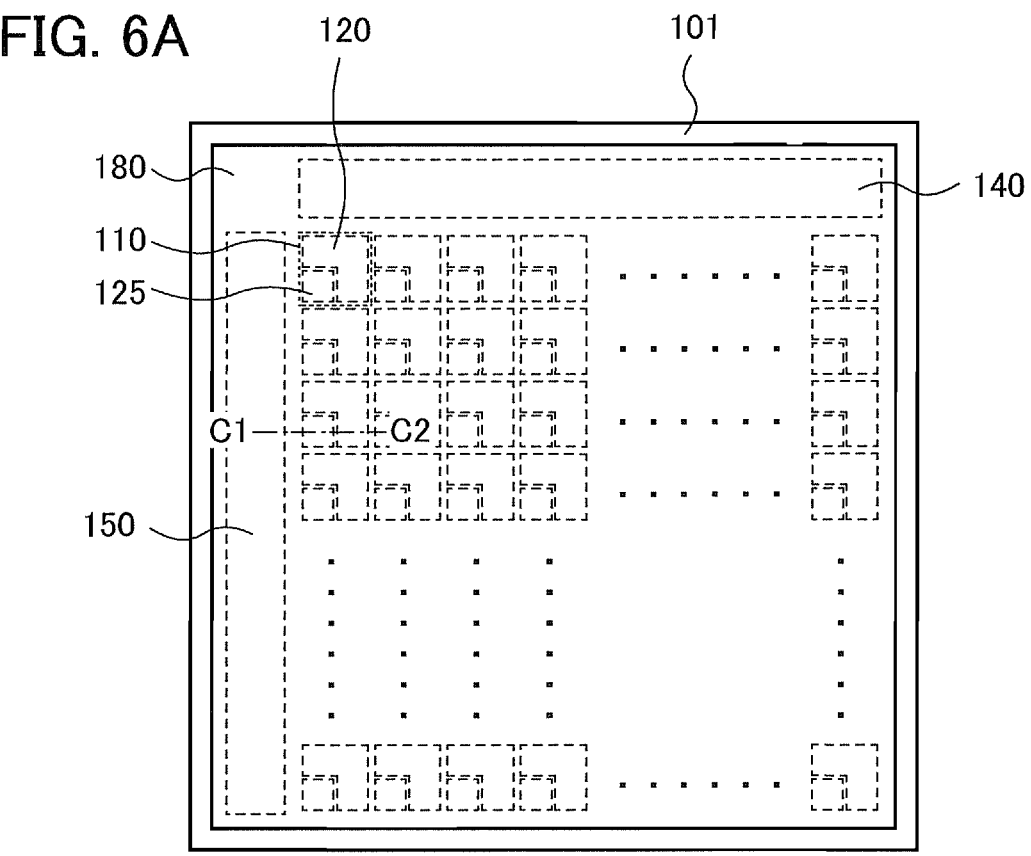
FIGS. 6A and 6B illustrate an imaging device.
Figure 6B:
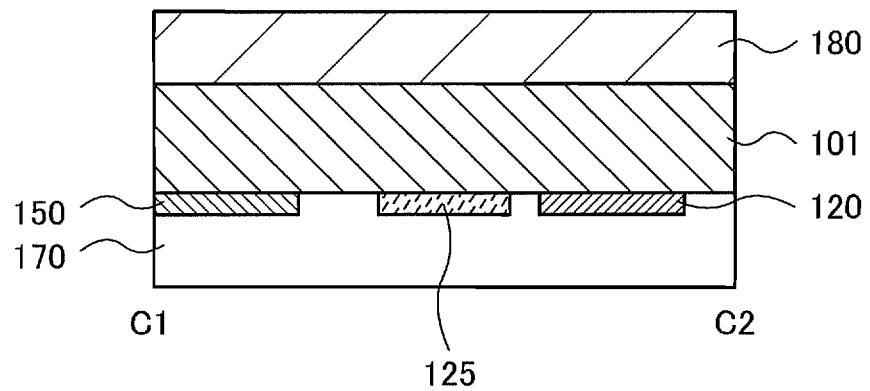

An imaging device of one embodiment of the present invention may have a structure illustrated in FIGS. 6A and 6B. FIG. 6A is a top view and FIG. 6B is a cross-sectional view taken along dotted line C1-C2 in the top view. Note that for simplification of the drawing, some components are not illustrated in FIG. 6A.

The imaging device illustrated in FIGS. 6A and 6B includes the pixel circuits 110 arranged in a matrix, the first circuit 140 and the second circuit 150 for driving the pixel circuits, and the light-transmitting interlayer insulating film 170 formed over the pixel circuits 110, the first circuit 140, and the second circuit 150, which are provided over one surface of a substrate 101 including a heavy metal, and the scintillator 180 on the other surface of the substrate 101.

The imaging devices in FIGS. 1A and 1B and FIGS. 4A and 4B each have a structure in which radiations such as X-rays emitted to a transistor and the like are blocked by the shielding layer 160 using the metal material. On the other hand, the imaging device in FIGS. 6A and 6B has a structure in which radiations such as X-rays are blocked by the substrate 101 including a heavy metal and the like typified by lead glass. Thus, the shielding layer 160, which is a component of the imaging devices in FIGS. 1A and 1B and FIGS. 4A and 4B, can be omitted.

As the substrate 101 including a heavy metal, for example, a glass substrate including one or more metal materials which can be used for the shielding layer 160 can be used. Alternatively, a glass substrate including strontium or barium which blocks radiations may be used. The description of the imaging device in FIGS. 1A and 1B can be referred to for other elements similar to those of FIGS. 1A and 1B.

Figure 7A:
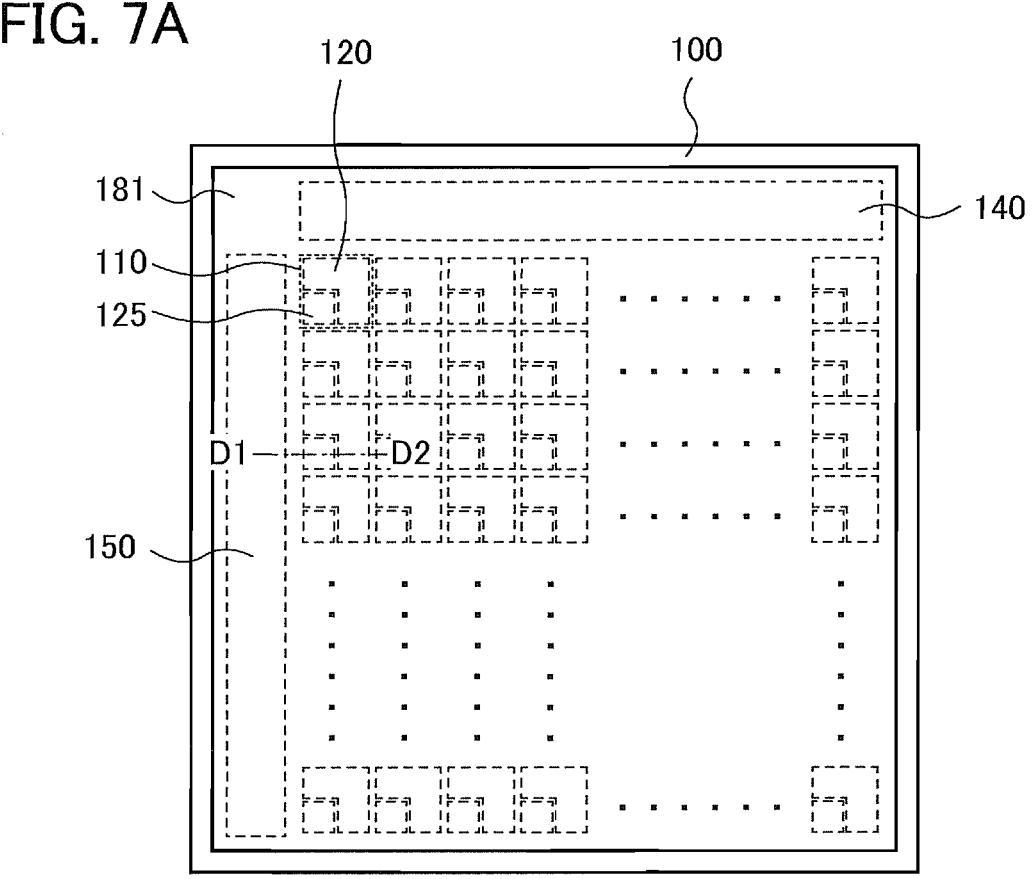
FIGS. 7A and 7B illustrate an imaging device.
Figure 7B:
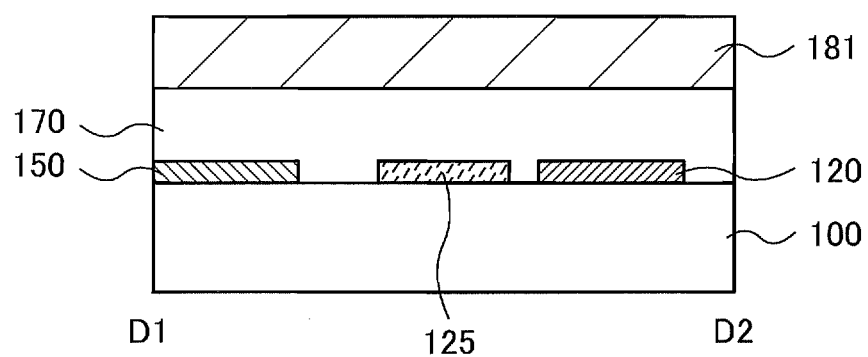

An imaging device of one embodiment of the present invention may have a structure illustrated in FIGS. 7A and 7B. FIG. 7A is a top view and FIG. 7B is a cross-sectional view taken along dotted line D1-D2 in the top view. Note that for simplification of the drawing, some components are not illustrated in FIG. 7A.

The imaging device illustrated in FIGS. 7A and 7B includes the pixel circuits 110 arranged in a matrix over the substrate 100, the first circuit 140 and the second circuit 150 for driving the pixel circuits, the light-transmitting interlayer insulating film 170 formed over the pixel circuits 110, the first circuit 140, and the second circuit 150, and a scintillator 181 including a heavy metal over the interlayer insulating film.

The imaging device in FIGS. 7A and 7B has a structure in which radiations such as X-rays emitted to a transistor and the like are blocked by the scintillator 181 including a heavy metal; thus, the shielding layer 160, which is a component of the imaging devices in FIGS. 1A and 1B and FIGS. 4A and 4B, can be omitted.

As the scintillator 181 including a heavy metal, a scintillator including one or more metal materials which can be used for the shielding layer 160 can be used. The description of the imaging device in FIGS. 1A and 1B can be referred to for other elements similar to those of FIGS. 1A and 1B.

In this manner, an imaging device which is highly stable to irradiation with radiations such as X-rays and can inhibit a decrease in electrical characteristics can be provided.

This embodiment can be combined with any of the other embodiments in this specification as appropriate.

(Embodiment 2)

In this embodiment, a circuit which can be used as the pixel circuit in Embodiment 1 is described.

Figure 8A:
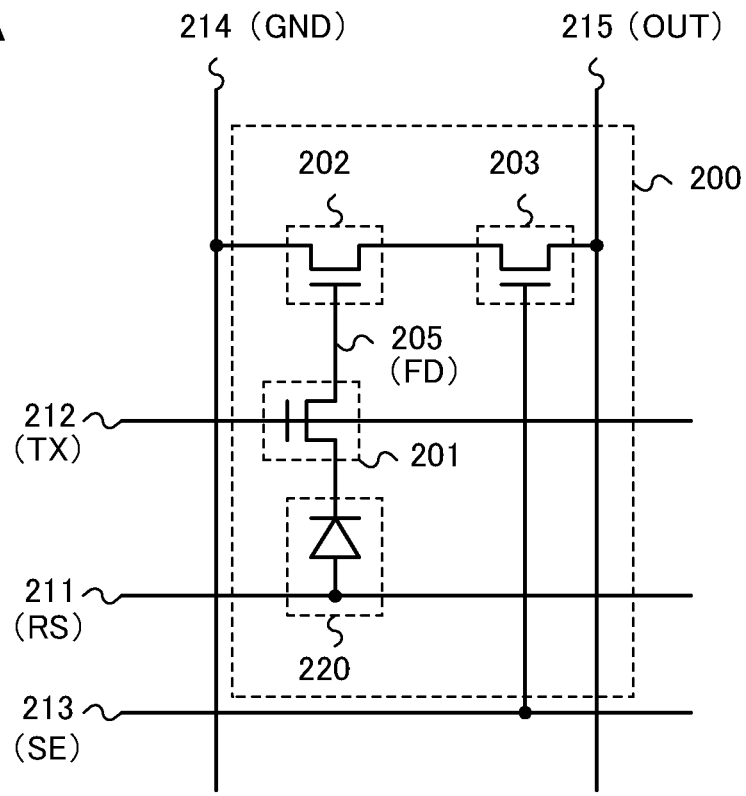
FIGS. 8A and 8B each illustrate a configuration of a pixel circuit.

FIG. 8A shows an example of a circuit which can be used as the pixel circuit 110. A circuit 200 includes a photodiode 220, a first transistor 201, a second transistor 202, and a third transistor 203.

An anode of the photodiode 220 is electrically connected to a first wiring 211 (RS); a cathode of the photodiode 220 is electrically connected to one of a source and a drain of the first transistor 201; the other of the source and the drain of the first transistor 201 is electrically connected to a wiring 205 (FD); a gate of the first transistor 201 is electrically connected to a second wiring 212 (TX); one of a source and a drain of the second transistor 202 is electrically connected to a fourth wiring 214 (GND); the other of the source and the drain of the second transistor 202 is electrically connected to one of a source and a drain of the third transistor 203; a gate of the second transistor 202 is electrically connected to the wiring 205 (FD); the other of the source and the drain of the third transistor 203 is electrically connected to a fifth wiring 215 (OUT); and a gate of the third transistor 203 is electrically connected to a third wiring 213 (SE).

The photodiode 220 is a light-receiving element and generates current corresponding to the amount of light incident on the pixel circuit. The electrical charge generated by the photodiode 220 is accumulated in the wiring 205 (FD) by the first transistor 201. The second transistor 202 outputs a signal corresponding to a potential of the wiring 205 (FD). The third transistor 203 controls selection of the pixel circuits at the time of reading.

Note that the wiring 205 (FD) is a charge retention node, that is, a charge accumulation portion retaining an electrical charge whose amount changes depending on the amount of light received by the photodiode 220. Practically, the charge accumulation portion is depletion layer capacitance in the vicinity of a source region or a drain region of the first transistor 201 electrically connected to the wiring 205 (FD), wiring capacitance of the wiring 205 (FD), gate capacitance of the second transistor 202 electrically connected to the wiring 205 (FD), and the like.

The first wiring 211 (RS) is a signal line for resetting the wiring 205 (FD). The first wiring 211 (RS) in the circuit 200 is also a signal line for performing charge accumulation in the wiring 205 (FD). The second wiring 212 (TX) is a signal line for controlling the first transistor 201. The third wiring 213 (SE) is a signal line for controlling the third transistor 203. The fourth wiring 214 (GND) is a signal line for setting a reference potential (e.g., GND). The fifth wiring 215 (OUT) is a signal line for reading data obtained in the circuit 200.

Figure 8B:
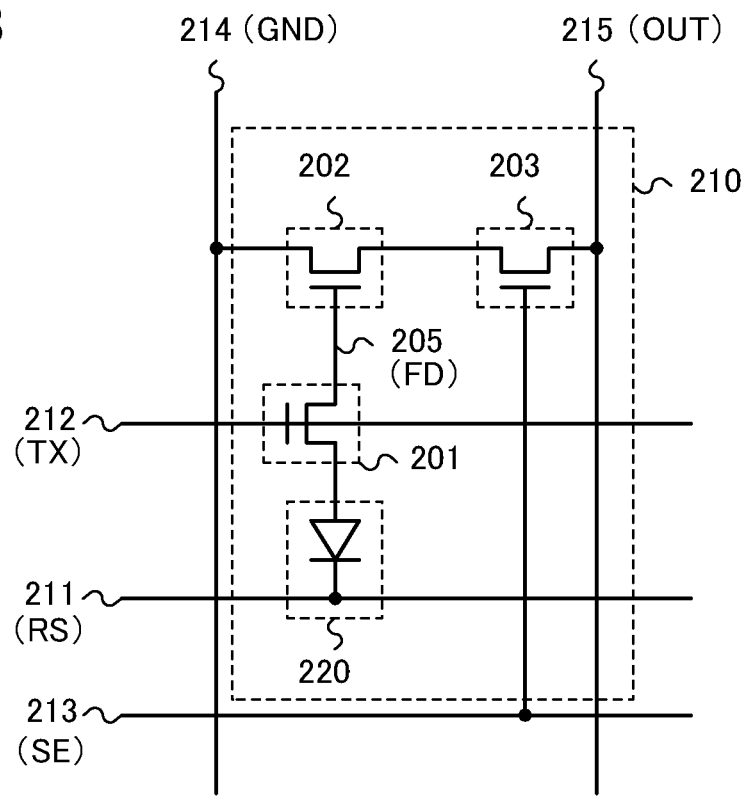

The pixel circuit 110 may have a configuration illustrated in FIG. 8B. A circuit 210 illustrated in FIG. 8B includes the same components as those in the circuit 200 in FIG. 8A but is different from the circuit 200 in that the anode of the photodiode 220 is electrically connected to one of the source and the drain of the first transistor 201 and the cathode of the photodiode 220 is electrically connected to the first wiring 211 (RS).

Next, a structure of each element illustrated in FIGS. 8A and 8B is described.

The photodiode 220 can be formed using a silicon semiconductor with a pn junction or a pin junction, for example. In the case where a scintillator emits visible light, a pin photodiode including an i-type semiconductor layer formed of amorphous silicon is preferably used. Since amorphous silicon has high spectral sensitivity in a visible light wavelength region, weak visible light can be easily sensed.

Note that in this specification, an i-type semiconductor refers not only to what is called an intrinsic semiconductor in which the Fermi level lies in the middle of the band gap, but also to a semiconductor in which the concentration of an impurity imparting p-type conductivity and the concentration of an impurity imparting n-type conductivity are less than or equal to $1 \times 10^{20}$ atoms/cm$^3$ and in which the photoconductivity is higher than the dark conductivity.

Although a silicon semiconductor such as amorphous silicon, microcrystalline silicon, polycrystalline silicon, or single crystal silicon can be used to form the first transistor 201, the second transistor 202, and the third transistor 203, an oxide semiconductor is preferably used to form the first transistor 201, the second transistor 202, and the third transistor 203. A transistor in which a channel formation region is formed of an oxide semiconductor has an extremely low off-state current.

In particular, when the first transistor 201 connected to the wiring 205 (FD) has a large leakage current, electrical charges accumulated in the wiring 205 (FD) cannot be retained for a sufficiently long time; thus, at least the first transistor 201 is preferably formed using an oxide semiconductor. The use of the transistor using an oxide semiconductor can prevent unwanted output of electrical charges through the photodiode.

Unwanted output of electrical charges also occurs in the fourth wiring 214 or the fifth wiring 215 when the second transistor 202 and the third transistor 203 have a large leakage current; thus, a transistor in which a channel formation region is formed of an oxide semiconductor is preferably used as these transistors.

Next, an example of the operation of the circuit 200 in FIG. 8A is described with reference to a timing chart in FIG. 9A.

In FIG. 9A, a potential of each wiring is denoted as a signal which varies between two levels for simplicity. Note that in practice, the potential can have various levels depending on circumstances without limitation on two levels because each potential is an analog signal. In the drawing, a signal 301 corresponds to a potential of the first wiring 211 (RS); a signal 302, a potential of the second wiring 212 (TX); a signal 303, a potential of the third wiring 213 (SE); a signal 304, a potential of the wiring 205 (FD); and a signal 305, a potential of the fifth wiring 215 (OUT).

At time A, the potential of the first wiring 211 (signal 301) is set high and the potential of the second wiring 212 (signal 302) is set high, whereby a forward bias is applied to the photodiode 220 and the potential of the wiring 205 (signal 304) is set high. In other words, the potential of the charge accumulation portion is initialized to the potential of the first wiring 211 and brought into a reset state. The above is the start of a reset operation. Note that the potential of the fifth wiring 215 (signal 305) is precharged to high level.

At time B, the potential of the first wiring 211 (signal 301) is set low and the potential of the second wiring 212 (signal 302) is set high, so that the reset operation is terminated and an accumulation operation is started. Here, a reverse bias is applied to the photodiode 220, whereby the potential of the wiring 205 (signal 304) is started to decrease due to a reverse current. Since the reverse current is increased when the photodiode 220 is irradiated with light, the rate of decrease in the potential of the wiring 205 (signal 304) changes depending on the amount of the light irradiation. In other words, channel resistance between the source and the drain of the second transistor 202 changes depending on the amount of light emitted to the photodiode 220.

Note that the light emitted to the photodiode 220 refers to the light which is converted from radiations such as X-rays by the scintillator.

At time C, the potential of the second wiring 212 (signal 302) is set low to terminate the accumulation operation, so that the potential of the wiring 205 (signal 304) becomes constant. Here, the potential is determined by the amount of electrical charge generated by the photodiode 220 during the accumulation operation. That is, the potential changes depending on the amount of light emitted to the photodiode 220. Further, since the first transistor 201 is a transistor which includes a channel formation region formed of an oxide semiconductor layer and which has an extremely low off-state current, the potential of the wiring 205 can be kept constant until a subsequent selection operation (read operation) is terminated.

Note that in some cases, the potential of the wiring 205 changes due to parasitic capacitance between the second wiring 212 and the wiring 205 when the potential of the second wiring 212 (signal 302) is set low. In the case where the potential changes significantly, the amount of electrical charge generated by the photodiode 220 during the accumulation operation cannot be obtained accurately. Examples of effective measures to reduce the amount of change in the potential include reducing the capacitance between the gate and the source (or between the gate and the drain) of the first transistor 201, increasing the gate capacitance of the second transistor 202, and providing a storage capacitor to connect the wiring 205. Note that in this embodiment, the change in the potential can be ignored by the adoption of these measures.

At time D, the potential of the third wiring 213 (signal 303) is set high to turn on the third transistor 203, whereby the selection operation is started and the fourth wiring 214 and the fifth wiring 215 are electrically connected to each other through the second transistor 202 and the third transistor 203. Also, the potential of the fifth wiring 215 (signal 305) is started to decrease. Note that precharge of the fifth wiring 215 only needs to be terminated before time D. Here, the rate of decrease in the potential of the fifth wiring 215 (signal 305) depends on the current between the source and the drain of the second transistor 202. That is, the potential changes depending on the amount of light emitted to the photodiode 220 during the accumulation operation.

At time E, the potential of the third wiring 213 (signal 303) is set low to turn off the third transistor 203, so that the selection operation is terminated and the potential of the fifth wiring 215 (signal 305) becomes a constant value. Here, the constant value changes depending on the amount of light emitted to the photodiode 220. Therefore, the amount of light emitted to the photodiode 220 during the accumulation operation can be known by obtaining the potential of the fifth wiring 215.

Specifically, the stronger the light emitted to the photodiode 220 is, the lower the potential of the wiring 205 is and the lower a gate voltage of the second transistor 202 is, resulting in a gradual decrease in the potential of the fifth wiring 215 (signal 305). Thus, a relatively high potential can be read from the fifth wiring 215.

Conversely, the weaker the light emitted to the photodiode 220 is, the higher the potential of the wiring 205 is and the higher the gate voltage of the second transistor 202 is, resulting in a rapid decrease in the potential of the fifth wiring 215 (signal 305). Thus, a relatively low potential can be read from the fifth wiring 215.

Next, an example of the operation of the circuit 210 in FIG. 8B is described with reference to a timing chart in FIG. 9B.

At time A, the potential of the first wiring 211 (signal 301) is set low and the potential of the second wiring 212 (signal 302) is set high, whereby a forward bias is applied to the photodiode 220 and the potential of the wiring 205 (signal 304) is set low. In other words, the potential of the charge accumulation portion is brought into a reset state. The above is the start of a reset operation. Note that the potential of the fifth wiring 215 (signal 305) is precharged to high level.

At time B, the potential of the first wiring 211 (signal 301) is set high and the potential of the second wiring 212 (signal 302) is set high, so that the reset operation is terminated and an accumulation operation is started. Here, a reverse bias is applied to the photodiode 220, whereby the potential of the wiring 205 (signal 304) is started to increase due to a reverse current. Since the reverse current is increased when the photodiode 220 is irradiated with light, the rate of increase in the potential of the wiring 205 (signal 304) changes depending on the amount of the light irradiation. In other words, channel resistance between the source and the drain of the second transistor 202 changes depending on the amount of light emitted to the photodiode 220.

The description of the timing chart of FIG. 9A can be referred to for operations during and after time C. The amount of light emitted to the photodiode 220 during the accumulation operation can be known by obtaining the potential of the fifth wiring 215 at time E.

Figure 10A:
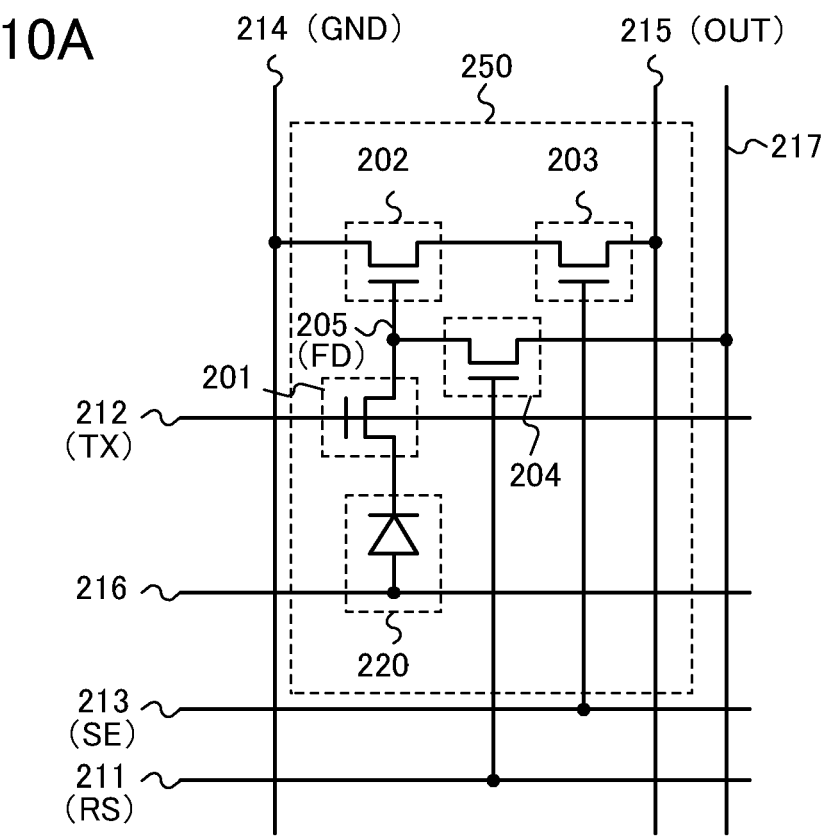
FIGS. 10A and 10B each illustrate a configuration of a pixel circuit.
Figure 10B:
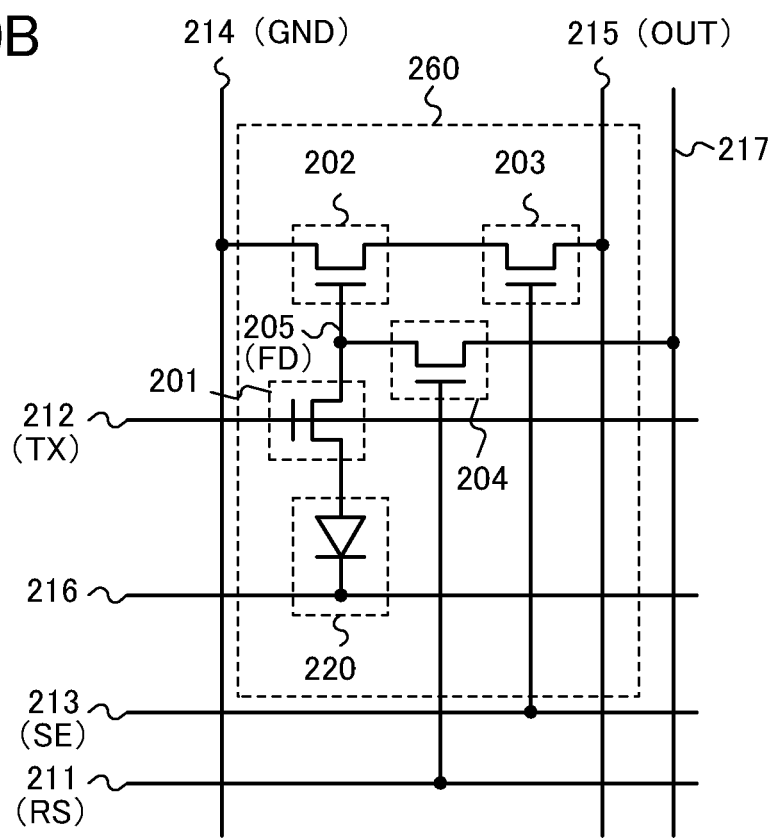

Further, the pixel circuit 110 may have a configuration illustrated in FIG. 10A or FIG. 10B.

A circuit 250 illustrated in FIG. 10A has a configuration in which a fourth transistor 204 is added to the circuit 200 in FIG. 8A. A gate of the transistor is electrically connected to the first wiring 211 (RS); one of a source and a drain of the transistor, the wiring 205 (FD); the other of the source and the drain of the transistor, a seventh wiring 217; and the anode of the photodiode 220, a sixth wiring 216. Here, the sixth wiring 216 is a signal line (low potential line) for applying a reverse bias to the photodiode 220 all the time. The seventh wiring

217 is a signal line (high potential line) for resetting the wiring 205 so that the wiring 205 has a high potential.

The fourth transistor 204 serves as a reset transistor for resetting the wiring 205 (FD). Hence, unlike in the circuit 200 in FIG. 8A, the reset operation using the photodiode 220 is not performed and a reverse bias is applied to the photodiode all the time. The wiring 205 (FD) can be reset by setting the potential of the first wiring 211 (RS) high. Operations of the circuit 250 are the same as those of the circuit 200 in FIG. 8A, which are illustrated in the timing chart in FIG. 9A.

A circuit 260 illustrated in FIG. 10B has a configuration in which the fourth transistor 204 is added to the circuit 210 in FIG. 8B. The gate of the transistor is electrically connected to the first wiring 211 (RS); one of the source and the drain of the transistor, the wiring 205 (FD); the other of the source and the drain of the transistor, the seventh wiring 217; and the cathode of the photodiode 220, the sixth wiring 216. Here, the sixth wiring 216 is a signal line (high potential line) for applying a reverse bias to the photodiode 220 all the time. The seventh wiring 217 is a signal line (low potential line) for resetting the wiring 205 so that the wiring 205 has a low potential.

The fourth transistor 204 serves as a reset transistor for resetting the wiring 205 (FD). Hence, unlike in the circuit 210 in FIG. 8B, the reset operation using the photodiode 220 is not performed and a reverse bias is applied to the photodiode all the time. The wiring 205 (FD) can be reset by setting the potential of the first wiring 211 (RS) high. The circuit 260 can operate in accordance with a timing chart in FIG. 9C.

The fourth transistor 204 can be formed using a silicon semiconductor such as amorphous silicon, microcrystalline silicon, polycrystalline silicon, or single crystal silicon; however, when the fourth transistor 204 has a large leakage current, electrical charges cannot be retained in the charge accumulation portion for a sufficiently long time. For this reason, a transistor formed using an oxide semiconductor and having an extremely low off-state current is preferably used as the fourth transistor 204, as in the case of the first transistor 201.

Figure 11:
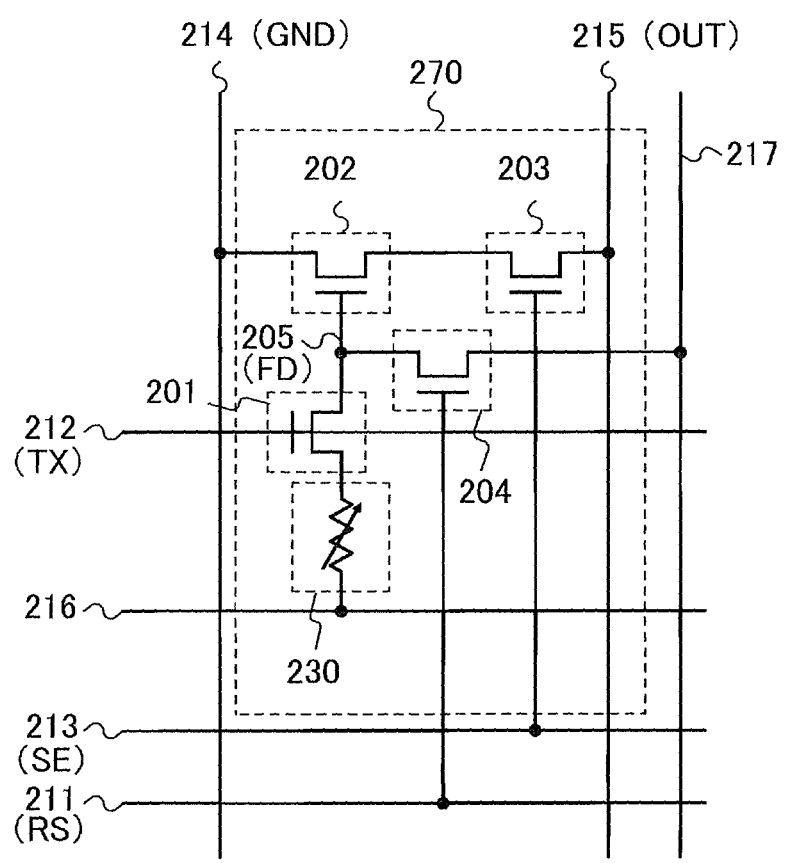
FIG. 11 illustrates a configuration of a pixel circuit.

Further, the pixel circuit 110 may have a configuration illustrated in FIG. 11. A circuit 270 in FIG. 11 has the same configuration as that in FIG. 8A or FIG. 8B except that as a light-receiving sensor element, a variable resistor 230 is used instead of the photodiode. For the variable resistor, a pair of electrodes and an i-type semiconductor layer provided between the pair of electrodes can be used.

For example, the resistance changes due to visible light irradiation when an i-type amorphous silicon layer is used as the semiconductor layer; thus, the potential of the wiring 205 can be changed as in the case of using the photodiode, which enables the amount of light emitted to the variable resistor 230 during the accumulation operation to be known. Further, as the i-type semiconductor layer, an oxide semiconductor layer having a band gap of 3 eV or more may be used. Since the resistance of the oxide semiconductor layer changes due to ultraviolet light irradiation, the potential of the wiring 205 can be changed, which enables the amount of light emitted to the variable resistor 230 during the accumulation operation to be known. In order to select wavelength of the light emitted to the variable resistor 230, the type of the scintillator 180 may be changed.

By setting the potential of the sixth wiring 216 low and the seventh wiring 217 high, the circuit 270 in FIG. 11 can operate in accordance with the timing chart in FIG. 9A. Further, by setting the potential of the sixth wiring 216 high and the seventh wiring 217 low, the circuit 270 can operate in accordance with the timing chart in FIG. 9C.

Figure 12:
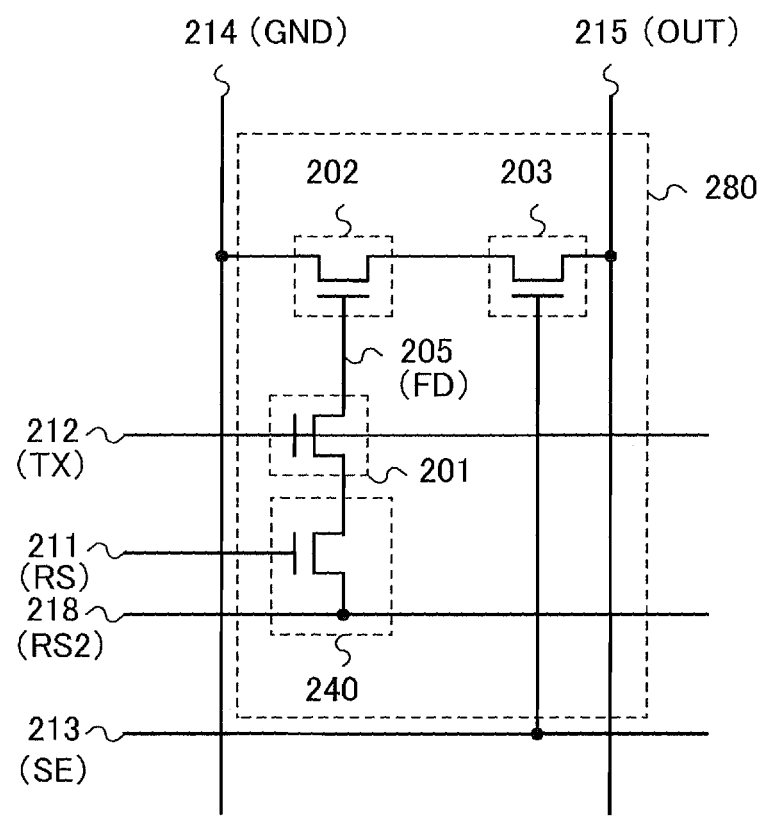
FIG. 12 illustrates a configuration of a pixel circuit.

The pixel circuit 110 may have a configuration illustrated in FIG. 12.

A circuit 280 in FIG. 12 has the same configuration as that of the circuit 200 in FIG. 8A except that a transistor 240 is used instead of the photodiode 220. A gate of the transistor is electrically connected to the first wiring 211 (RS), one of a source and a drain of the transistor is electrically connected to one of the source and the drain of the first transistor 201, and the other of the source and the drain of the transistor is electrically connected to an eighth wiring (RS2).

In the transistor 240, the amount of current flowing in an off state changes due to light irradiation (the higher the irradiation intensity of light is, the larger the amount of current flows is). Thus, by applying voltage to the gate so that the transistor 240 is in the off state, the transistor 240 can be in a state similar to a reverse bias state of a photodiode and can operate as a light-receiving element. It is not necessary to form a photodiode additionally; therefore, an imaging device can be formed at low cost.

As the transistor 240, a transistor whose off-state current is extremely low is used, whereby the dynamic range can be increased. As the transistor, a transistor including an oxide semiconductor, which can be used as the first transistor 201 to the third transistor 203, is preferably used.

Figure 31:
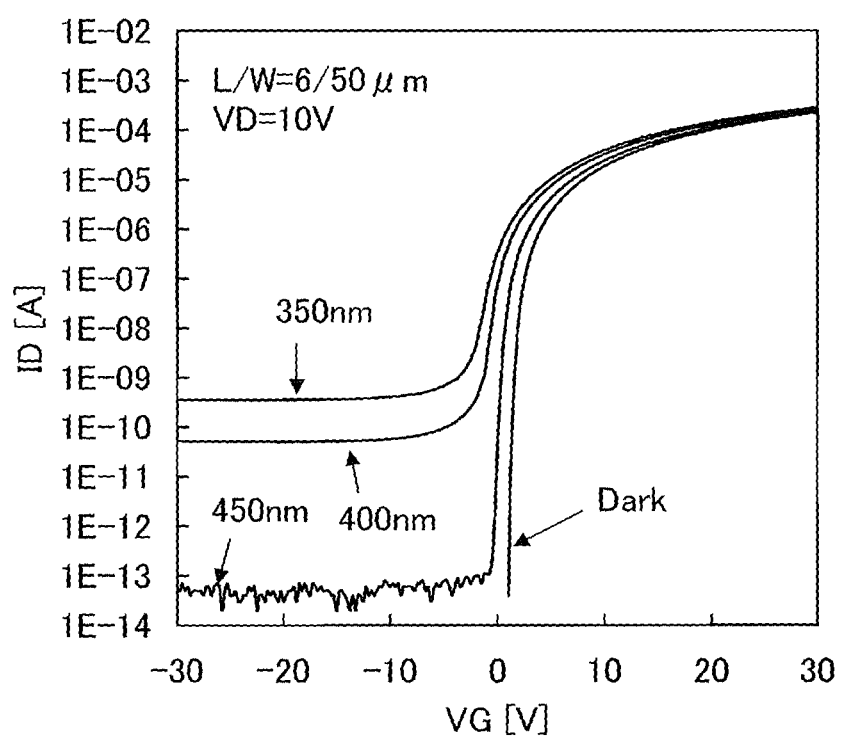
FIG. 31 shows change in $I_d$-$V_g$ characteristics of a transistor due to ultraviolet irradiation.

Further, when the transistor 240 used as a light-receiving element is formed using an oxide semiconductor having a band gap of 3 eV or more, the amount of the off state current of the transistor is greatly changed due to irradiation with ultraviolet light. That is, the transistor can operate as an ultraviolet light sensor. FIG. 31 shows $I_d$-$V_g$ characteristics when a transistor whose channel formation region is formed using an In—Ga—Zn oxide is irradiated with ultraviolet rays with different wavelengths. It is found that the shorter the wavelength is, the higher the current value in an off state is and the easier the transistor is reacted to the ultraviolet rays.

Next, an example of the operation of the circuit 280 in FIG. 12 is described with reference to a timing chart in FIG. 13A.

In the drawing, a signal 301 corresponds to a potential of the first wiring 211 (RS); a signal 302, a potential of the second wiring 212 (TX); a signal 303, a potential of the third wiring 213 (SE); a signal 304, a potential of the wiring 205 (FD); a signal 305, a potential of the fifth wiring 215 (OUT); and a signal 308, a potential of the eighth wiring 218.

At time A, the potential of the first wiring 211 (signal 301) is set high, the potential of the second wiring 212 (signal 302) is set high, and the potential of the eighth wiring 218 (signal 308) is set high, whereby the transistor 240 is in an on state, and the potential of the wiring 205 (signal 304) is set high. In other words, the potential of the charge accumulation portion is initialized to the potential of the eighth wiring 218 and brought into a reset state. The above is the start of a reset operation. Note that the potential of the fifth wiring 215 (signal 305) is precharged to a high level.

At time B, the potential of the first wiring 211 (signal 301) is set low, the potential of the second wiring 212 (signal 302) is set high, and the potential of the eighth wiring 218 (signal 308) is set low, so that the reset operation is terminated and an accumulation operation is started. Here, the transistor 240 is in an off state; however, the current flowing between the source and the drain of the transistor 240 is changed due to light irradiation, whereby the potential of the wiring 205 (signal 304) is started to decrease. Since the off-state current is increased when the transistor 240 is irradiated with light, the rate of decrease in the potential of the wiring 205 (signal 304) varies with the amount of the light irradiation. In other words, channel resistance between the source and the drain of the second transistor 202 varies with the amount of light emitted to the transistor 240.

Note that the light emitted to the transistor 240 refers to the light which is converted from radiations such as X-rays by the scintillator.

At time C, the potential of the second wiring 212 (signal 302) is set low to terminate the accumulation operation, so that the potential of the wiring 205 (signal 304) becomes constant. Here, the potential varies with the amount of light emitted to the transistor 240 during the accumulation operation. Further, since the first transistor 201 is a transistor which includes a channel formation region formed of an oxide semiconductor layer and which has an extremely low off-state current, the potential of the wiring 205 can be kept constant until a subsequent selection operation (read operation) is terminated.

At time D, the potential of the third wiring 213 (signal 303) is set high to turn on the third transistor 203, whereby the selection operation is started and the fourth wiring 214 and the fifth wiring 215 are electrically connected to each other through the second transistor 202 and the third transistor 203. Also, the potential of the fifth wiring 215 (signal 305) is started to decrease. Note that precharge of the fifth wiring 215 only needs to be terminated before time D. Here, the rate of decrease in the potential of the fifth wiring 215 (signal 305) depends on the current between the source and the drain of the second transistor 202. That is, the potential varies with the amount of light emitted to the transistor 240 during the accumulation operation.

At time E, the potential of the third wiring 213 (signal 303) is set low to turn off the third transistor 203, so that the selection operation is terminated and the potential of the fifth wiring 215 (signal 305) becomes a constant value. Here, the constant value varies with the amount of light emitted to the transistor 240. Therefore, the amount of light emitted to the transistor 240 during the accumulation operation can be known by obtaining the potential of the fifth wiring 215.

Figure 13A:
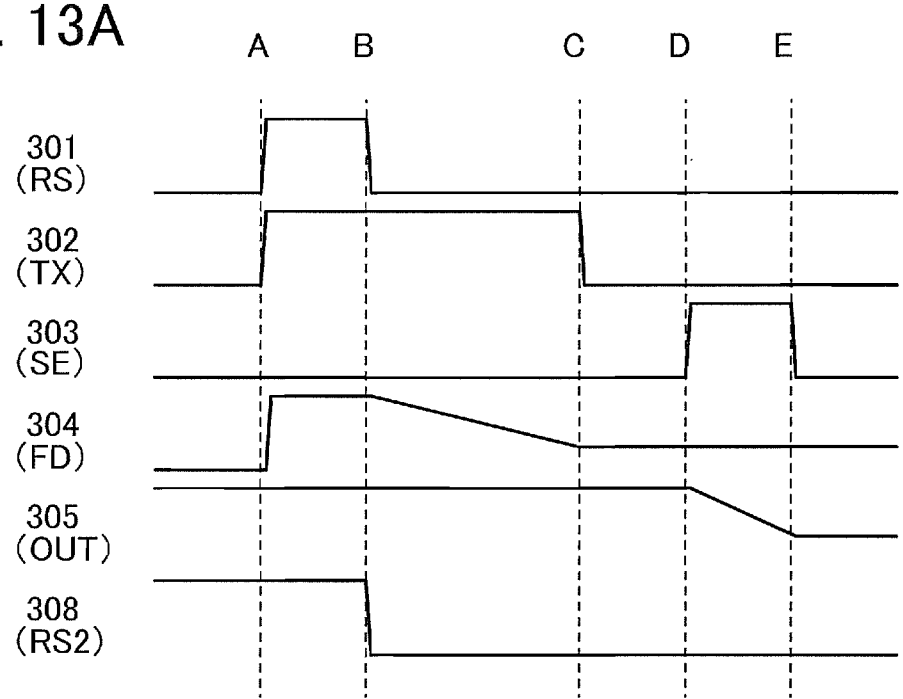
FIGS. 13A and 13B are timing charts each illustrating the operation of a pixel circuit.
Figure 13B:
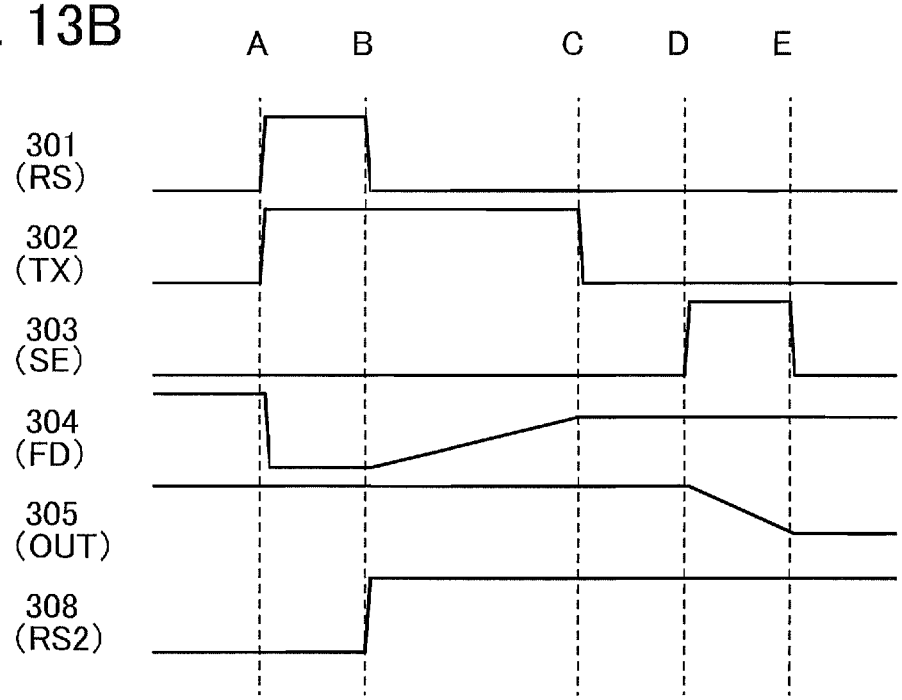

Alternatively, the circuit 280 in FIG. 12 can be operated also by using a timing chart in FIG. 13B.

At time A, the potential of the first wiring 211 (signal 301) is set high, the potential of the second wiring 212 (signal 302) is set high, and the potential of the eighth wiring 218 (signal 308) is set low, whereby the transistor 240 is in an on state, and the potential of the wiring 205 (signal 304) is set low. In other words, the potential of the charge accumulation portion is initialized to the potential of the eighth wiring 218 and brought into a reset state. The above is the start of a reset operation. Note that the potential of the fifth wiring 215 (signal 305) is precharged to a high level.

At time B, the potential of the first wiring 211 (signal 301) is set low, the potential of the second wiring 212 (signal 302) is set high, and the potential of the eighth wiring 218 (signal 308) is set high, so that the reset operation is terminated and an accumulation operation is started. Here, the transistor 240 is in an off state; however, the current flowing between the source and the drain of the transistor 240 is changed due to light emission, whereby the potential of the wiring 205 (signal 304) is started to increase. Since the off-state current is increased when the transistor 240 is irradiated with light, the rate of increase in the potential of the wiring 205 (signal 304) varies with the amount of the light irradiation. In other words, channel resistance between the source and the drain of the second transistor 202 varies with the amount of light emitted to the transistor 240.

The description of the timing chart of FIG. 13A can be referred to for operations during and after time C. The amount of light emitted to the transistor 240 during the accumulation operation can be known by obtaining the potential of the fifth wiring 215 at time E.

Figure 14:
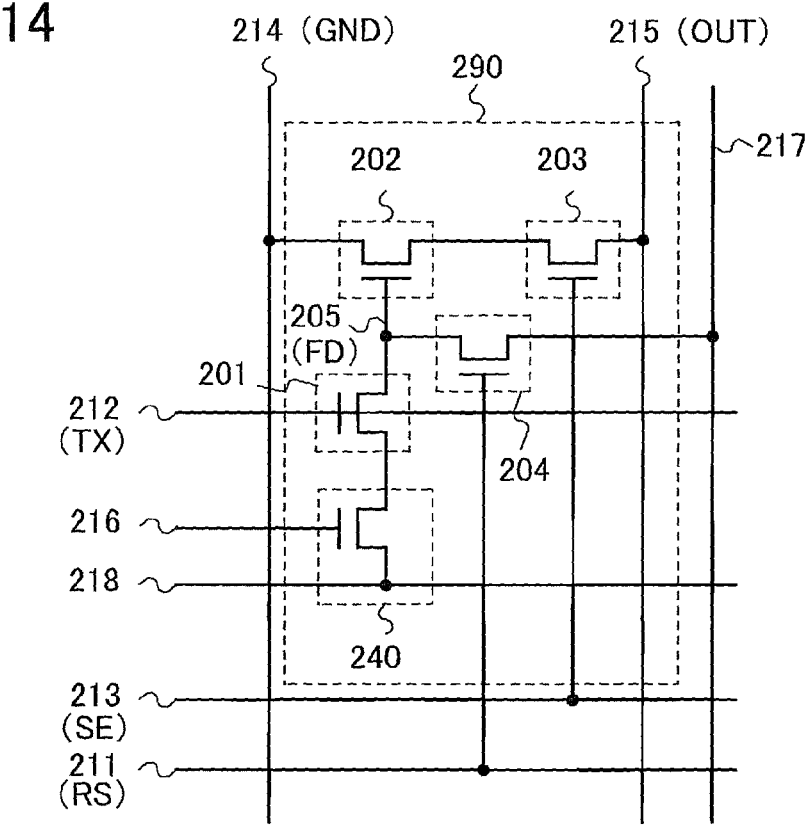
FIG. 14 illustrates a configuration of a pixel circuit.

The pixel circuit 110 may have a configuration illustrated in FIG. 14.

A circuit 290 in FIG. 14 has the same configuration as that of the circuit 250 in FIG. 10A except that the transistor 240 is used instead of the photodiode 220. A gate of the transistor is electrically connected to the sixth wiring 216, one of a source and a drain of the transistor is electrically connected to one of the source and the drain of the first transistor 201, and the other of the source and the drain of the transistor is electrically connected to the eighth wiring.

By setting the potential of the sixth wiring 216 always low, the seventh wiring 217 always high, and the eighth wiring 218 always low, the circuit 290 in FIG. 14 can operate in accordance with the timing chart in FIG. 9A. Further, by setting the potential of the sixth wiring 216 always low, the seventh wiring 217 always low, and the eighth wiring 218 always high, the circuit 290 can operate in accordance with the timing chart in FIG. 9C.

Figure 15A:
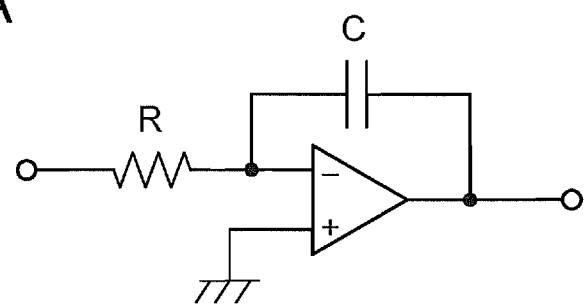
FIGS. 15A to 15C each illustrate an integrator circuit.
Figure 15B:
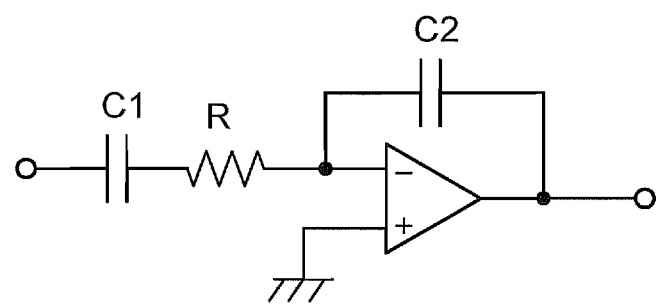
Figure 15C:
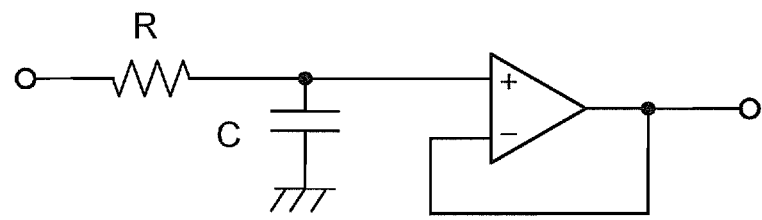

Note that in an example of a circuit which can be used as the pixel circuit 110, the fifth wiring 215 (OUT) may be connected to an integrator circuit illustrated in FIG. 15A, 15B, or 15C. The circuit enables an S/N ratio of a reading signal to be increased, which makes it possible to sense weaker light, that is, to increase the sensitivity of the imaging device.

FIG. 15A illustrates an integrator circuit using an operational amplifier circuit (also referred to as an op-amp). An inverting input terminal of the operational amplifier circuit is connected to the fifth wiring 215 (OUT) through a resistor R. A non-inverting input terminal of the operational amplifier circuit is grounded. An output terminal of the operational amplifier circuit is connected to the inverting input terminal of the operational amplifier circuit through a capacitor C.

Here, the operational amplifier circuit is assumed to be an ideal operational amplifier circuit. In other words, it is assumed that input impedance is infinite (the input terminals draw no current). Since the potential of the non-inverting input terminal and the potential of the inverting input terminal are equal in a steady state, the potential of the inverting input terminal can be considered as a ground potential.

Equations (1) to (3) are satisfied, where Vi is the potential of the fifth wiring 215 (OUT), Vo is the potential of the output terminal of the operational amplifier circuit, i1 is a current flowing through the resistor R, and i2 is a current flowing through the capacitor C.

$$Vi = i1 \cdot R \qquad (1)$$

$$i2 = C \cdot dVo/dt \qquad (2)$$

$$i1 + i2 = 0 \qquad (3)$$

Here, when electrical charge in the capacitor C is discharged at the time t=0, the potential Vo of the output terminal of the operational amplifier circuit at the time t=t is expressed by Equation (4).

$$Vo = -(1/CR)\int Vi\, dt \qquad (4)$$

In other words, with a longer time t (integral time), the potential (Vi) to be read can be raised and output as the output signal Vo. Moreover, lengthening of the time t corresponds to averaging of thermal noise or the like and can increase an S/N ratio of the output signal Vo.

In a real operational amplifier circuit, a bias current flows even when a signal is not input to the input terminals, so that an output voltage is generated at the output terminal and electrical charge is accumulated in the capacitor C. It is therefore effective to connect a resistor in parallel with the capacitor C so that the capacitor C can be discharged.

FIG. 15B illustrates an integrator circuit including an operational amplifier circuit having a structure different from that in FIG. 15A. An inverting input terminal of the operational amplifier circuit is connected to the fifth wiring 215 (OUT) through a resistor R and a capacitor C1. A non-inverting input terminal of the operational amplifier circuit is grounded. An output terminal of the operational amplifier circuit is connected to the inverting input terminal of the operational amplifier circuit through a capacitor C2.

Here, the operational amplifier circuit is assumed to be an ideal operational amplifier circuit. In other words, it is assumed that input impedance is infinite (the input terminals draw no current). Since the potential of the non-inverting input terminal and the potential of the inverting input terminal are equal in a steady state, the potential of the inverting input terminal can be considered as a ground potential.

Equations (5) to (7) are satisfied, where Vi is the potential of the fifth wiring 215 (OUT), Vo is the potential of the output terminal of the operational amplifier circuit, i1 is a current flowing through the resistor R and the capacitor C1, and i2 is a current flowing through the capacitor C2.

$$Vi = (1/C1)\int i1\, dt + i1 \cdot R \tag{5}$$

$$i2 = C2 \cdot dVo/dt \tag{6}$$

$$i1 + i2 = 0 \tag{7}$$

Here, assuming that electrical charge in the capacitor C2 is discharged at the time t=0, as for the potential Vo of the output terminal of the operational amplifier circuit at the time t=t, Equation (9) corresponds to a high-frequency component when Inequality (8) is satisfied, and Equation (11) corresponds to a low-frequency component when Inequality (10) is satisfied.

$$Vo << dVo/dt \tag{8}$$

$$Vo = -(1/C2R)\int Vi\, dt \tag{9}$$

$$Vo >> dVo/dt \tag{10}$$

$$Vo = -C1/C2 \cdot Vi \tag{11}$$

In other words, by appropriately setting the capacitance ratio of the capacitor C1 to the capacitor C2, the potential (Vi) to be read can be raised and output as the output signal Vo. Further, a high-frequency noise component of the input signal can be averaged by time integration, and an S/N ratio of the output signal Vo can be increased.

In a real operational amplifier circuit, a bias current flows even when a signal is not input to the input terminals, so that an output voltage is generated at the output terminal and electrical charge is accumulated in the capacitor C2. It is thus effective to connect a resistor in parallel with the capacitor C2 so that the capacitor C2 can be discharged.

FIG. 15C illustrates an integrator circuit using an operational amplifier circuit having a structure different from those in FIGS. 15A and 15B. A non-inverting input terminal of the operational amplifier circuit is connected to the fifth wiring 215 (OUT) through a resistor R and is grounded through a capacitor C. An output terminal of the operational amplifier circuit is connected to an inverting input terminal of the operational amplifier circuit. The resistor R and the capacitor C constitute a CR integrator circuit. The operational amplifier circuit is a unity gain buffer.

When Vi is the potential of the fifth wiring 215 (OUT) and Vo is the potential of the output terminal of the operational amplifier circuit, Vo can be expressed by Equation (12). Although Vo is saturated at the value of Vi, a noise component included in the input signal Vi can be averaged by the CR integrator circuit, and as a result, an S/N ratio of the output signal Vo can be increased.

$$Vo = (1/CR)\int Vi\, dt \tag{12}$$

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention can be clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where there are several possible portions to which a terminal can be connected, it is not necessary to specify all the portions to which the terminal is connected. Thus, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least connection portions of a circuit are specified. Alternatively, it might be possible for those skilled in the art to specify the invention when at least a function of a circuit is specified. In other words, when a function of a circuit is specified, one embodiment of the present invention can be clear. Further, it can be determined that one embodiment of the invention whose function is specified is disclosed in this specification and the like. Thus, when not a function but connection portions of a circuit are specified, the circuit is disclosed as one embodiment of the invention, and one embodiment of the invention can be constituted. Alternatively, when not connection portions but a function of a circuit is specified, the circuit is disclosed as one embodiment of the invention, and one embodiment of the invention can be constituted.

Note that in this specification and the like, part of a diagram or a text described in one embodiment can be taken out to constitute one embodiment of the invention. Thus, in the case where a diagram or a text related to a certain part is described, a content taken out from the diagram or the text of the certain part is also disclosed as one embodiment of the invention and can constitute one embodiment of the invention. Therefore, for example, part of a diagram or a text including one or more of active elements (e.g., transistors and diodes), wirings, passive elements (e.g., capacitors and resistors), conductive layers, insulating layers, semiconductor layers, organic materials, inorganic materials, components, devices, operating methods, manufacturing methods, and the like can be taken out to constitute one embodiment of the invention. For example, M circuit elements (e.g., transistors or capacitors) (M is an integer) are picked up from a circuit diagram in which N circuit elements (e.g., transistors or capacitors) (N is an integer, where M<N) are provided, whereby one embodiment of the invention can be constituted. As another example, M layers (M is an integer) are picked up from a cross-sectional view in which N layers (N is an integer, where M<N) are provided, whereby one embodiment of the invention can be constituted. As another example, M elements (M is an integer) are picked up from a flow chart in which N elements (N is an integer, where M<N) are provided, whereby one embodiment of the invention can be constituted.

This embodiment can be combined with any of the other embodiments in this specification as appropriate.

(Embodiment 3)

In this embodiment, an example of a driving method of the pixel circuit described in Embodiment 2 is described.

As described in Embodiment 2, the operation of the pixel circuit is repetition of the reset operation, the accumulation operation, and the selection operation. In the imaging device using radiations such as X-rays, radiation exposure time is preferably as short as possible in consideration of influence of X-rays on the living body. To achieve irradiating with radiation and imaging in short time, it is necessary to perform the reset operation, the accumulation operation, and the selection operation of all the pixel circuits at high speed.

Figure 16A:
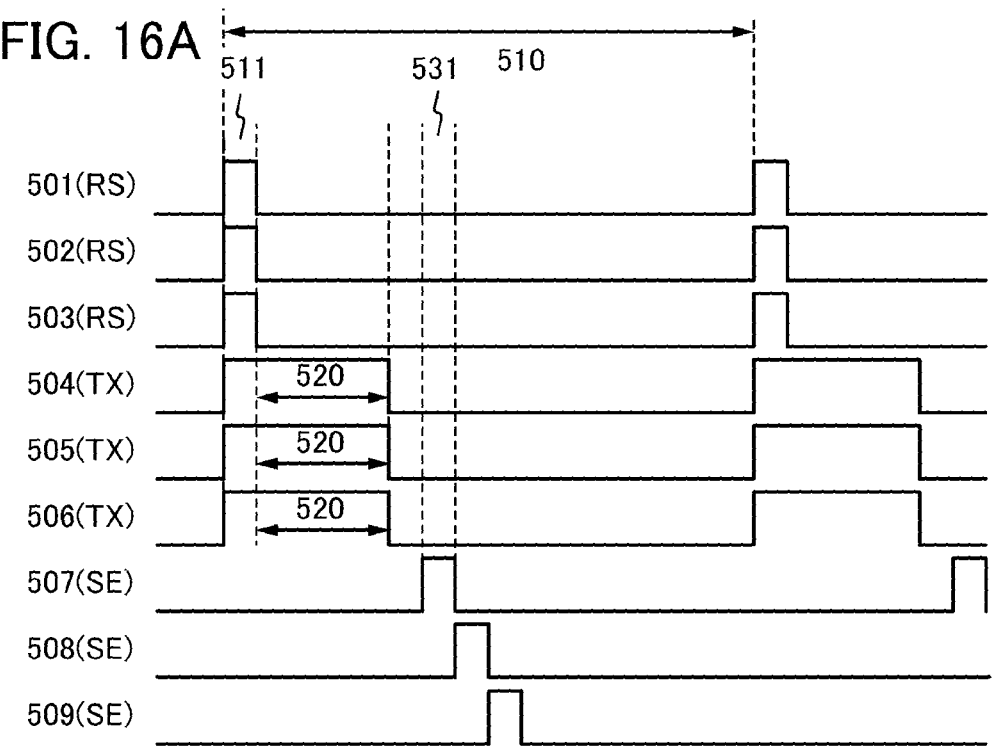
FIGS. 16A and 16B are timing charts illustrating the operations in a global shutter system and a rolling shutter system, respectively.

Thus, a driving method using a global shutter system illustrated in a timing chart in FIG. 16A is preferably used for imaging. Note that FIG. 16A shows operations of the imaging device in which a plurality of pixel circuits is arranged in a matrix and the pixel circuits are the circuits 200 in FIG. 8A, specifically, operations of the circuits 200 in FIG. 8A from the first row to the third row. Description of operation below can be referred to for the circuit 250 in FIG. 10A, the circuit 270 in FIG. 11, the circuit 280 in FIG. 12, and the circuit 290 in FIG. 14.

In FIG. 16A, a signal 501, a signal 502, and a signal 503 are signals input to the first wiring 211 (RS) connected to the pixel circuits in the first row, the second row, and the third row, respectively. A signal 504, a signal 505, and a signal 506 are signals input to the second wiring 212 (TX) connected to the pixel circuits in the first row, the second row, and the third row, respectively. A signal 507, a signal 508, and a signal 509 are signals input to the third wiring 213 (SE) connected to the pixel circuits in the first row, the second row, and the third row, respectively.

A period 510 is a period required for one imaging. In a period 511, the reset operation is performed in the pixel circuits in each row. In a period 520, the accumulation operation is performed in the pixel circuits in each row. Note that the selection operation is sequentially performed in the pixel circuits for each row. For example, in a period 531, the selection operation is performed in the pixel circuits in the first row. As described above, in the global shutter system, the reset operation is performed in all the pixel circuits substantially at the same time, the accumulation operation is performed in all the pixel circuits substantially at the same time, and then the read operation is sequentially performed for each row.

That is, in the global shutter system, since the accumulation operation is performed in all the pixel circuits substantially at the same time, imaging is simultaneously performed in the pixel circuits in all the rows. Thus, radiation irradiation in synchronization with the accumulation operation can shorten the time of the radiation irradiation to an object. That is, the radiation irradiation is performed only in the period 520.

Figure 16B:
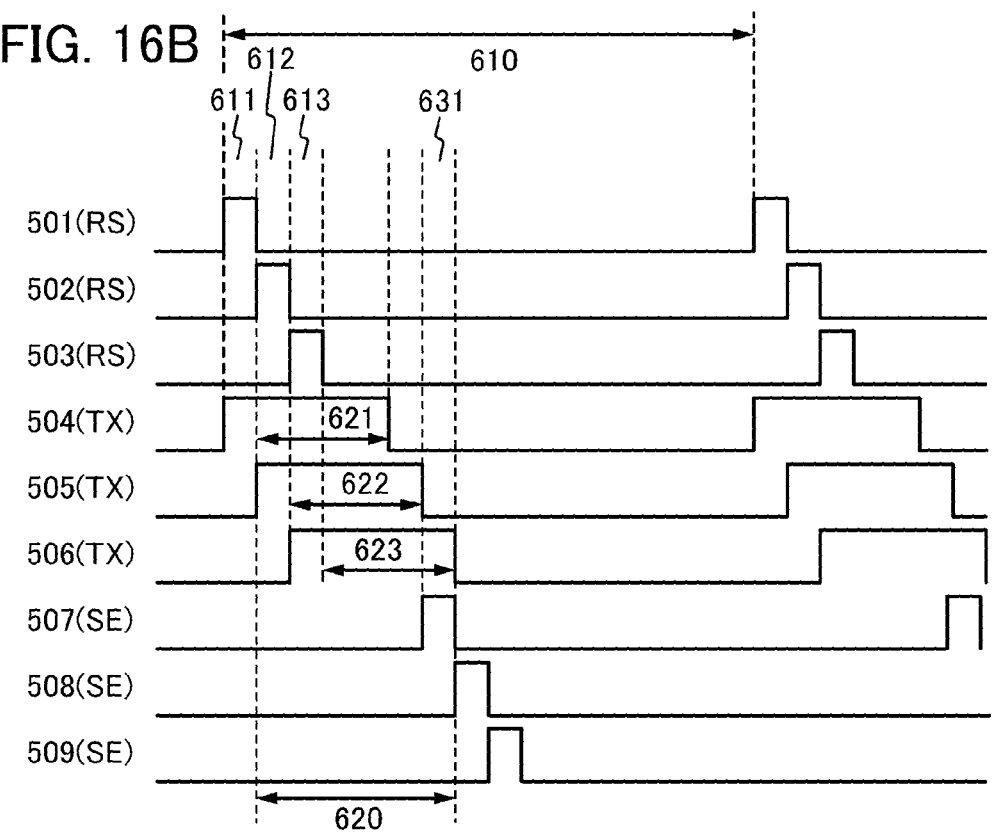

On the other hand, FIG. 16B is a timing chart of the case where a rolling shutter system is used. A period 610 is a period required for one imaging. A period 611, a period 612, and a period 613 are reset periods in the first row, the second row, and the third row, respectively. A period 621, a period 622, and a period 623 are accumulation operation periods in the first row, the second row, and the third row, respectively. In a period 631, the selection operation is performed in the pixel circuits in the first row. As described above, in the rolling shutter system, the accumulation operation is not performed at the same time in all the pixel circuits but is sequentially performed for each row; thus, imaging is not simultaneously performed in the pixel circuits in all the rows. For this reason, even when the radiation irradiation is synchronized with the accumulation operation, a radiation irradiation period 620 is longer than that in the global shutter system. However, by performing operations at high speed, a radiation irradiation period can be shortened even in the rolling shutter system; thus, the rolling shutter system can be used as a driving method of the imaging device of one embodiment of the present invention.

To realize the global shutter system, even after the accumulation operation, the potential of the wiring 205 (FD) in each pixel circuit needs to be kept for a long time until the read operation is terminated. As described above, when a transistor including a channel formation region formed of an oxide semiconductor and having an extremely low off-state current is used as the first transistor 201, the potential of the wiring 205 (FD) can be kept for a long time. On the other hand, in the case where a transistor including a channel formation region formed of a silicon semiconductor or the like is used as the first transistor 201, the potential of the wiring 205 (FD) cannot be kept for a long time because of a high off-state current, which makes it difficult to use the global shutter system; thus, the rolling shutter system has to be used.

As described above, the use of the transistor including a channel formation region formed of an oxide semiconductor in the pixel circuits makes it easy to realize the global shutter system, and thus the imaging device with a small amount of radiation emitted to an object can be provided.

This embodiment can be freely combined with any of the other embodiments in this specification.

(Embodiment 4)

In this embodiment, detailed description is given of configurations of the imaging devices described in Embodiment 1 and Embodiment 2. Examples of the configuration of the imaging device including pixel circuits arranged in a matrix with m rows and n columns are described with reference to FIGS. 17 to 24.

Figure 17:
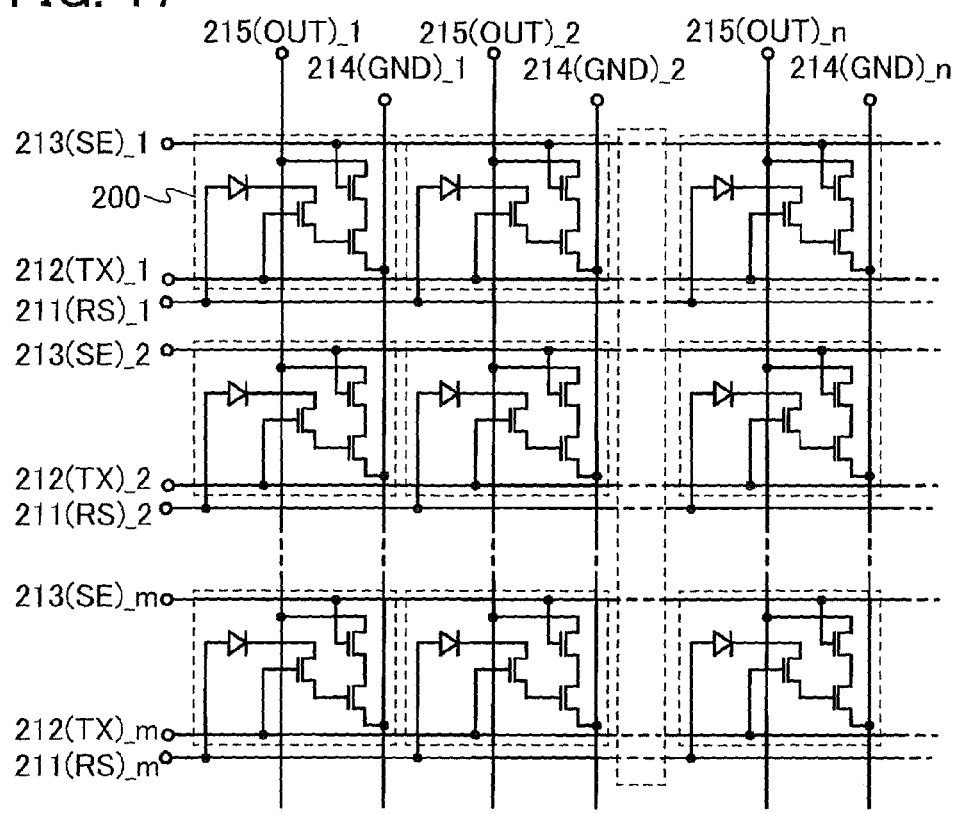
FIG. 17 is a circuit diagram of a plurality of pixel circuits arranged in a matrix.

FIG. 17 is an example of arranging a plurality of circuits 200 illustrated in FIG. 8A in a matrix with m (m is a natural number of two or more) rows and n (n is a natural number of two or more) columns Each of the circuits 200 is electrically connected to any one of a plurality of first wirings 211 (RS) (211(RS)_1 to 211(RS)_m), any one of a plurality of second wirings 212 (TX) (212(TX)_1 to 212(TX)_m), any one of a plurality of third wirings 213 (SE) (213(SE)_1 to 213(SE)_m), any one of a plurality of fourth wirings 214 (GND) (214(GND)_1 to 214(GND)_n), and any one of a plurality of fifth wirings 215 (OUT) (215(OUT)_1 to 215 (OUT)_n).

In FIG. 17, the circuits 200 in each row (a horizontal direction in the drawing) share the first wiring 211 (RS), the second wiring 212 (TX), and the third wiring 213 (SE). The circuits 200 in each column (a vertical direction in the drawing) share the fourth wiring 214 (GND) and the fifth wiring 215 (OUT). However, one embodiment of the present invention is not limited to this configuration. The two or more first wirings 211 (RS), the two or more second wirings 212 (TX), and the two or more third wirings 213 (SE) may be provided in each row to be electrically connected to the respective circuits 200. The two or more fourth wirings 214 (GND) and the two or more fifth wirings 215 (OUT) may be provided in each column to be electrically connected to the respective circuits 200.

Although the fourth wiring 214 (GND) is shared by the circuits 200 in each column in FIG. 17, the fourth wiring 214 (GND) may be shared by the circuits 200 in each row.

As described above, wirings are shared to reduce the number of wirings, so that a driver circuit for driving the circuits 200 arranged in a matrix with m rows and n columns can be simplified.

Figure 18:
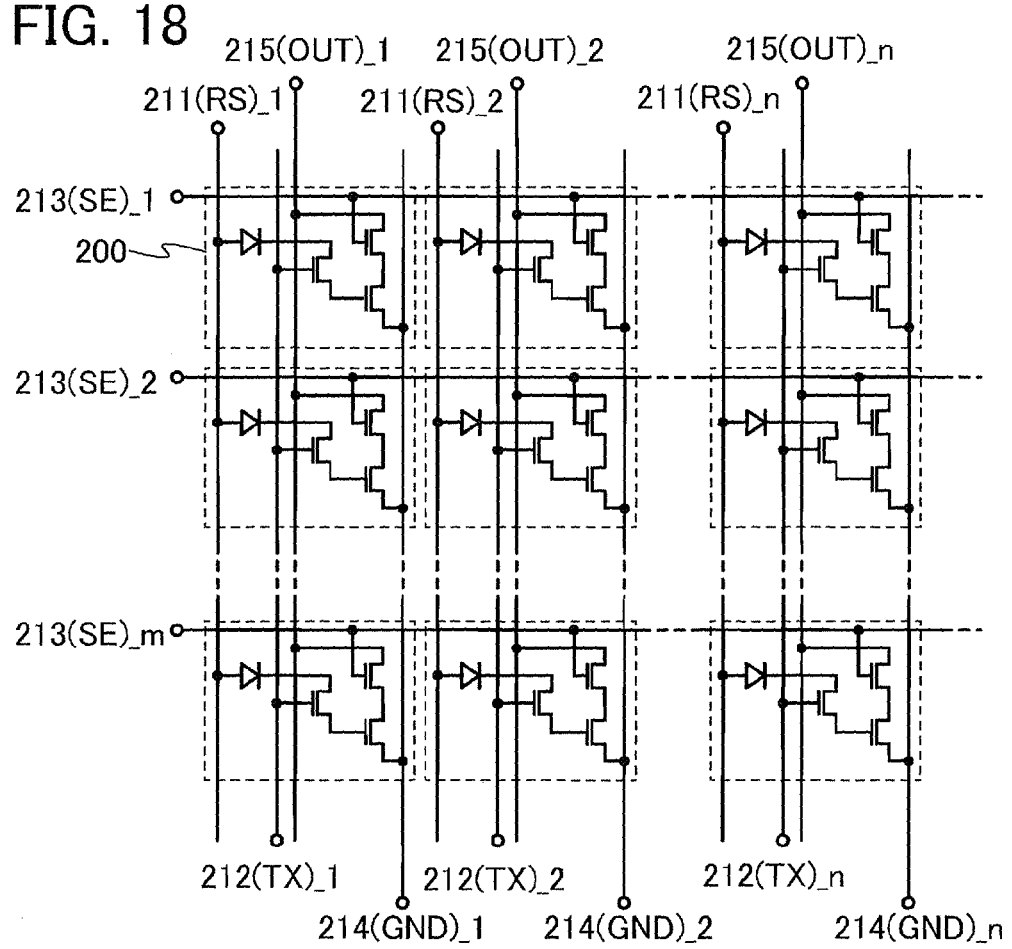
FIG. 18 is a circuit diagram of a plurality of pixel circuits arranged in a matrix.

In FIG. 18, the plurality of circuits 200 is arranged in a matrix with m rows and n columns. Each of the circuits 200 is electrically connected to any one of the plurality of first wirings 211 (RS) (211(RS)_1 to 211(RS)_n), any one of the plurality of second wirings 212 (TX) (212(TX)_1 to 212 (TX)_n), any one of the plurality of third wirings 213 (SE) (213(SE)_1 to 213(SE)_m), any one of the plurality of fourth wirings 214 (GND) (214(GND)_1 to 214(GND)_n), and any one of the plurality of fifth wirings 215 (OUT) (215(OUT)_1 to 215(OUT)_n).

In FIG. 18, the circuits 200 in each row share the third wiring 213 (SE). The circuits 200 in each column share the first wiring 211 (RS), the second wiring 212 (TX), the fourth wiring 214 (GND), and the fifth wiring 215 (OUT). However, one embodiment of the present invention is not limited to this configuration. The two or more third wirings 213 (SE) may be provided in each row to be electrically connected to the respective circuits 200. The two or more first wirings 211 (RS), the two or more second wirings 212 (TX), the two or more fourth wirings 214 (GND), and the two or more fifth wirings 215 (OUT) may be provided in each column to be electrically connected to the respective circuits 200.

Although the fourth wiring 214 (GND) is shared by the circuits 200 in each column in FIG. 18, the fourth wiring 214 (GND) may be shared by the circuits 200 in each row.

As described above, wirings are shared to reduce the number of wirings, so that a driver circuit for driving the circuits 200 arranged in a matrix with m rows and n columns can be simplified.

Note that in the configurations in FIGS. 17 and 18, the circuit 210 illustrated in FIG. 8B can be substituted for the circuit 200.

Figure 19:
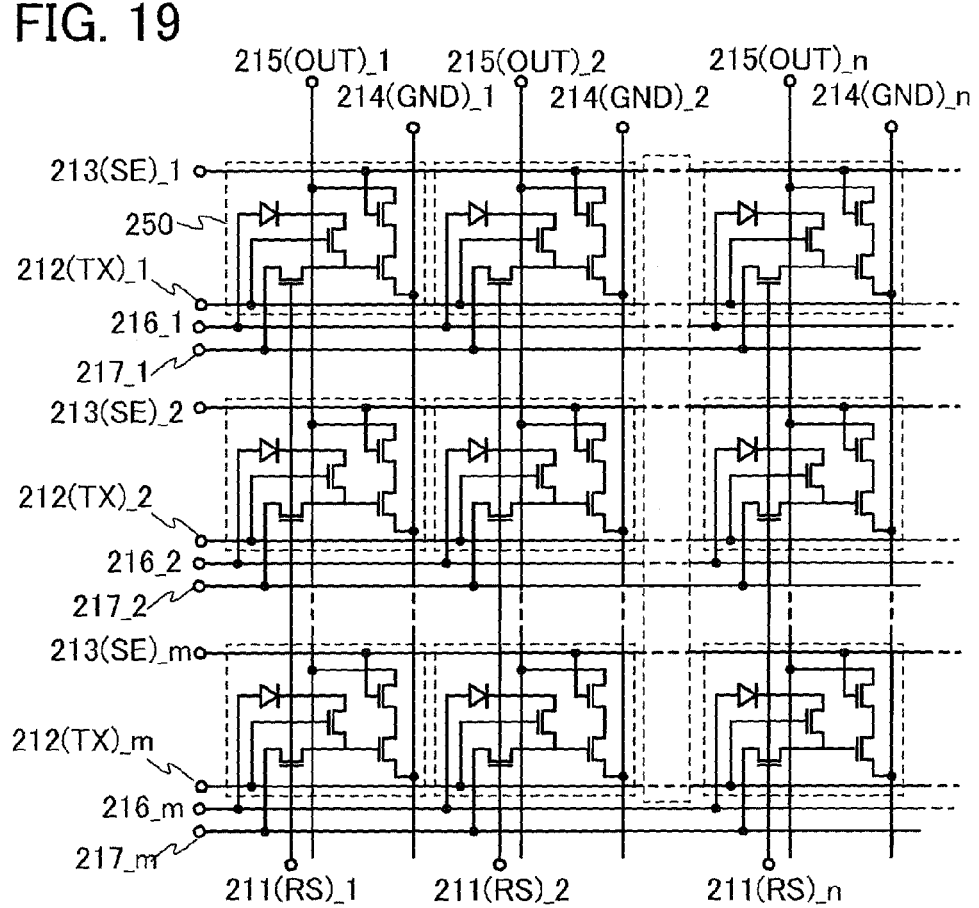
FIG. 19 is a circuit diagram of a plurality of pixel circuits arranged in a matrix.

FIG. 19 is an example of arranging a plurality of circuits 250 illustrated in FIG. 10A in a matrix with m rows and n columns. Each of the circuits 250 is connected to any one of the plurality of first wirings 211 (RS) (211(RS)_1 to 211 (RS)_n), any one of the plurality of second wirings 212 (TX) (212(TX)_1 to 212(TX)_m), any one of the plurality of third wirings 213 (SE) (213(SE)_1 to 213(SE)_m), any one of the plurality of fourth wirings 214 (GND) (214(GND)_1 to 214 (GND)_n), any one of the plurality of fifth wirings 215 (OUT) (215(OUT)_1 to 215(OUT)_n), any one of a plurality of sixth wirings 216 (216_1 to 216_m), and any one of a plurality of seventh wirings 217 (217_1 to 217_m).

In FIG. 19, the circuits 250 in each row (a horizontal direction in the drawing) share the second wiring 212 (TX), the third wiring 213 (SE), the sixth wiring 216, and the seventh wiring 217. The circuits 250 in each column (a vertical direction in the drawing) share the first wiring 211 (RS), the fourth wiring 214 (GND), and the fifth wiring 215 (OUT). However, one embodiment of the present invention is not limited to this configuration. The two or more second wirings 212 (TX), the two or more third wirings 213 (SE), the two or more sixth wirings 216, and the two or more seventh wirings 217 may be provided in each row to be electrically connected to the respective circuits 250. The two or more first wirings 211 (RS), the two or more fourth wirings 214 (GND), and the two or more fifth wirings 215 (OUT) may be provided in each column to be electrically connected to the respective circuits 250.

Although the first wiring 211 (RS) is shared by the circuits 250 in each column in FIG. 19, the first wiring 211 (RS) may be shared by the circuits 250 in each row.

Although the fourth wiring 214 (GND) is shared by the circuits 250 in each column in FIG. 19, the fourth wiring 214 (GND) may be shared by the circuits 250 in each row.

Although the seventh wiring 217 is shared by the circuits 250 in each row in FIG. 19, the seventh wiring 217 may be shared by the circuits 250 in each column.

As described above, wirings are shared to reduce the number of wirings, so that a driver circuit for driving the circuits 250 arranged in a matrix with m rows and n columns can be simplified.

Figure 20:
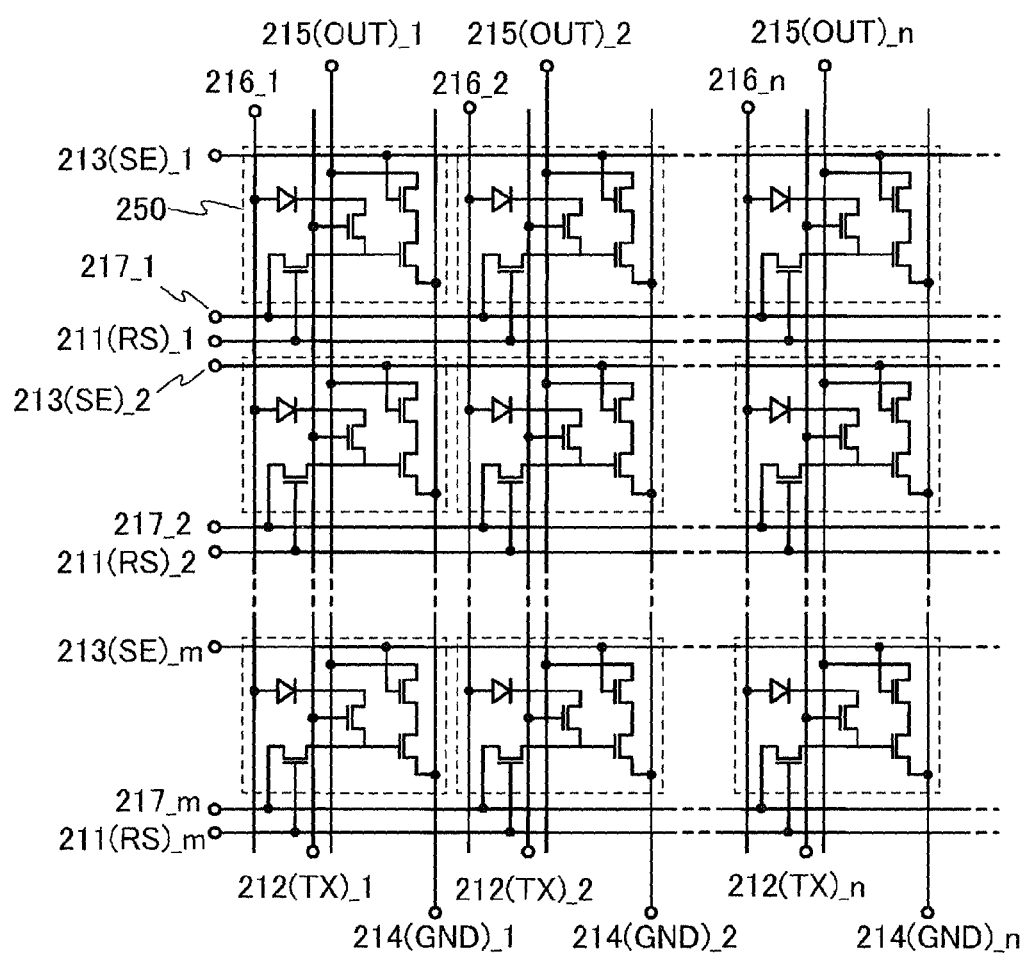
FIG. 20 is a circuit diagram of a plurality of pixel circuits arranged in a matrix.

FIG. 20 is an example of arranging a plurality of circuits 250 in a matrix with m rows and n columns. Each of the circuits 250 is connected to any one of the plurality of first wirings 211 (RS) (211(RS)_1 to 211(RS)_m), any one of the plurality of second wirings 212 (TX) (212(TX)_1 to 212 (TX)_n), any one of the plurality of third wirings 213 (SE) (213(SE)_1 to 213(SE)_m), any one of the plurality of fourth wirings 214 (GND) (214(GND)_1 to 214(GND)_n), any one of the plurality of fifth wirings 215 (OUT) (215(OUT)_1 to 215(OUT)_n), any one of a plurality of sixth wirings 216 (216_1 to 216_n), and any one of a plurality of seventh wirings 217 (217_1 to 217_m).

In FIG. 20, the circuits 250 in each row (a horizontal direction in the drawing) share the first wiring 211 (RS), the third wiring 213 (SE), and the seventh wiring 217. The circuits 250 in each column (a vertical direction in the drawing) share the second wiring 212 (TX), the fourth wiring 214 (GND), the fifth wiring 215 (OUT), and the sixth wiring 216. However, one embodiment of the present invention is not limited to this configuration. The two or more first wirings 211 (RS), the two or more third wirings 213 (SE), and the two or more seventh wirings 217 may be provided in each row to be electrically connected to the respective circuits 250. The two or more second wirings 212 (TX), the two or more fourth wirings 214 (GND), the two or more fifth wirings 215 (OUT), and the two or more sixth wirings 216 may be provided in each column to be electrically connected to the respective circuits 250.

Although the first wiring 211 (RS) is shared by the circuits 250 in each row in FIG. 20, the first wiring 211 (RS) may be shared by the circuits 250 in each column.

Although the fourth wiring 214 (GND) is shared by the circuits 250 in each column in FIG. 20, the fourth wiring 214 (GND) may be shared by the circuits 250 in each row.

Although the seventh wiring 217 is shared by the circuits 250 in each row in FIG. 20, the seventh wiring 217 may be shared by the circuits 250 in each column.

As described above, wirings are shared to reduce the number of wirings, so that a driver circuit for driving the circuits 250 arranged in a matrix with m rows and n columns can be simplified.

Note that in the configurations in FIGS. 19 and 20, the circuit 260 illustrated in FIG. 10B or the circuit 280 illustrated in FIG. 11 can be substituted for the circuit 250.

Figure 21:
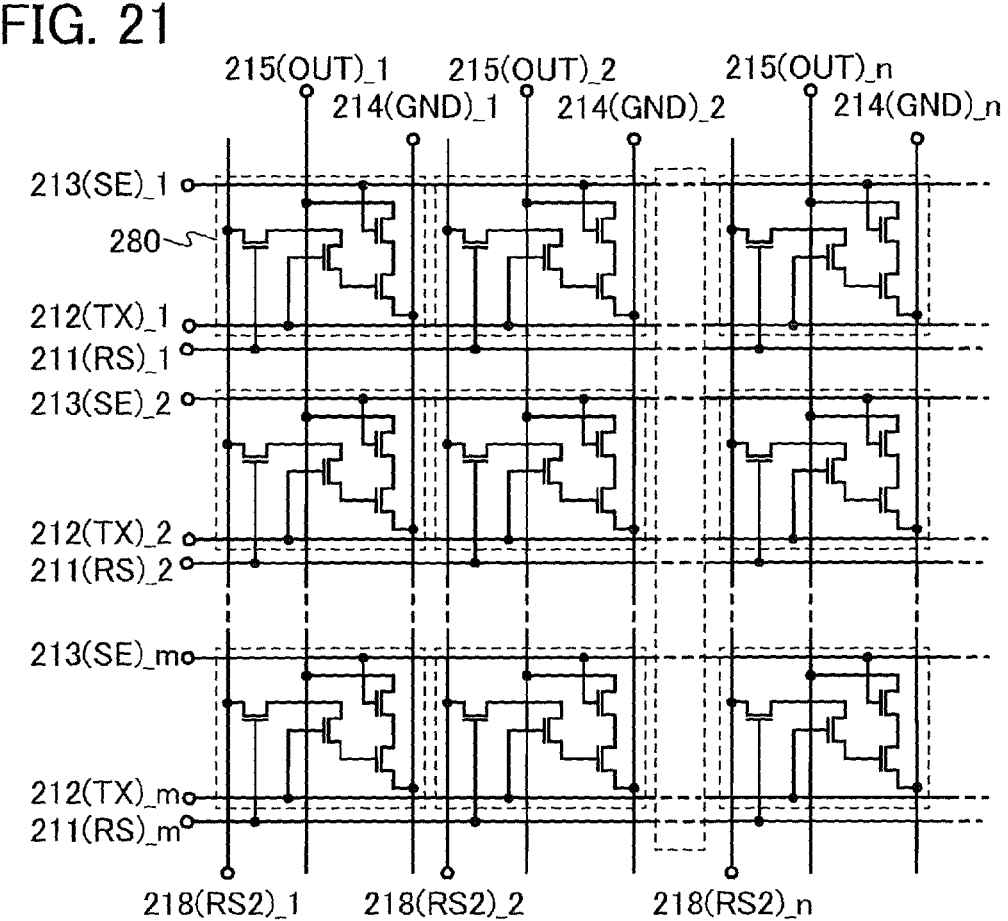
FIG. 21 is a circuit diagram of a plurality of pixel circuits arranged in a matrix.

FIG. 21 is an example of arranging a plurality of circuits 280 illustrated in FIG. 12 in a matrix with m (m is a natural number of two or more) rows and n (n is a natural number of two or more) columns Each of the circuits 280 is electrically connected to any one of a plurality of first wirings 211 (RS) (211(RS)_1 to 211(RS)_m), any one of a plurality of second wirings 212 (TX) (212(TX)_1 to 212(TX)_m), any one of a plurality of third wirings 213 (SE) (213(SE)_1 to 213 (SE)_m), any one of a plurality of fourth wirings 214 (GND) (214(GND)_1 to 214(GND)_n), any one of a plurality of fifth wirings 215 (OUT) (215(OUT)_1 to 215(OUT)_n), and any one of a plurality of eighth wirings 218 (RS2) (218(RS2)_1 to 218(RS2)_n).

In FIG. 21, the circuits 280 in each row (a horizontal direction in the drawing) share the first wiring 211 (RS), the second wiring 212 (TX), and the third wiring 213 (SE). The circuits 280 in each column (a vertical direction in the drawing) share the fourth wiring 214 (GND), the fifth wiring 215 (OUT), and the eighth wiring 218 (RS2). However, one embodiment of the present invention is not limited to this configuration. The two or more first wirings 211 (RS), the two or more second wirings 212 (TX), and the two or more third wirings 213 (SE) may be provided in each row to be electrically connected to the respective circuits 280. The two or more fourth wirings 214 (GND), the two or more fifth wirings 215 (OUT), and the two or more eighth wirings 218 (RS2) may be provided in each column to be electrically connected to the respective circuits 280.

Although the fourth wiring 214 is shared by the circuits 280 in each column in FIG. 21, the fourth wiring 214 may be shared by the circuits 280 in each row.

As described above, wirings are shared to reduce the number of wirings, so that a driver circuit for driving the circuits 280 arranged in a matrix with m rows and n columns can be simplified.

Figure 22:
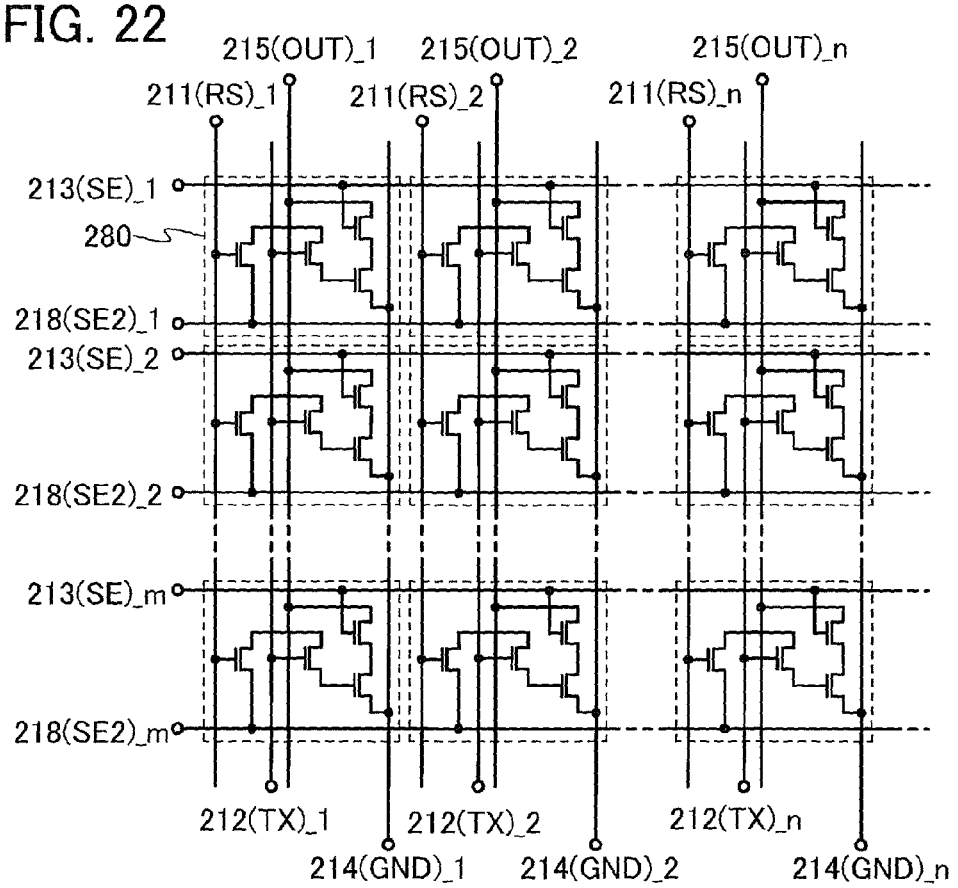
FIG. 22 is a circuit diagram of a plurality of pixel circuits arranged in a matrix.

In FIG. 22, the plurality of circuits 280 is arranged in a matrix with m rows and n columns. Each of the circuits 280 is electrically connected to any one of the plurality of first wirings 211 (RS) (211(RS)_1 to 211(RS)_n), any one of the plurality of second wirings 212 (TX) (212(TX)_1 to 212(TX)_n), any one of the plurality of third wirings 213 (SE) (213(SE)_1 to 213(SE)_m), any one of the plurality of fourth wirings 214 (GND) (214(GND)_1 to 214(GND)_n), any one of the plurality of fifth wirings 215 (OUT) (215(OUT)_1 to 215(OUT)_n), and any one of the plurality of eighth wirings 218 (SE2) (218(SE2)_1 to 218(SE2)_m).

In FIG. 22, the circuits 280 in each row share the third wiring 213 (SE) and the eighth wiring 218 (SE2). The circuits 280 in each column share the first wiring 211 (RS), the second wiring 212 (TX), the fourth wiring 214 (GND), and the fifth wiring 215 (OUT). However, one embodiment of the present invention is not limited to this configuration. The two or more third wirings 213 (SE) and the two or more eighth wirings 218 (SE2) may be provided in each row to be electrically connected to the respective circuits 280. The two or more first wirings 211 (RS), the two or more second wirings 212 (TX), the two or more fourth wirings 214 (GND), and the two or more fifth wirings 215 (OUT) may be provided in each column to be electrically connected to the respective circuits 280.

Although the fourth wiring 214 (GND) is shared by the circuits 280 in each column in FIG. 22, the fourth wiring 214 (GND) may be shared by the circuits 280 in each row.

As described above, wirings are shared to reduce the number of wirings, so that a driver circuit for driving the circuits 280 arranged in a matrix with m rows and n columns can be simplified.

Figure 23:
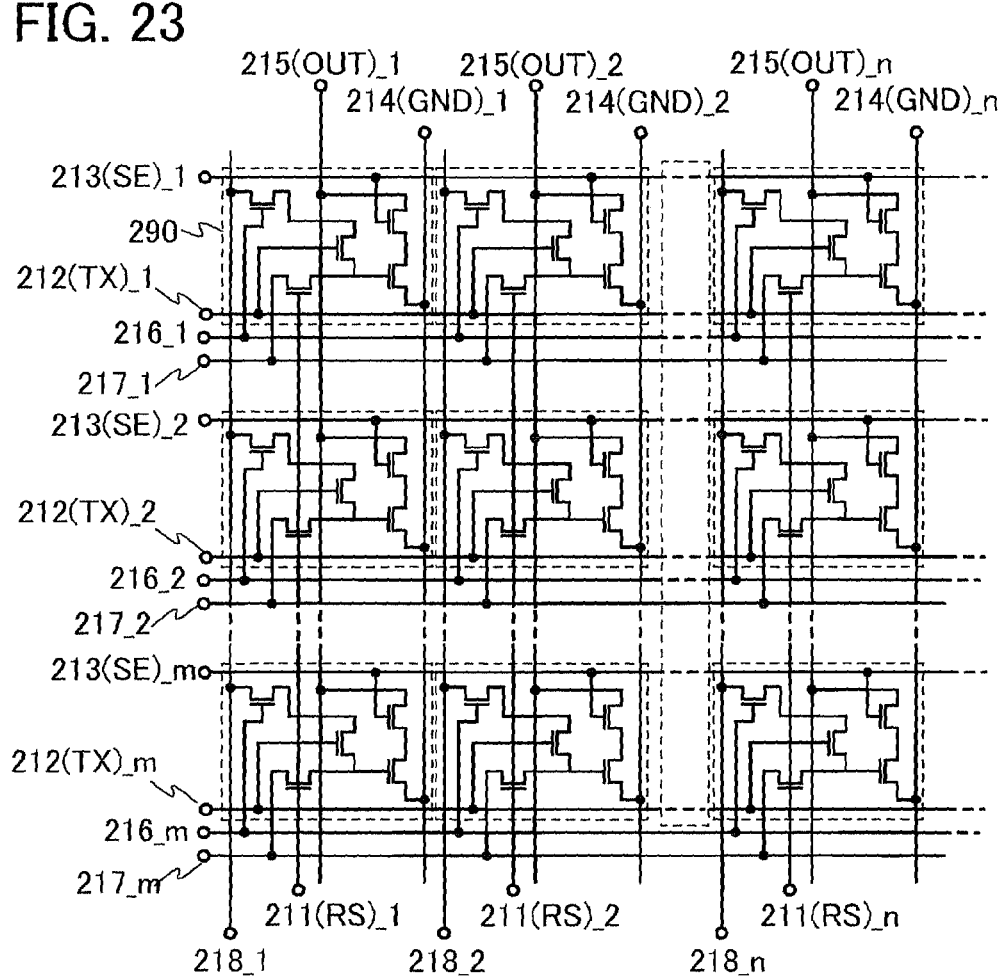
FIG. 23 is a circuit diagram of a plurality of pixel circuits arranged in a matrix.

FIG. 23 is an example of arranging a plurality of circuits 290 illustrated in FIG. 14 in a matrix with m rows and n columns. Each of the circuits 290 is connected to any one of the plurality of first wirings 211 (RS) (211(RS)_1 to 211(RS)_n), any one of the plurality of second wirings 212 (TX) (212(TX)_1 to 212(TX)_m), any one of the plurality of third wirings 213 (SE) (213(SE)_1 to 213(SE)_m), any one of the plurality of fourth wirings 214 (GND) (214(GND)_1 to 214(GND)_n), any one of the plurality of fifth wirings 215 (OUT) (215(OUT)_1 to 215(OUT)_n), any one of a plurality of sixth wirings 216 (216_1 to 216_m), any one of a plurality of seventh wirings 217 (217_1 to 217_m), and any one of the plurality of eighth wirings 218 (218_1 to 218_n).

In FIG. 23, the circuits 290 in each row (a horizontal direction in the drawing) share the second wiring 212 (TX), the third wiring 213 (SE), the sixth wiring 216, and the seventh wiring 217. The circuits 290 in each column (a vertical direction in the drawing) share the first wiring 211 (RS), the fourth wiring 214 (GND), the fifth wiring 215 (OUT), and the eighth wiring 218. However, one embodiment of the present invention is not limited to this configuration. The two or more second wirings 212 (TX), the two or more third wirings 213 (SE), the two or more sixth wirings 216, and the two or more seventh wirings 217 may be provided in each row to be electrically connected to the respective circuits 290. The two or more first wirings 211 (RS), the two or more fourth wirings 214 (GND), the two or more fifth wirings 215 (OUT), and the two or more eighth wirings 218 may be provided in each column to be electrically connected to the respective circuits 290.

Although the first wiring 211 is shared by the circuits 290 in each column in FIG. 23, the first wiring 211 may be shared by the circuits 290 in each row.

Although the fourth wiring 214 is shared by the circuits 290 in each column in FIG. 23, the fourth wiring 214 may be shared by the circuits 290 in each row.

Although the seventh wiring 217 is shared by the circuits 290 in each row in FIG. 23, the seventh wiring 217 may be shared by the circuits 290 in each column.

Although the eighth wiring 218 is shared by the circuits 290 in each row in FIG. 23, the eighth wiring 218 may be shared by the circuits 290 in each column.

As described above, wirings are shared to reduce the number of wirings, so that a driver circuit for driving the circuits 290 arranged in a matrix with m rows and n columns can be simplified.

Figure 24:
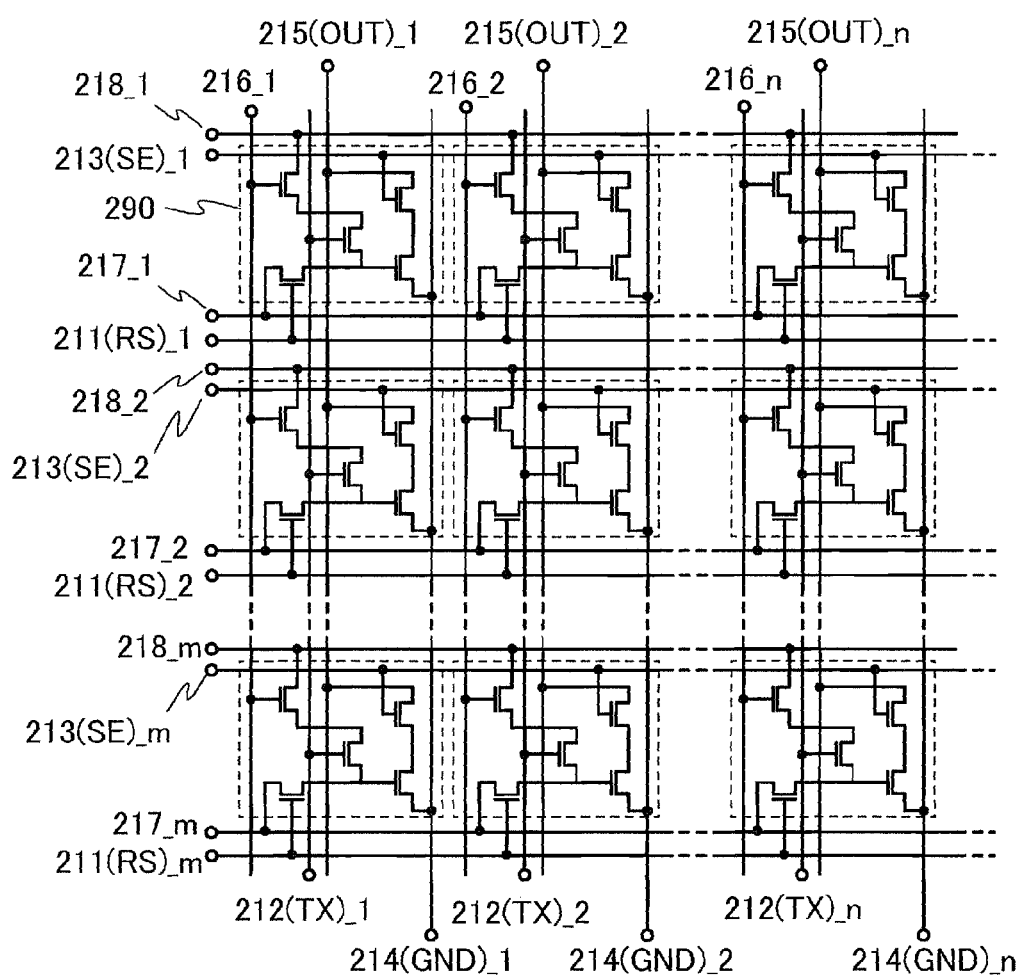
FIG. 24 is a circuit diagram of a plurality of pixel circuits arranged in a matrix.

FIG. 24 is an example of arranging the plurality of circuits 290 in a matrix with m rows and n columns. Each of the circuits 290 is connected to any one of the plurality of first wirings 211 (RS) (211(RS)_1 to 211(RS)_m), any one of the plurality of second wirings 212 (TX) (212(TX)_1 to 212(TX)_n), any one of the plurality of third wirings 213 (SE) (213(SE)_1 to 213(SE)_m), any one of the plurality of fourth wirings 214 (GND) (214(GND)_1 to 214(GND)_n), any one of the plurality of fifth wirings 215 (OUT) (215(OUT)_1 to 215(OUT)_n), any one of the plurality of sixth wirings 216 (216_1 to 216_n), any one of the plurality of seventh wirings 217 (217_1 to 217_m), and any one of the plurality of eighth wirings 218 (218_1 to 218_m).

In FIG. 24, the circuits 290 in each row (a horizontal direction in the drawing) share the first wiring 211 (RS), the third wiring 213 (SE), the seventh wiring 217, and the eighth wiring 218. The circuits 290 in each column (a vertical direction in the drawing) share the second wiring 212 (TX), the fourth wiring 214 (GND), the fifth wiring 215 (OUT), and the sixth wiring 216. However, one embodiment of the present invention is not limited to this configuration. The two or more first wirings 211 (RS), the two or more third wirings 213 (SE), the two or more seventh wirings 217, and the two or more eighth wirings 218 may be provided in each row to be electrically connected to the respective circuits 290. The two or more second wirings 212 (TX), the two or more fourth wirings 214 (GND), the two or more fifth wirings 215 (OUT), and the two or more sixth wirings 216 may be provided in each column to be electrically connected to the respective circuits 290.

Although the first wiring 211 is shared by the circuits 290 in each row in FIG. 24, the first wiring 211 may be shared by the circuits 290 in each column.

Although the fourth wiring 214 (GND) is shared by the circuits 290 in each column in FIG. 24, the fourth wiring 214 (GND) may be shared by the circuits 290 in each row.

Although the seventh wiring 217 is shared by the circuits 290 in each row in FIG. 24, the seventh wiring 217 may be shared by the circuits 290 in each column.

Although the eighth wiring 218 is shared by the circuits 290 in each row in FIG. 24, the eighth wiring 218 may be shared by the circuits 290 in each column.

As described above, wirings are shared to reduce the number of wirings, so that a driver circuit for driving the circuits 290 arranged in a matrix with m rows and n columns can be simplified.

Next, an example of a layout of the circuit 200 illustrated in FIG. 8A is described with reference to FIGS. 25A and 25B.

Figures 25A, 25B:
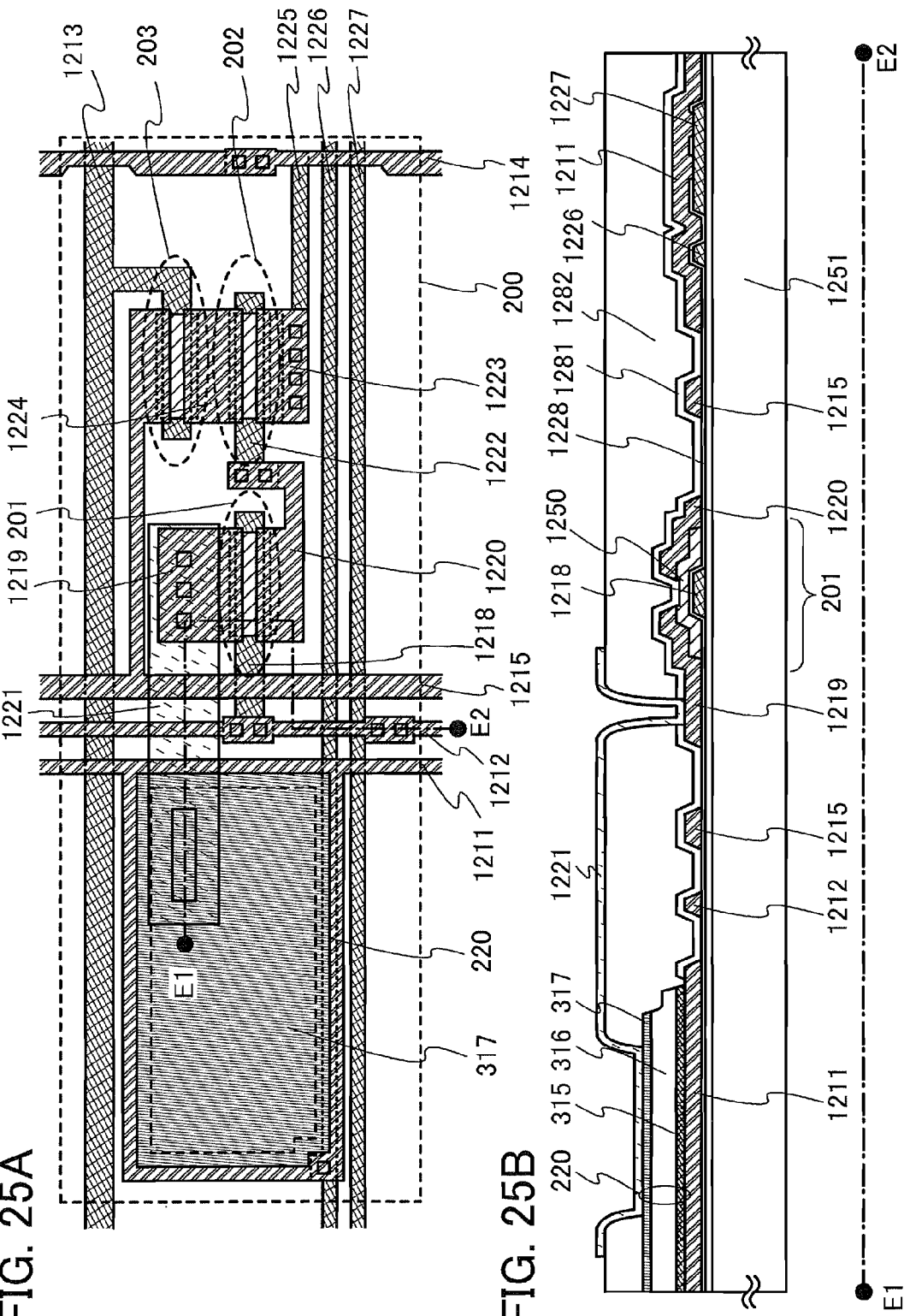
FIGS. 25A and 25B are respectively a top view and a cross-sectional view of a layout of a pixel circuit.

FIG. 25A is a top view of the circuit 200 and FIG. 25B is a cross-sectional view taken along the dashed line E1-E2 in FIG. 25A.

The circuit 200 includes a conductive film 1211 serving as the first wiring 211 (RS), a conductive film 1212 serving as the second wiring 212 (TX), a conductive film 1213 serving as the third wiring 213 (SE), a conductive film 1214 serving as the fourth wiring 214 (GND), and a conductive film 1215 serving as the fifth wiring 215 (OUT).

The photodiode 220 included in the circuit 200 includes a p-type semiconductor film 315, an i-type semiconductor film 316, and an n-type semiconductor film 317 which are stacked in this order. The conductive film 1211 is electrically connected to the p-type semiconductor film 315 serving as the anode of the photodiode 220.

A conductive film 1218 included in the circuit 200 serves as a gate electrode of the first transistor 201 and is electrically connected to the conductive film 1212. A conductive film 1219 included in the circuit 200 serves as one of a source electrode and a drain electrode of the first transistor 201. A conductive film 1220 included in the circuit 200 serves as the other of the source electrode and the drain electrode of the first transistor 201. A conductive film 1221 included in the circuit 200 is electrically connected to the n-type semiconductor film 317 and the conductive film 1219. A conductive film 1222 included in the circuit 200 serves as a gate electrode of the second transistor 202 and is electrically connected to the conductive film 1220.

A conductive film 1223 included in the circuit 200 serves as one of a source electrode and a drain electrode of the second transistor 202. A conductive film 1224 included in the circuit 200 serves as the other of the source electrode and the drain electrode of the second transistor 202 and one of a source electrode and a drain electrode of the third transistor 203. The conductive film 1214 serves as the other of the source electrode and the drain electrode of the third transistor 203. The conductive film 1213 also serves as a gate electrode of the third transistor 203. A conductive film 1225 included in the circuit 200 is electrically connected to the conductive film 1223 and the conductive film 1214.

In FIGS. 25A and 25B, a conductive film 1226 included in the circuit 200 is electrically connected to the conductive film 1211 serving as the first wiring 211 (RS). A conductive film 1227 included in the circuit 200 is electrically connected to the conductive film 1212 serving as the second wiring 212 (TX).

The conductive films 1213, 1218, 1222, 1225, 1226, and 1227 can be formed by processing one conductive film formed over an insulating surface into desired shapes. A gate insulating film 1228 is formed over the conductive films 1213, 1218, 1222, 1225, 1226, and 1227. The conductive films 1211, 1212, 1214, 1215, 1219, 1220, 1223, and 1224 can be formed by processing one conductive film formed over the gate insulating film 1228 into desired shapes.

An insulating film 1281 and an insulating film 1282 are formed over the conductive films 1211, 1212, 1214, 1215, 1219, 1220, 1223, and 1224. The conductive film 1221 is formed over the insulating film 1281 and the insulating film 1282.

An oxide semiconductor is preferably used for a semiconductor layer 1250 of the first transistor 201. In order that electrical charges generated by irradiation of the photodiode 220 with light are retained for a long time, the first transistor 201 electrically connected to the charge accumulation portion needs to be a transistor with an extremely low off-state current. Thus, the use of an oxide semiconductor material for the semiconductor layer 1250 improves the performance of the circuit 200. Note that the charge accumulation portion is the wiring 205 in the circuit 200 and corresponds to the conductive film 1220 in FIGS. 25A and 25B. The second transistor 202 and the third transistor 203 can also have a structure similar to that of the first transistor 201.

Figure 26A:
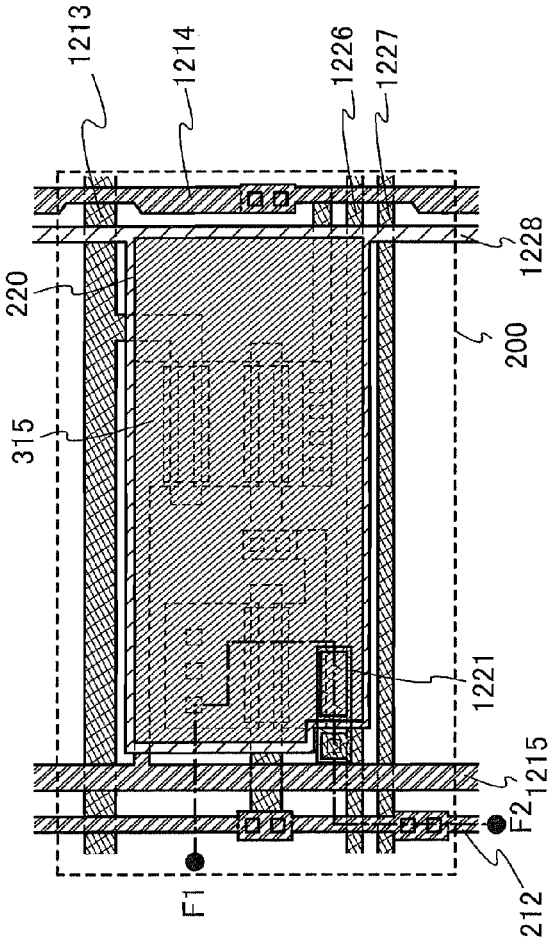
FIGS. 26A and 26B are respectively a top view and a cross-sectional view of a layout of a pixel circuit.
Figure 26B:
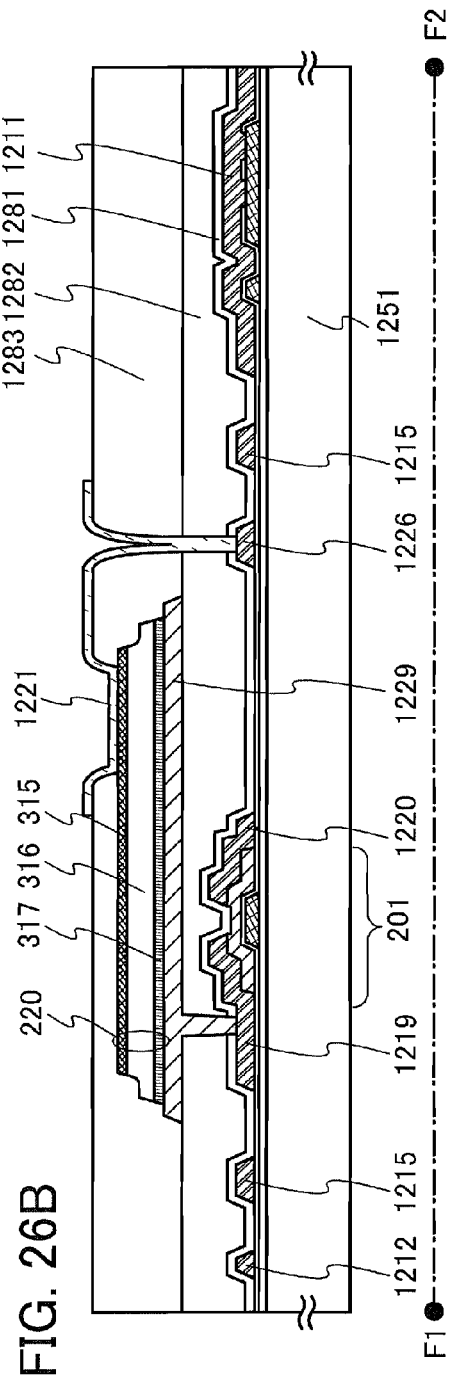

Further, the circuit 200 may have a configuration in which an element such as a transistor overlaps with the photodiode 220 as illustrated in FIGS. 26A and 26B. Such a configuration increases the density of the pixels and the resolution of the imaging device. In addition, the area of the photodiode 220 can be increased, resulting in an increase in the sensitivity of the imaging device. FIG. 26A is a top view of the circuit 200 and FIG. 26B is a cross-sectional view taken along the dashed line F1-F2 in FIG. 26A.

In the circuit 200 illustrated in FIGS. 26A and 26B, the conductive film 1219 serving as one of the source electrode and the drain electrode of the first transistor 201 is electrically connected to the n-type semiconductor film 317 serving as the cathode of the photodiode 220 through the a conductive film 1229. The p-type semiconductor film 315 serving as the anode of the photodiode 220 is electrically connected to the conductive film 1226 in contact with the first wiring 211, through the conductive film 1221. An insulating film 1283 is formed to protect the photodiode 220. Except for the above and the element such as the transistor overlapping with the photodiode 220, the configuration of the circuit in FIGS. 26A and 26B is similar to that of the pixel circuit 200 in FIGS. 25A and 25B.

Note that although a configuration in which the p-type semiconductor film 315 is directly electrically connected to the conductive film 1226 through the conductive film 1221 is shown as an example, another conductive film electrically connected to the conductive film 1226 through an opening formed in the insulating films 1281, 1282, and 1283 may be provided to be electrically connected to the conductive film 1221.

The configuration in which an element such as a transistor overlaps with alight-receiving element such as a photodiode as illustrated in FIGS. 26A and 26B can also be applied to the circuit 210 illustrated in FIG. 8B, the circuits 250 and 260 illustrated in FIGS. 10A and 10B, and the circuit 270 illustrated in FIG. 11.

Next, an example of a layout of the circuit 280 illustrated in FIG. 12 is described with reference to FIG. 27 and FIG. 28.

Figure 27:
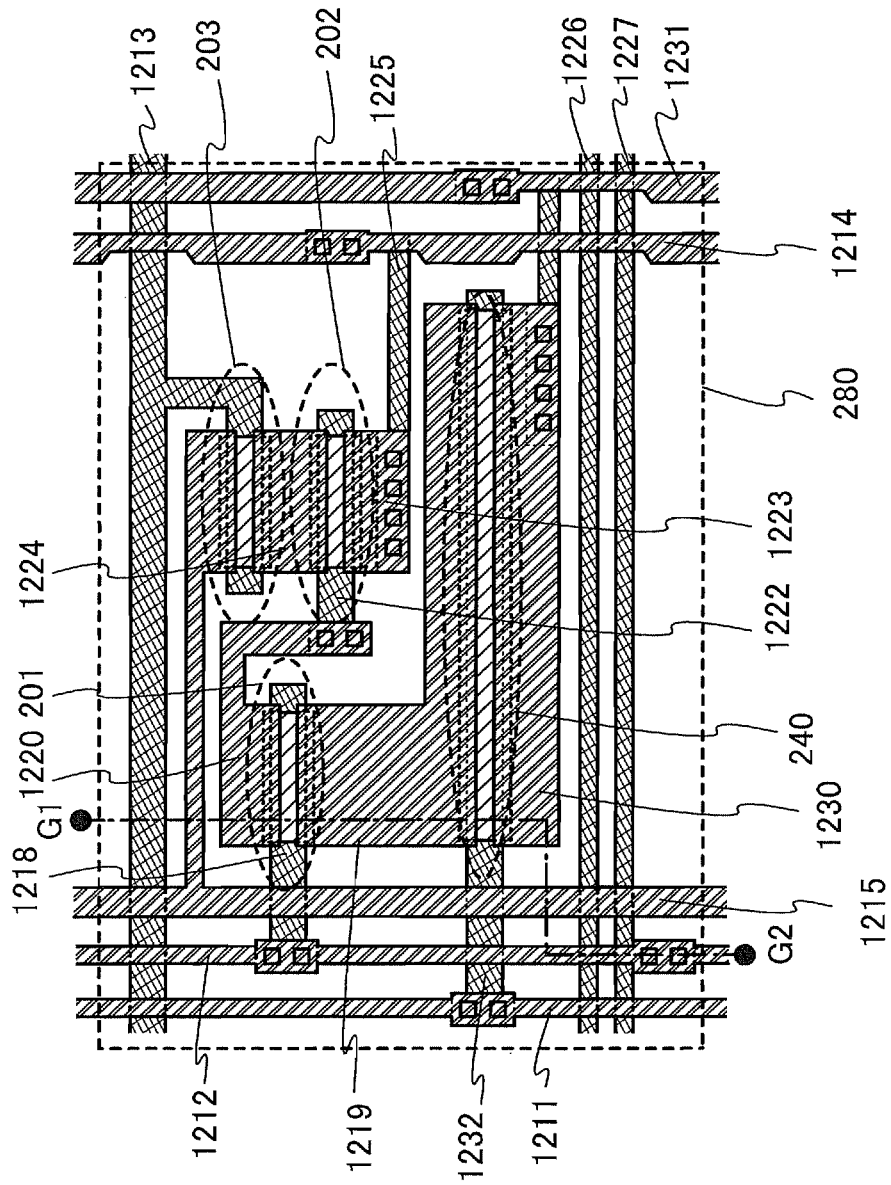
FIG. 27 is a top view of a layout of a pixel circuit.
Figure 28:
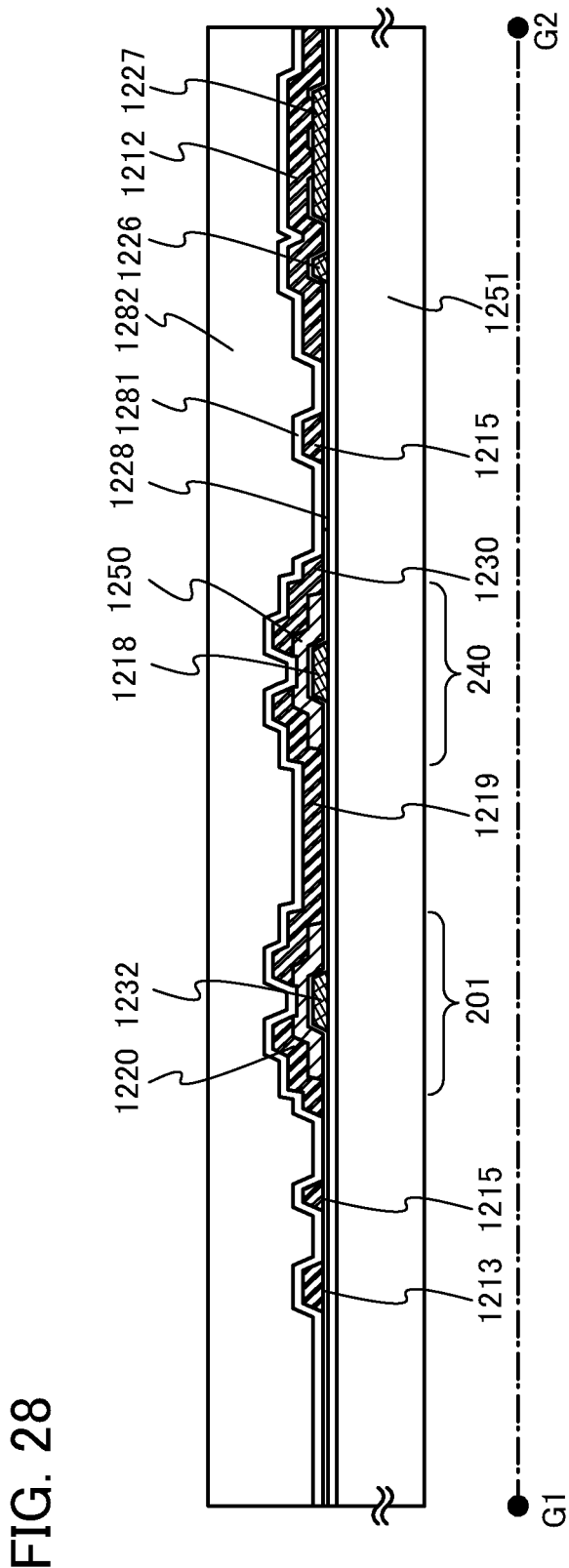
FIG. 28 is a cross-sectional view of a layout of a pixel circuit.

FIG. 27 is a top view of the circuit 280 and FIG. 28 is a cross-sectional view taken along the dashed line G1-G2 in FIG. 27.

The circuit 280 has the same configuration as that of the circuit 200 in FIGS. 25A and 25B and FIGS. 26A and 26B except that the transistor 240 is used instead of the photodiode 220. A gate electrode 1232 of the transistor is electrically connected to the conductive film 1211 serving as the first wiring 211 (RS), one of a source electrode and a drain electrode of the transistor is shared by the conductive film 1219 serving as one of the source electrode and the drain electrode of the first transistor 201, and a conductive film 1230 serving as the other of the source electrode and the drain electrode of the transistor is electrically connected to a conductive film 1231 serving as the eighth wiring (RS2). Description of the circuit 200 can be referred to for the other elements.

As the transistor 240, a transistor whose off-state current is extremely low is used, whereby the dynamic range can be increased. As the transistor, a transistor including an oxide semiconductor is preferably used. Further, when the transistor 240 is formed using an oxide semiconductor having a band gap of 3 eV or more, the amount of the off state current of the transistor is greatly changed due to irradiation with ultraviolet light. That is, the transistor can operate as an ultraviolet light sensor. Note that the transistor 240 can have a structure similar to that of the first transistor 201.

This embodiment can be combined with any of the other embodiments in this specification as appropriate.

(Embodiment 5)

In this embodiment, a transistor with an extremely low off-state current, which can be used for any of the circuits described in Embodiments 1 to 4, and a material for the transistor are described.

As the structure of the transistor, FIGS. 25A and 25B, FIGS. 26A and 26B, FIG. 27, and FIG. 28 illustrate the top views and the cross-sectional views of the first transistor 201 or the transistor 240 each including the semiconductor layer 1250. Although the transistor having a channel-etched bottom gate structure is shown as an example, the transistor may have a channel-protective bottom gate structure, a non-self-aligned top gate structure, or a self-aligned top gate structure. In the case where an imaging device has the same structure as that in FIGS. 6A and 6B and includes a transistor as a light-receiving element, the transistor used as the light-receiving element can have only a top-gate structure.

To form the transistor with an extremely low off-state current, a semiconductor material having a wider band gap and lower intrinsic carrier density than a silicon semiconductor, such as an oxide semiconductor, is preferably used for the semiconductor layer 1250.

As one example of the semiconductor material, a compound semiconductor such as silicon carbide (SiC) or gallium nitride (GaN) can be given in addition to an oxide semiconductor. The oxide semiconductor has an advantage of high mass productivity because the oxide semiconductor can be formed by a sputtering method or a wet process, unlike silicon carbide or gallium nitride. Further, the oxide semiconductor can be formed even at room temperature; thus, the oxide semiconductor can be formed over a glass substrate or over an integrated circuit using silicon. Further, a larger substrate can be used. Accordingly, among the semiconductors with wide band gaps, the oxide semiconductor particularly has an advantage of high mass productivity. Further, in the case where an oxide semiconductor with high crystallinity is to be obtained in order to improve the property of a transistor (e.g., field-effect mobility), the oxide semiconductor with crystallinity can be easily obtained by heat treatment at 250° C. to 800° C.

Further, the conductivity type of a highly purified oxide semiconductor (purified OS) obtained by reduction of impurities each of which serves as an electron donor (donor) and by reduction of oxygen vacancies is an i-type or a substantially i-type. Therefore, a transistor including the oxide semiconductor has a characteristic of an extremely low off-state current. Furthermore, the band gap of the oxide semiconductor is 2 eV or more, preferably 2.5 eV or more, more preferably 3 eV or more. With the use of an oxide semiconductor film which is highly purified by a sufficient decrease in the concentration of impurities such as moisture or hydrogen and reduction of oxygen vacancies, the off-state current of a transistor can be decreased.

In the oxide semiconductor layer, hydrogen, nitrogen, carbon, silicon, and a metal element other than main components are impurities. For example, hydrogen and nitrogen form donor levels to increase the carrier density. Silicon forms impurity levels in an oxide semiconductor layer. The impurity levels serve as traps and might cause electrical characteristics of the transistor to deteriorate. It is preferable to reduce the concentration of the impurities in the oxide semiconductor layer and at interfaces with other layers.

Note that stable electrical characteristics can be effectively imparted to a transistor in which an oxide semiconductor layer serves as a channel by reducing the concentration of impurities in the oxide semiconductor layer to make the oxide semiconductor layer intrinsic or substantially intrinsic. The term "substantially intrinsic" refers to the state where an oxide semiconductor layer has a carrier density lower than $1\times10^{17}/cm^3$, preferably lower than $1\times10^{15}/cm^3$, further preferably lower than $1\times10^{13}/cm^3$.

In order to make the oxide semiconductor layer intrinsic or substantially intrinsic, in SIMS (secondary ion mass spectrometry), for example, the concentration of silicon at a certain depth of the oxide semiconductor layer or in a region of the oxide semiconductor layer is lower than $1\times10^{19}$ atoms/$cm^3$, preferably lower than $5\times10^{18}$ atoms/$cm^3$, more preferably lower than $1\times10^{18}$ atoms/$cm^3$. Further, the concentration of hydrogen at a certain depth of the oxide semiconductor layer or in a region of the oxide semiconductor layer is lower than or equal to $2\times10^{20}$ atoms/$cm^3$, preferably lower than or equal to $5\times10^{19}$ atoms/$cm^3$, more preferably lower than or equal to $1\times10^{19}$ atoms/$cm^3$, still more preferably lower than or equal to $5\times10^{18}$ atoms/$cm^3$. Further, the concentration of nitrogen at a certain depth of the oxide semiconductor layer or in a region of the oxide semiconductor layer is lower than $5\times10^{19}$ atoms/$cm^3$, preferably lower than or equal to $5\times10^{18}$ atoms/$cm^3$, more preferably lower than or equal to $1\times10^{18}$ atoms/$cm^3$, still more preferably lower than or equal to $5\times10^{17}$ atoms/$cm^3$.

In the case where the oxide semiconductor layer includes crystals, high concentration of silicon or carbon might reduce the crystallinity of the oxide semiconductor layer. In order not to lower the crystallinity of the oxide semiconductor layer, for example, the concentration of silicon at a certain depth of the oxide semiconductor layer or in a region of the oxide semiconductor layer is lower than $1\times10^{19}$ atoms/$cm^3$, preferably lower than $5\times10^{18}$ atoms/$cm^3$, more preferably lower than $1\times10^{18}$ atoms/$cm^3$. Further, the concentration of carbon at a certain depth of the oxide semiconductor layer or in a region of the oxide semiconductor layer is lower than $1\times10^{19}$ atoms/$cm^3$, preferably lower than $5\times10^{18}$ atoms/$cm^3$, more preferably lower than $1\times10^{18}$ atoms/$cm^3$, for example.

Specifically, various experiments can prove a low off-state current of a transistor including a channel formation region formed of a highly-purified oxide semiconductor film. For example, even when an element has a channel width of $1\times10^6$ µm and a channel length of 10 µm, off-state current can be lower than or equal to the measurement limit of a semiconductor parameter analyzer, i.e., lower than or equal to $1\times10^{-13}$ A, at voltage (drain voltage) between a source electrode and a drain electrode of from 1 V to 10 V. In this case, it can be seen that the off-state current standardized on the channel width of the transistor is lower than or equal to 100 zA/µm. In addition, a capacitor and a transistor are connected to each other and the off-state current is measured with a circuit in which electrical charges flowing into or from the capacitor is controlled by the transistor. In the measurement, a purified oxide semiconductor film has been used for a channel formation region of the transistor, and the off-state current of the transistor has been measured from a change in the amount of electrical charge of the capacitor per unit time. As a result, it is found that in the case where the voltage between the source electrode and the drain electrode of the transistor is 3 V, a lower off-state current of several tens of yoctoamperes per micrometer (yA/μm) can be obtained. Accordingly, the off-state current of the transistor including a channel formation region formed of the highly purified oxide semiconductor film is considerably lower than that of a transistor including silicon having crystallinity.

Note that the oxide semiconductor preferably contains at least indium (In) or zinc (Zn). In particular, In and Zn are preferably contained. In addition, as a stabilizer for reducing the variation in electrical characteristics of a transistor using the oxide semiconductor, the oxide semiconductor preferably contains gallium (Ga) in addition to In and Zn. Tin (Sn) is preferably contained as a stabilizer. Hafnium (Hf) is preferably contained as a stabilizer. Aluminum (Al) is preferably contained as a stabilizer.

As another stabilizer, one or more of lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used. The above oxide semiconductor may include silicon.

Note that an In—Ga—Zn-based oxide, for example, means an oxide containing In, Ga, and Zn, and there is no limitation on the ratio of In, Ga, and Zn. The In—Ga—Zn-based oxide may contain a metal element other than In, Ga, and Zn. The In—Ga—Zn-based oxide has sufficiently high resistance when there is no electric field and thus off-state current can be sufficiently reduced. In addition, also having high field-effect mobility, the In—Ga—Zn-based oxide is suitable for a semiconductor material used in a semiconductor device.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

However, the composition is not limited to those described above, and a material having an appropriate composition may be used depending on needed electrical characteristics (such as mobility and threshold voltage). Further, it is preferable to appropriately set the carrier density, the impurity concentration, the defect density, the atomic ratio of a metal element and oxygen, the interatomic distance, the density, or the like in order to obtain necessary semiconductor characteristics.

For example, the oxide semiconductor film can be formed by a sputtering method using a target containing indium (In), gallium (Ga), and zinc (Zn). In the case where an In—Ga—Zn-based oxide semiconductor film is formed by a sputtering method, it is preferable to use a target of an In—Ga—Zn-based oxide with an atomic ratio of In:Ga:Zn=1:1:1, 4:2:3, 3:1:2, 1:1:2, 2:1:3, 1:3:2, 1:3:4, 1:6:4, or 3:1:4. When the oxide semiconductor film is formed using an In—Ga—Zn-based oxide target having the aforementioned atomic ratio, a crystal is readily formed. The filling rate of the target containing In, Ga, and Zn is 90% or higher, preferably 95% or higher. With the use of the target with high filling rate, a dense oxide semiconductor film is formed.

In the case where an In—Zn-based oxide material is used as an oxide semiconductor, a target of the In—Zn-based oxide has a composition ratio of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), further preferably In:Zn=1.5:1 to 15:1 in an atomic ratio ($In_2O_3$:ZnO=3:4 to 15:2 in a molar ratio). For example, in a target used for formation of an oxide semiconductor film including an In—Zn-based oxide which has an atomic ratio of In:Zn:O=X:Y:Z, the relation of Z>1.5X+Y is satisfied. The mobility can be improved by keeping the ratio of Zn within the above range.

In the case of forming an In—Sn—Zn-based oxide semiconductor film as the oxide semiconductor film by a sputtering method, it is preferred to use an In—Sn—Zn—O target containing In, Sn, and Zn at an atomic ratio of 1:1:1, 2:1:3, 1:2:2, or 20:45:35.

A structure of the oxide semiconductor film is described below.

Note that in this specification, a term "parallel" indicates that the angle formed between two straight lines is greater than or equal to −10° and less than or equal to 10°, and accordingly also includes the case where the angle is greater than or equal to −5° and less than or equal to 5°. In addition, a term "perpendicular" indicates that the angle formed between two straight lines is greater than or equal to 80° and less than or equal to 100°, and accordingly includes the case where the angle is greater than or equal to 85° and less than or equal to 95°.

In this specification, the trigonal and rhombohedral crystal systems are included in the hexagonal crystal system.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm Thus, there is a case where a crystal part included in the CAAC-OS film fits inside a cube whose one side is less than 10 nm, less than 5 nm, or less than 3 nm The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle ($2\theta$) is around $31°$. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when $2\theta$ is around $56°$. This peak is derived from the (110) plane of the $InGaZnO_4$ crystal. Here, analysis ($\phi$ scan) is performed under conditions where the sample is rotated around a normal vector of a sample surface as an axis ($\phi$ axis) with $2\theta$ fixed at around $56°$. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when $\phi$ scan is performed with $2\theta$ fixed at around $56°$.

According to the above results, in the CAAC-OS film having c-axis alignment, while the directions of a-axes and b-axes are different between crystal parts, the c-axes are aligned in a direction parallel to a normal vector of a formation surface or a normal vector of the top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of the top surface of the CAAC-OS film. Thus, for example, in the case where a shape of the CAAC-OS film is changed by etching or the like, the c-axis might not be necessarily parallel to a normal vector of a formation surface or a normal vector of the top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of $2\theta$ may also be observed at around $36°$, in addition to the peak of $2\theta$ at around $31°$. The peak of $2\theta$ at around $36°$ indicates that a crystal having no c-axis alignment is included in part of the CAAC-OS film. It is preferable that in the CAAC-OS film, a peak of $2\theta$ appear at around $31°$ and a peak of $2\theta$ do not appear at around $36°$.

In a transistor using the CAAC-OS film, change in electrical characteristics due to irradiation with visible light or ultraviolet light is small. Thus, the transistor has high reliability.

Note that the oxide semiconductor film may be a stacked film including two or more films of an amorphous oxide semiconductor film, a microcrystalline oxide semiconductor film, and a CAAC-OS film, for example.

For example, the CAAC-OS film is formed by a sputtering method using a polycrystalline oxide semiconductor sputtering target. When ions collide with the sputtering target, a crystal region included in the sputtering target might be separated from the target along an a-b plane; in other words, a sputtered particle having a plane parallel to an a-b plane (flat-plate-like sputtered particle or pellet-like sputtered particle) might be separated from the sputtering target. In that case, the flat-plate-like sputtered particle reaches a substrate while maintaining their crystal state, whereby the CAAC-OS film can be formed.

For the deposition of the CAAC-OS film, the following conditions are preferably used.

By reducing the amount of impurities entering the CAAC-OS film during the deposition, the crystal state can be prevented from being broken by the impurities. For example, impurities (e.g., hydrogen, water, carbon dioxide, or nitrogen) which exist in the deposition chamber may be reduced. Furthermore, impurities in a deposition gas may be reduced. Specifically, a deposition gas whose dew point is $-80°$ C. or lower, preferably $-100°$ C. or lower is used.

By increasing the substrate heating temperature during the deposition, migration of a sputtered particle is likely to occur after the sputtered particle reaches a substrate surface. Specifically, the substrate heating temperature during the deposition is higher than or equal to $100°$ C. and lower than or equal to $740°$ C., preferably higher than or equal to $200°$ C. and lower than or equal to $500°$ C. When the substrate heating temperature during the deposition is increased and the flat-plate-like sputtered particle reaches the substrate, migration occurs over the substrate, so that a flat plane of the sputtered particle is attached to the substrate.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

As a sputtering target, an In—Ga—Zn—O compound target can be used, for example. The In—Ga—Zn—O compound target is a polycrystalline body which is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y, and Z are each a given positive number. The grain size of the polycrystalline body is preferably as small as possible, for example, less than or equal to 1 μm. The kinds of powder and the molar ratio for mixing powder may be determined as appropriate depending on the desired sputtering target.

The oxide semiconductor film may include a plurality of oxide semiconductor films stacked. For example, as in a transistor illustrated in FIG. 29A, a first oxide semiconductor film 1260a and a second oxide semiconductor film 1260b may be stacked to be used as the semiconductor film. The first oxide semiconductor film 1260a and the second oxide semiconductor film 1260b may include metal oxides having different atomic ratios. For example, one of the oxide semiconductor films may include one of an oxide containing two kinds of metals, an oxide containing three kinds of metals, and an oxide containing four kinds of metals, and the other of the oxide semiconductor films may include another one of the oxide containing two kinds of metals, the oxide containing three kinds of metals, and the oxide containing four kinds of metals.

Alternatively, the first oxide semiconductor film 1260a and the second oxide semiconductor film 1260b may include the same constituent elements with different atomic ratios. For example, one of the oxide semiconductor films may contain In, Ga, and Zn at an atomic ratio of 3:1:2, and the other of the oxide semiconductor films may contain In, Ga, and Zn at an atomic ratio of 1:1:1. Alternatively, one of the oxide semiconductor films may contain In, Ga, and Zn at an atomic ratio of 2:1:3, and the other of the oxide semiconductor films may contain In, Ga, and Zn at an atomic ratio of 1:3:2. Alternatively, one of the oxide semiconductor films may contain In, Ga, and Zn at an atomic ratio of 1:1:1, and the other of the oxide semiconductor films may contain In, Ga, and Zn at an atomic ratio of 1:3:2. Alternatively, one of the oxide semiconductor films may contain In, Ga, and Zn at an atomic ratio of 1:1:1, and the other of the oxide semiconductor films may contain In, Ga, and Zn at an atomic ratio of 1:3:4. Alternatively, one of the oxide semiconductor films may contain In, Ga, and Zn at an atomic ratio of 1:1:1, and the other of the oxide semiconductor films may contain In, Ga, and Zn at an atomic ratio of 1:6:4. Alternatively, one of the oxide semiconductor films may contain In, Ga, and Zn at an atomic ratio of 1:1:1, and the other of the oxide semiconductor films may contain In, Ga, and Zn at an atomic ratio of 1:9:6. Note that the proportion of each atom in the atomic ratio of the oxide semiconductor film may vary within a range of ±20% as an error.

In the above, one of the first oxide semiconductor film and the second oxide semiconductor film, which is closer to the gate electrode (the oxide semiconductor film on the channel side), has an atomic ratio of In≥Ga (in the atomic ratio, In is greater than or equal to Ga); and the other oxide semiconductor film, which is farther from the gate electrode (the oxide semiconductor film on the back channel side), has an atomic ratio of In<Ga. In that case, a transistor with a high field-effect mobility can be manufactured. On the other hand, when the oxide semiconductor film on the channel side has an atomic ratio of In<Ga and the oxide semiconductor film on the back channel side has an atomic ratio of In Ga (in the atomic ratio, In is greater than or equal to Ga), it is possible to reduce the amount of change in the threshold voltage of a transistor due to change over time or a reliability test.

Further alternatively, the semiconductor film of the transistor may have a three-layer structure of a first oxide semiconductor film, a second oxide semiconductor film, and a third oxide semiconductor film. In that case, the first to third oxide semiconductor films may include the same constituent elements with different atomic ratios. A transistor including a three-layer semiconductor film will be described with reference to FIG. 29B.

Figure 29A:
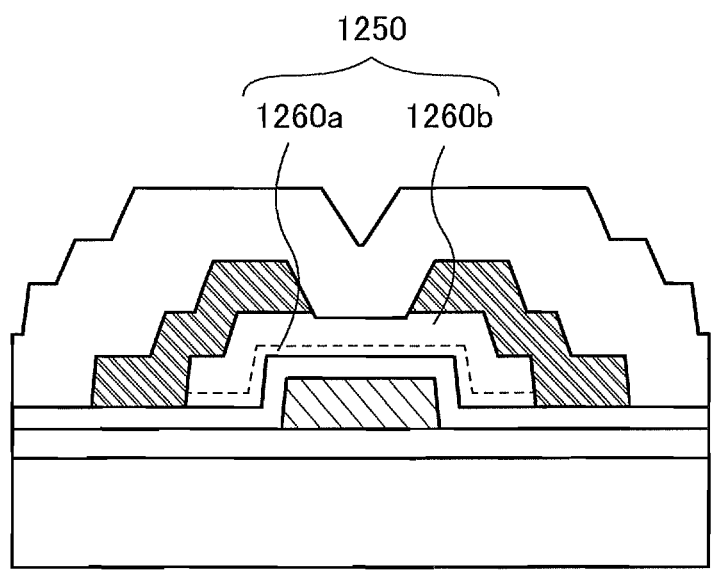
FIGS. 29A and 29B each illustrate a structure of a transistor.
Figure 29B:
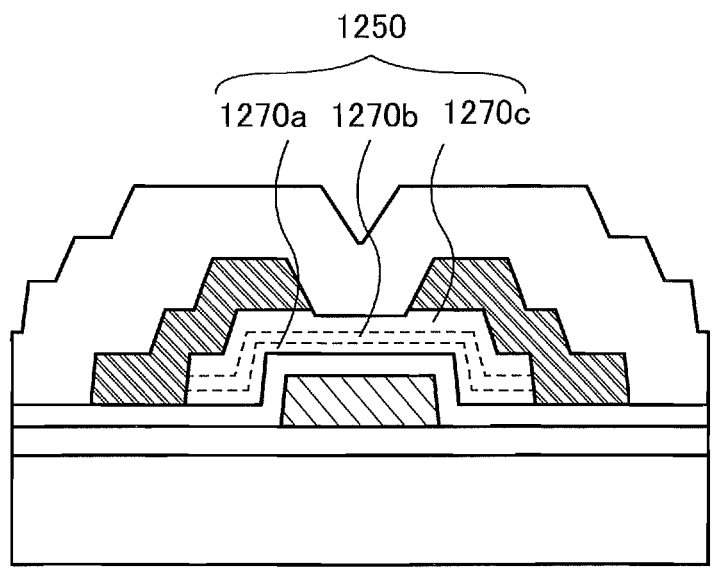

The transistor illustrated in FIG. 29B includes a first oxide semiconductor film 1270a, a second oxide semiconductor film 1270b, and a third oxide semiconductor film 1270c which are stacked in this order from the gate insulating film 127 side. The first oxide semiconductor film 1270a and the third oxide semiconductor film 1270c are formed using a material represented by $InM_{1x}Zn_yO_z$ (x≥1 (x is greater than or equal to 1), y>1, z>0, $M_1$=Ga, Hf, or the like).

The second oxide semiconductor film 1270b is formed using a material which can be represented by $InM_{2x}Zn_yO_z$ (x≥1 (x is greater than or equal to 1), y≥x (y is greater than or equal to x), z>0, $M_2$=Ga, Sn, or the like).

Materials of the first to third oxide semiconductor films 1270a to 1270c are selected as appropriate so as to form a well-shaped structure in which the bottom of the conduction band in the second oxide semiconductor film 1270b is deeper from the vacuum level than the bottoms of the conduction band in the first and third oxide semiconductor films 1270a and 1270c.

For example, the first oxide semiconductor film 1270a and the third oxide semiconductor film 1270c may each have an atomic ratio of In:Ga:Zn=1:3:2, 1:3:4, 1:6:4, or 1:9:6; the second oxide semiconductor film 1270b may have an atomic ratio of In:Ga:Zn=1:1:1 or 3:1:2.

Alternatively, the first oxide semiconductor film 1270a may have an atomic ratio of In:Ga:Zn=1:3:2 or 1:3:4, the second oxide semiconductor film 1270b may have an atomic ratio of In:Ga:Zn=1:1:1 or 3:1:2, and the third oxide semiconductor film 1270c may have an atomic ratio of In:Ga:Zn=1:6:4 or 1:9:6.

Since the first to third oxide semiconductor films 1270a to 1270c include the same constituent elements, the second oxide semiconductor film 1270b has few defect states (trap levels) at the interface with the first oxide semiconductor film 1270a. Specifically, the defect states (trap levels) are fewer than those at the interface between the gate insulating film and the first oxide semiconductor film 1270a. For this reason, when the oxide semiconductor films are stacked in the above manner, the amount of change in the threshold voltage of a transistor due to a change over time or a reliability test can be reduced.

Further, materials of the first to third oxide semiconductor films 1270a to 1270c are selected as appropriate so as to form a well-shaped structure in which the bottom of the conduction band in the second oxide semiconductor film 1270b is deeper from the vacuum level than the bottoms of the conduction band in the first and third oxide semiconductor films 1270a and 1270c. As a result, the field-effect mobility of the transistor can be increased and the amount of change in the threshold voltage of the transistor due to change over time or a reliability test can be reduced.

Further, the first to third oxide semiconductor films 1270a to 1270c may be formed using oxide semiconductors having different crystallinities. That is, the first to third oxide semiconductor films may be formed using a combination of any of a single crystal oxide semiconductor, a polycrystalline oxide semiconductor, a microcrystalline (nanocrystalline) oxide semiconductor, an amorphous oxide semiconductor, and a CAAC-OS.

At least the second oxide semiconductor film 1270b, which can serve as a channel formation region, is preferably a CAAC-OS film. An oxide semiconductor film on the back channel side, in this embodiment, the third oxide semiconductor film 1270c is preferably an amorphous oxide semiconductor film or a CAAC-OS film. Such a structure enables the amount of change in the threshold voltage of the transistor due to change over time or a reliability test to be reduced.

Although the semiconductor film described in this embodiment can be formed by a sputtering method typically, the film may be formed by another method, e.g., a thermal chemical vapor deposition (CVD) method. As an example of a thermal CVD method, a metal organic chemical vapor deposition (MOCVD) method or an atomic layer deposition (ALD) method are given.

A thermal CVD method has an advantage that no defect due to plasma damage is generated since it does not utilize plasma for forming a film.

Deposition by a thermal CVD method may be performed in such a manner that a source gas and an oxidizer are supplied to the chamber at a time, the pressure in a chamber is set to an atmospheric pressure or a reduced pressure, and reaction is caused in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated plural times until a desired thickness is obtained, whereby a thin film with excellent step coverage can be formed. The thickness of the thin film can be adjusted by the number of repetitions times of the sequence of the gas introduction; therefore, an ALD method makes it possible to accurately adjust a thickness and thus is suitable for manufacturing a minute FET.

The variety of films such as the metal film, the oxide semiconductor film, and the inorganic insulating film can be formed by a thermal CVD method such as a MOCVD method or an ALD method. For example, in the case where an In—Ga—Zn—O film is formed, trimethylindium, trimethylgallium, and dimethylzinc can be used. Note that the chemical formula of trimethylindium is $In(CH_3)_3$. The chemical formula of trimethylgallium is $Ga(CH_3)_3$. The chemical formula of dimethylzinc is $Zn(CH_3)_2$. Without limitation to the above combination, triethylgallium (chemical formula: $Ga(C_2H_5)_3$) can be used instead of trimethylgallium and diethylzinc (chemical formula: $Zn(C_2H_5)_2$) can be used instead of dimethylzinc.

For example, in the case where an oxide semiconductor film, e.g., an In—Ga—Zn—O film is formed using a deposition apparatus employing ALD, an $In(CH_3)_3$ gas and an $O_3$ gas are sequentially introduced plural times to form an In—O layer, a $Ga(CH_3)_3$ gas and an $O_3$ gas are introduced at a time to form a GaO layer, and then a $Zn(CH_3)_2$ gas and an $O_3$ gas are introduced at a time to form a ZnO layer. Note that the order of these layers is not limited to this example. A mixed compound layer such as an In—Ga—O layer, an In—Zn—O layer or a Ga—Zn—O layer may be formed by mixing of these gases. Note that although an $H_2O$ gas which is obtained by bubbling with an inert gas such as Ar may be used instead of an $O_3$ gas, it is preferable to use an $O_3$ gas, which does not contain H. Further, instead of an $In(CH_3)_3$ gas, an $In(C_2H_5)_3$ gas may be used. Instead of a $Ga(CH_3)_3$ gas, a $Ga(C_2H_5)_3$ gas may be used. Instead of an $In(CH_3)_3$ gas, an $In(C_2H_5)_3$ gas may be used. Furthermore, a $Zn(CH_3)_2$ gas may be used.

When the oxide semiconductor film is in contact with a conductive material which is easily bonded to oxygen (e.g., a metal used for the source electrode or the drain electrode), oxygen in the oxide semiconductor film is diffused into the conductive material which is easily bonded to oxygen. Such phenomenon occurs more frequently as the temperature is raised. Some heating steps are included in the manufacturing process of the transistor; thus, owing to the phenomenon, oxygen vacancies are generated in and around the region of the oxide semiconductor layer which is in contact with the source electrode or the drain electrode, so that the region becomes an n-type region. Accordingly, the n-type region can serve as a source or drain of the transistor.

The above n-type region is illustrated in FIGS. 29A and 29B. A boundary 135 indicated by a dotted line in the semiconductor film is the boundary between an intrinsic semiconductor region and the n-type semiconductor region. In the oxide semiconductor, a region near and in contact with the source electrode or the drain electrode becomes the n-type region. The boundary 135 is schematically illustrated here, but actually the boundary is not clearly seen in some cases. The position of the boundary 135 is also different in some cases.

When a transistor including a channel formation region formed of the oxide semiconductor described in this embodiment is used, an imaging device which is highly stable to irradiation with radiations such as X-rays and has a structure which can inhibit a decrease in electrical characteristics can be provided.

This embodiment can be combined with any of the structures described in the other embodiments as appropriate.

REFERENCE NUMERALS

100: substrate, 101: substrate, 110: pixel circuit, 120: circuit portion, 125: light-receiving element, 127: gate insulating film, 130: opening, 135: boundary, 140: first circuit, 150: second circuit, 160: shielding layer, 170: interlayer insulating film, 180: scintillator, 181: scintillator, 190: radiation, 195: light, 200: circuit, 201: transistor, 202: transistor, 203: transistor, 204: transistor, 205: wiring, 210: circuit, 211: wiring, 212: wiring, 213: wiring, 214: wiring, 215: wiring, 216: wiring, 217: wiring, 218: wiring, 220: photodiode, 230: variable resistor, 240: transistor, 250: circuit, 260: circuit, 270: circuit, 280: circuit, 290: circuit, 301: signal, 302: signal, 303: signal, 304: signal, 305: signal, 308: signal, 315: semiconductor film, 316: semiconductor film, 317: semiconductor film, 501: signal, 502: signal, 503: signal, 504: signal, 505: signal, 506: signal, 507: signal, 508: signal, 509: signal, 510: period, 511: period, 520: period, 521: period, 531: period, 610: period, 611: period, 612: period, 620: radiation irradiation period, 621: period, 622: period, 623: period, 631: period, 1211: conductive film, 1212: conductive film, 1213: conductive film, 1214: conductive film, 1215: conductive film, 1218: conductive film, 1219: conductive film, 1220: conductive film, 1221: conductive film, 1222: conductive film, 1223: conductive film, 1224: conductive film, 1225: conductive film, 1226: conductive film, 1227: conductive film, 1228: gate insulating film, 1229: conductive film, 1230: conductive film, 1231: conductive film, 1232: gate electrode, 1250: semiconductor layer, 1260*a*: oxide semiconductor film, 1260*b*: oxide semiconductor film, 1270*a*: oxide semiconductor film, 1270*b*: oxide semiconductor film, 1270*c*: oxide semiconductor film, 1281: insulating film, 1282: insulating film, 1283: insulating film.

This application is based on Japanese Patent Application serial no. 2013-037039 filed with Japan Patent Office on Feb. 27, 2013, the entire contents of which are hereby incorporated by reference.

The invention claimed is:

1. An imaging device comprising:
a pixel circuit including a light-receiving element and a circuit portion;
an insulating film over the pixel circuit;
a shielding layer over the insulating film; and
a scintillator over the shielding layer, configured to emit light in response to radiation from a radiation source,
wherein the circuit portion includes a first transistor electrically connected to the light-receiving element,
wherein the first transistor comprises a channel formation region which comprises an oxide semiconductor,
wherein the shielding layer and the pixel circuit overlap each other to prevent the pixel circuit from being exposed to the radiation,
wherein the shielding layer includes an opening,
wherein the opening and the circuit portion do not overlap each other,
wherein the light-receiving element senses light emitted from the scintillator passing through the opening and the insulating film, and
wherein the light-receiving element is included in the circuit portion.

2. The imaging device according to claim 1, wherein the shielding layer is a single layer or a stacked layer including a material selected from lead, gold, platinum, iridium, osmium, rhenium, tungsten, tantalum, hafnium, palladium, rhodium, and ruthenium.

3. The imaging device according to claim 1, wherein the light-receiving element comprises a transistor in which a channel formation region comprises an oxide semiconductor.

4. The imaging device according to claim 1, wherein the light-receiving element comprises a photodiode.

5. The imaging device according to claim 1, wherein the light-receiving element comprises a variable resistor in which a semiconductor layer is positioned between a pair of electrodes.

6. An imaging device comprising:
a pixel circuit including a light-receiving element and a circuit portion;
an insulating film over the pixel circuit;
a shielding layer over the insulating film; and
a scintillator over the shielding layer, configured to emit light in response to radiation from a radiation source,
wherein the circuit portion includes a first transistor electrically connected to the light-receiving element,
wherein the first transistor comprises a channel formation region which comprises an oxide semiconductor,
wherein the shielding layer and the pixel circuit overlap each other to prevent the pixel circuit from being exposed to the radiation,
wherein the shielding layer includes an opening,
wherein the opening and the circuit portion do not overlap each other,
wherein the light-receiving element senses light emitted from the scintillator passing through the opening and the insulating film,
wherein a material included in the scintillator has a higher refractive index than the insulating film, and
wherein the light-receiving element is included in the circuit portion.

7. The imaging device according to claim 6, wherein a material having a higher refractive index than the insulating film is provided in the opening.

8. The imaging device according to claim 6, wherein the shielding layer is a single layer or a stacked layer including a material selected from lead, gold, platinum, iridium, osmium, rhenium, tungsten, tantalum, hafnium, palladium, rhodium, and ruthenium.

9. The imaging device according to claim 6, wherein the light-receiving element comprises a transistor in which a channel formation region comprises an oxide semiconductor.

10. The imaging device according to claim 6, wherein the light-receiving element comprises a photodiode.

11. The imaging device according to claim 6, wherein the light-receiving element comprises a variable resistor in which a semiconductor layer is positioned between a pair of electrodes.

12. The imaging device according to claim 1,
wherein the circuit portion includes a charge accumulation portion, the first transistor, a second transistor, and a third transistor,
wherein one of a source and a drain of the first transistor is electrically connected to the light-receiving element,
wherein the other of the source and the drain of the first transistor is electrically connected to the charge accumulation portion,
wherein a gate of the second transistor is electrically connected to the charge accumulation portion,
wherein one of a source and a drain of the second transistor is electrically connected to one of a source and a drain of the third transistor, and
wherein at least the first transistor includes a channel formation region comprising an oxide semiconductor.

13. The imaging device according to claim 1,
wherein the circuit portion includes a charge accumulation portion, the first transistor, a second transistor, a third transistor, and a fourth transistor,
wherein one of a source and a drain of the first transistor is electrically connected to the light-receiving element,
wherein the other of the source and the drain of the first transistor is electrically connected to the charge accumulation portion, wherein a gate of the second transistor is electrically connected to the charge accumulation portion,
wherein one of a source and a drain of the second transistor is electrically connected to one of a source and a drain of the third transistor,
wherein one of a source and a drain of the fourth transistor is electrically connected to the charge accumulation portion, and
wherein at least the first transistor and the fourth transistor each include a channel formation region comprising an oxide semiconductor.

14. The imaging device according to claim 1, wherein a material having a higher refractive index than the insulating film is provided in the opening.

* * * * *